United States Patent
Glennon et al.

(10) Patent No.: US 10,362,351 B2
(45) Date of Patent: Jul. 23, 2019

(54) DYNAMIC TUNER ALLOCATION

(71) Applicant: TiVo Solutions Inc., San Carlos, CA (US)

(72) Inventors: Shelly Glennon, San Jose, CA (US); Kimberly Paluch, Oakland, CA (US)

(73) Assignee: TIVO SOLUTIONS, INC., San Jose, CA (US)

( * ) Notice: Subject to any disclaimer, the term of this patent is extended or adjusted under 35 U.S.C. 154(b) by 0 days.

(21) Appl. No.: 14/463,487

(22) Filed: Aug. 19, 2014

(65) Prior Publication Data

US 2015/0052568 A1   Feb. 19, 2015

Related U.S. Application Data

(60) Provisional application No. 61/867,475, filed on Aug. 19, 2013.

(51) Int. Cl.
*H04N 21/426* (2011.01)
*H04N 21/458* (2011.01)
*H04N 21/4147* (2011.01)
*H04N 21/482* (2011.01)

(52) U.S. Cl.
CPC ..... *H04N 21/4263* (2013.01); *H04N 21/4147* (2013.01); *H04N 21/4583* (2013.01); *H04N 21/482* (2013.01)

(58) Field of Classification Search
CPC ........... H04N 21/4147; H04N 21/4263; H04N 21/4583; H04N 21/482
USPC ........................................................ 725/100
See application file for complete search history.

(56) References Cited

U.S. PATENT DOCUMENTS

| | | | |
|---|---|---|---|
| 7,409,140 B2* | 8/2008 | Rodriguez et al. | 386/248 |
| 8,745,661 B2* | 6/2014 | Ellis et al. | 725/38 |
| 8,819,725 B2* | 8/2014 | Anguiano et al. | 725/32 |
| 2003/0128302 A1* | 7/2003 | Potrebic et al. | 348/731 |
| 2005/0002638 A1* | 1/2005 | Putterman | H04N 5/76 386/213 |
| 2006/0035610 A1* | 2/2006 | Potrebic | 455/178.1 |
| 2007/0067820 A1* | 3/2007 | Cha | H04N 21/418 725/151 |
| 2007/0174287 A1* | 7/2007 | McEnroe et al. | 707/10 |
| 2008/0066111 A1* | 3/2008 | Ellis et al. | 725/57 |
| 2010/0020794 A1* | 1/2010 | Cholas et al. | 370/389 |
| 2013/0243398 A1* | 9/2013 | Templeman | H04N 5/782 386/293 |

(Continued)

OTHER PUBLICATIONS

"Current", Oxford English Dictionary, (available at http://www.oed.com/view/Entry/46097?print, accessed on Nov. 23, 2016).*

(Continued)

*Primary Examiner* — Nathan J Flynn
*Assistant Examiner* — Cynthia M Fogg
(74) *Attorney, Agent, or Firm* — Haley Guiliano LLP

(57) ABSTRACT

In an embodiment, a first tuner task type is identified from among a plurality of tuner task types, in response to receiving a first tuner request. The first tuner request was made to perform a tuner task of the first tuner task type. A first set of tuner selection rules specifically for the first tuner task type is determined and applied to a set of tuners to determine whether the set of tuners comprises a tuner available to perform the tuner task of the first tuner task type.

42 Claims, 45 Drawing Sheets

(56) References Cited

U.S. PATENT DOCUMENTS

2015/0074724 A1* 3/2015 Hayashi ............ H04N 21/4532
                                                        725/47

OTHER PUBLICATIONS

Oriyano, Sean-Philip. Introduction to Software Load Balancing with Amazon EC2. Amazon Web Services. Sep. 21, 2008. Web. http://aws.amazon.com/articles/1639.*

Data-Over-Cable Service Interface Specifications 3.0 (DOCSIS 3.0) MAC and Upper Layer Protocols Interface Specification version 11 from Oct. 9, 2009.*

Data-Over-Cable Service Interface Specifications 3.0 (DOCSIS 3.0) Operations Support System Interface Specification version 10 from Oct. 9, 2009.*

* cited by examiner in response to receiving a first tuner request, identify a first tuner task type from among a plurality of tuner task types, the first tuner request being made to perform a tuner task of the first tuner task type 702 determine a first set of tuner selection rules specifically for the first tuner task type 704 apply the first set of tuner selection rules to a set of tuners to determine whether the set of tuners comprises a tuner available to perform the tuner task of the first tuner task type 706

FIG. 7

DYNAMIC TUNER ALLOCATION

PRIORITY INFORMATION

The present invention claims priority under 35 U.S.C. 119(e) of provisional application No. 61/867,475 filed on Aug. 19, 2013, which is incorporated by reference herein for all purposes.

FIELD OF THE INVENTION

The present invention relates to media recording. Specifically, the invention relates to dynamic tuner allocation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A home, café, bar, etc., may have more than one device capable of playing media content. For example, desktop computers, tablet computers, mobile devices, etc., may be used to access web-based broadband content. A high-end HDMI TV may be connected to a set-top box with cable and satellite connections. One or more digital video recorders (DVRs) may also be used to access, record, playback, etc., media content available from broadband and/or broadcast media sources. One or more of the above-mentioned devices may be equipped with tuners that can be used to access media content, while the remaining may not. It is difficult and cumbersome for one media device to access physical resources such as physical tuners of a different media device since devices may be manufactured by different vendors. The situation gets worse when multiple users and/or multiple media devices, which may be located in different parts of a home, fight to access, record, playback, etc., their own favorite shows with a limited number of tuners.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 shows an example process flow.

DETAILED DESCRIPTION

Figure 1:
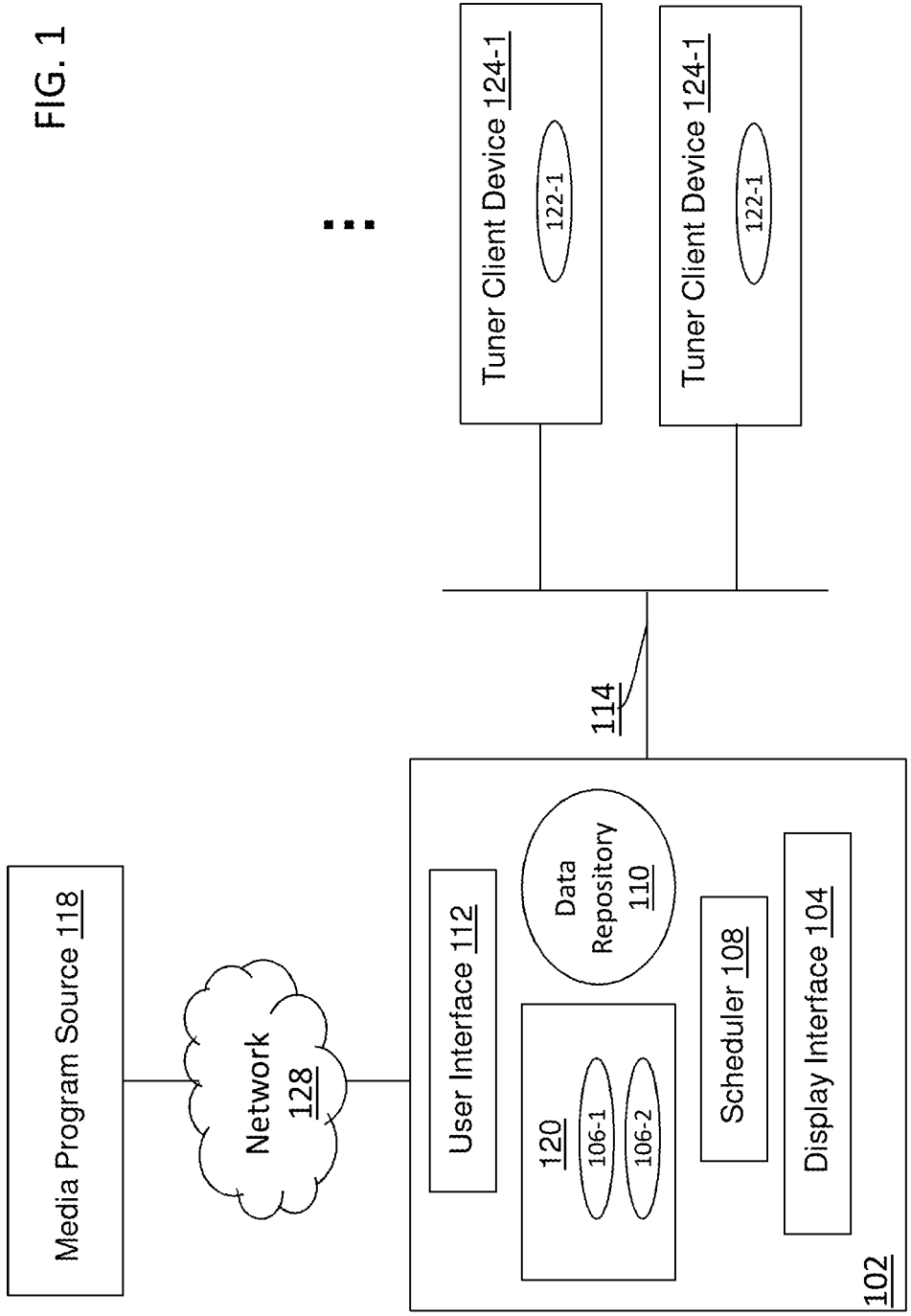
FIG. 1 illustrates an example configuration comprising a tuner sharing system of one or more tuner-equipped devices and one or more tuner client devices.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example features are described according to the following outline:

1.0 FUNCTIONAL OVERVIEW
  2.0 SYSTEM ARCHITECTURE
  3.0 TUNER STATES, ATTRIBUTES AND OWNERSHIP
  4.0 END-TO-END TUNER TASK REQUEST HANDLING
  5.0 LIVE TV TUNER REQUESTS
  6.0 TUNER SELECTION PROCESS FLOWS FOR REMOTE REQUESTS
  7.0 EXPLICIT TUNER SWAP
  8.0 VIDEO ON DEMAND
  9.0 BACKGROUND NODE DISCOVERY TUNER REQUEST
  10.0 TUNER LOCK REQUEST
  11.0 REMOTE TUNER LOCK REQUEST
  12.0 RECORDING TUNER REQUESTS
  13.0 TUNER STATE PROCESSES
  14.0 OPERATIONS REQUIRING CONTROL OF ALL TUNERS
  15.0 TUNER CONFLICTS
  16.0 TUNER TOGGLING
  17.0 EXAMPLE USER INTERFACE DISPLAYS
  18.0 EXAMPLE PROCESS FLOW
  19.0 HARDWARE OVERVIEW
  20.0 EXTENSIONS AND ALTERNATIVES 1.0 Functional Overview Techniques for dynamic tuner allocation as described herein may be implemented in software components, hardware components, or a combination of software and hardware components.

Techniques as described herein can be used to optimize utilization of available hardware resources and features of a multimedia system/platform. The system/platform may comprise a set of multimedia devices (e.g., a tuner-equipped device, a DVR, a media server, etc.) at least one of which is equipped with one or more tuners. Interaction with users in connection with tuner allocation can be supported with a consistent and predictable user interface. Tuner allocation policies harmonizing users' interests and intent and maximizing users' overall positive experience may be implemented as a part of an overall tuner management strategy in a system/platform as described herein.

Tuner allocation rules, policies, etc., refer to a set of rules used to determine which tuner tasks happen on which tuner in a given situation. For example, these policies govern how tuners are allocated to handle tuner requests. A tuner task or activity refers to a process that occupies a tuner, for example, live caching, recording, etc. A tuner task may be solicited or unsolicited. A solicited tuner task is solicited by and in direct response to receiving user input such as user remote control actions related to channel change, pressing RECORD in a live TV display, or initiating a VOD, etc. An unsolicited tuner task (e.g., a recording for a suggestion, a user scheduled recording, etc.) is generated by a system (which may or may not be in response to user input that occurred a while ago), possibly in direct response to a system-generated event (e.g., an event that a scheduler detecting a scheduled recording is to start in about a minute, the firing of a scheduling timer, etc.), and may be based on an overall popularity of a program among a set of users, a user's preferences, similarity to other programs viewed by a user, etc.

Tuner requests are made when a user or a system initiates a task that requires the use of a tuner, for example, watching live TV, starting a recording, etc. Each tuner request is handled by looking at the current tuner state (e.g., tuner attributes, etc.) of the tuners in the system. In response, a reply may contain a proposal for a candidate tuner as determined based on a set of tuner allocation rules.

Tuner allocation techniques as described herein can be used to allocate tuners in a manner that a user is not interrupted with the user's viewing activity unless a relatively high priority tuner task is to be canceled in order to carry out a new tuner request for a new tuner task or unless the user has explicitly set a reminder for a tuner task such as a requested recording, etc.

When a tuner allocation decision is not in favor of a user's tuner request (e.g., no available tuner, etc.), the user may be presented with options to cancel the tuner task, to view a recording, to request another user to relinquish a tuner, etc. In some embodiments, tuner selection processes, operations, etc., may function without user input (e.g., when the user is away from his multimedia device, etc.).

One or more of many different considerations/determinations may be made by the tuner allocation techniques to try to determine a user's intent: such as whether the tuner task is a solicited request or an unsolicited request; whether the user has used the remote recently (e.g., measured by remote control idle timeout, etc.); whether the user has recently viewed the tuner task, (e.g., brought to the foreground, measured by focus timeout, etc.); etc.

In some embodiments, when a system is first used or initialized, all tuners are live caching possibly different channels. In some embodiments, when a tuner task which a tuner performs ends without a pending scheduled task, the tuner is automatically returned to a livecaching task. This behavior may change if a power-saving mode is in effect (e.g., placing a tuner into idle instead of live caching, a user has pre-configured the system to favor power saving rather than fast startup time, etc.).

Tuner tasks may be discretely prioritized for given contexts. For a given set of tuner tasks, the tuner allocation techniques rank the tuner tasks by importance in order to determine which tuner task to cancel silently; if necessary, to determine which tuner task to suggest for cancellation via a conflict dialog, etc. An example of tuner task priorities is as follows: EAM; user recordings; VOD; live caching—foreground active; fuzzy recording (e.g., suggestions, etc.); live caching—background active; other unsolicited tasks (e.g., downloads to support an application, etc.); live caching—foreground inactive; live caching—background inactive; confirmed inactive, etc.

When a scheduled tuner task is about to start, or when the user requests VOD or a channel change, a tuner selection process, operation, etc., may be executed to determine what actions should be taken. Example actions include but are not limited only to: any of silently aborting a new tuner task, silently replacing an existing task with the new task, prompting a user with a conflict dialog, taking a default action if a user does not respond within a timeout period, etc. As used herein, "silently" may refer to taking an action without prompting a user.

In some embodiments, lower priority tasks such as fuzzy recordings (e.g., suggestions, etc.), live caching on an inactive tuner, etc., can be silently aborted or replaced in favor of higher priority tasks such as a user recording (e.g., a user-scheduled recording, etc.), channel change, etc.

In some embodiments, high priority tasks may not be replaced or aborted without a user prompt (except when an EAM demands the tuner).

In some embodiments, solicited tuner tasks may not be silently canceled, but rather will result in either a user prompt or success. If the prompt times out (e.g., which may indicate that the user has walked away), however, the solicited tuner task may be canceled.

In some embodiments, unsolicited tuner tasks may be canceled silently and may be started as low priority tuner tasks.

In some embodiments (possibly except for channel changes, EAMs, requests to record what is already on the foreground tuner, etc.), new tuner tasks may be placed first on background tuners before the foreground tuner.

In some embodiments, when more than one tuner is available for a new tuner task, the tuner with the lowest priority task may be selected for the new tuner task. In some embodiments, if more than one tuner has the same priority tuner task (e.g., two or more tuners are inactive caching, etc.), the tuner with the longest time lapse for remote inactivity may be selected for the new tuner task.

In some embodiments, a foreground tuner may be selected for a new tuner task if it is confirmed inactive. In some embodiments, a channel change tuner task may be satisfied by a requester's own tuner which has been tuned to a current channel that is to be changed. However, a different tuner other than the requester's own tuner may be selected for the channel change tuner task: if the requester's own tuner has a scheduled task (e.g., a user recording on the current channel, etc.), if another tuner is already tuned to the requested channel, if a prior channel change during the same session caused an implicit tuner swap, etc. Here, "implicit tuner swap" refers to a tuner swap not ordered by a user but automatically enacted by a system to take advantage of a built up cache of a tuner already tuned to a requested channel in the channel change. In some embodiments, a first channel change results in a selection of a tuner that is tuned to the requested channel of the first channel change; upon a second channel change after the first channel change, the tuner that was given up at the first channel change may be selected for the second channel change, if possible.

In some embodiments, if the foreground tuner (e.g., the requester's current tuner in the channel change, etc.) is recording a Suggestion, the system may determine whether an inactive background tuner can be used to tune to the requested channel. In some embodiments, if none are available, then the system may be configured to silently cancel the Suggestion and tune the foreground tuner to the requested channel.

In some embodiments, the system tries to record a Suggestion on the most inactive tuner to avoid negatively impacting a user, to avoid prompting the user when the system cancels the Suggestion, etc. In some embodiments (e.g., a system configured with two tuners, etc.), the system may select an active background tuner to record a Suggestion; a user may be prompted first before such a tuner is used to record the Suggestion. In some embodiments, the number of suggestions that can be concurrently recorded may be limited, for example, to a maximum of one, two, three, etc., at any given time.

In some embodiments, a user is prompted if the tuner being used for VOD is needed for a high priority tuner task, if a recording with a reminder is about to start, etc.

In a system comprising at least one tuner-equipped device and one or more (e.g., remote, networked, etc.) tuner client devices, the system may be configured to set (e.g., based on user input) a number of tuners on a tuner-equipped device as reserved tuners. The reserved tuners may be used by specific tuner tasks and thus reduce the number of tuners that may be available for other tuner tasks.

To determine the state of a tuner owned by a tuner client device, after a remote control idle timeout, the system may prompt on the tuner client device to determine or verify whether a user of the tuner client device is still there with the tuner ask currently being performed by the tuner. If the prompt times out, the tuner may be reclaimed by the system. The reclaimed tuner returns to an inactive state on the tuner-equipped device until it is selected for a new tuner task.

A tuner request can be generated whenever a tuner task associated with the tuner request requires a tuner. In some embodiments, only one device can own a given tuner at any time. In some embodiments, even if a multimedia device does not have a tuner or cannot provide a tuner to another multimedia device, the other multimedia device may still be able to access recordings on the former of the devices without using a tuner. For example, a client device may watch recordings, without using tuners, from multiple remote boxes via My Shows.

Examples of tuner allocation rules include but are not limited only to: any of filtering rules, sorting rules, etc. In some embodiments, filtering rules are applied first and exclude any tuners that are not capable of performing one or more tuner tasks in the tuner request. For example, if there is a lock on a tuner, that tuner is not available to handle or perform tuner tasks in incoming requests. In some embodiments, sorting rules are applied after filtering based on filtering rules is completed.

Any (remaining) tuners not excluded by the filtering can be sorted based on their current tuner states. In some embodiments, the sorting rules assigned individual weights to the remaining tuners based on the current tuner states such that a preference may be given to one or more tuners whose takings produce the least impacts to a user. For example, the higher the weight or priority of a tuner is assigned in the tuner's current tuner state, the more impact to a user the taking of the tuner produces. The remaining tuners may be sorted in a list, for example, in a descending order of the weights or priorities, in an ascending order of the weights or priorities, etc. After filtering and sorting, a tuner reply to the tuner request may contain a proposal of a tuner (e.g., top of the list sorted in an ascending order of weight or priority, etc.) whose taking has been determined to produce the least impact (or one of the least impacts, etc.) to a user. A high priority tuner task may refer to a tuner task that has been explicitly asked for by a user at some time, for example, scheduled user recordings and user requested channel changes. A low priority tuner task may refer to a tuner task that has not been explicitly asked for by a user at some time, for example, fuzzy recordings (e.g., suggestions, etc.). A recording refers to a tuner task that creates a fixed buffer of recorded content that begins and ends at scheduled times. A tuner that is in the process of creating the recorded content is said to be recording.

In some embodiments, after the tuner allocation rules are applied, before sending the tuner reply to the tuner request, tuner conflict rules may be applied to determine whether a tuner conflict dialog, message, prompt, notification, etc., should be displayed to one or more users. A tuner conflict dialog, message, prompt, notification, etc., may be presented on a tuner-equipped device. A tuner conflict dialog, message, prompt, notification, etc., may also be (e.g., caused by a tuner-equipped device to be, etc.) presented on a tuner client device. In some embodiments, the one or more users may specify user input, which may influence whether and how a tuner is eventually selected in response to the tuner request. A tuner conflict refers to a situation where more tuner tasks are requested to be run than there are tuners in a tuner sharing system. A tuner conflict can arise due to user input (e.g., requesting channel change, streaming, recording, etc.) or due to a scheduled event (e.g., by a scheduler, etc.).

A multimedia device as described herein may be one or more of tablet computers, digital video recorders, set-top boxes, handheld devices, laptops, e-readers, personal computing devices, game devices, or display systems, whereas the second device is a different one of tablet computers, digital video recorders, set-top boxes, handheld devices, laptops, e-readers, personal computing devices, game devices, or display systems.

Some examples of multimedia device such as a digital video recorder (DVR) and of media segments are described in U.S. Pat. No. 6,233,389, owned by the Applicant and which is incorporated by reference as though originally disclosed herein. In some embodiments, the multimedia device may further comprise some or all of the software and/or components as illustrated herein.

2.0 System Architecture

Although a specific computer architecture is described herein, other embodiments of the invention are applicable to any architecture that can be used to perform the functions described herein.

As used herein, a client or a tuner client device refers to a networked device that uses a tuner provided by a tuner-equipped device such as a host, a tuner donor, DVR, etc. A client can, but is not limited only to, be tuner-less. The client may establish one or more tuner sharing relationships with one or more tuner-equipped devices in displays related to Guided Setup, Settings, etc. Clients may access certain features or physical components on other devices that may not be available on the clients; for example, a client may use host's tuners to watch live TV or schedule recordings. In embodiments in which multiple tuner-equipped devices are available in a tuner sharing system, a user may specify an order of preferences with the tuner-equipped devices for a tuner client device. In some embodiments, the order of preferences may also be based on what types of tuner tasks. For example, a tuner-equipped device may be preferred for accessing high definition video content, while another tuner-equipped device may be preferred for accessing broadband video content, etc. Channels, recorded programs, etc., available from multiple tuner-equipped devices can be merged into one or more lists accessible to a tuner-equipped device or a tuner client device. The system may be configured to support tuner swapping and/or toggling across two different tuner-equipped devices.

A tuner-equipped device refers to a host, a DVR, etc., that provides a tuner client device with access to features or physical components that may otherwise be unavailable to the tuner client device. A tuner-equipped device may have multiple clients.

A tuner refers to a hardware component that can receive broadcast content. The tuner may consist of multiple distinct hardware components that, collectively, can receive a wide variety of broadcast content. A tuner can be a physical tuner or a virtual tuner that represents an abstract perception of physical components used to receive broadcast content.

FIG. 1 illustrates an example configuration comprising a tuner sharing system of one or more tuner-equipped devices (one of which, for example, is 102) and one or more tuner client devices (124-1, 124-2, etc.). In some embodiments, a tuner-equipped device (102) may comprise a user interface 112 (e.g., graphic interface, remote control interface, etc.), a scheduler 108, a display interface 104 (e.g., connecting to an external HDMI display, etc.), a data repository 110, a tuner selection unit 120 that manages allocation of one or more tuners (e.g., 106-1, 106-2, etc.), a recording engine, etc.

The recording engine can be configured to generate scheduled recordings of one or more media programs received via one or more channels from one or more media program sources (e.g., 118, etc.). In some embodiments, scheduled recordings of media programs and/or other data and configuration information needed by the tuner-equipped device (102) in operations may be stored in the data repository (110) (e.g., network accessed storage, cloud storage, shared storage, etc.).

A media program source may be a media program server system implemented by one or more computing devices to deliver media programs to one or more multimedia devices (e.g., 102, 124-1, 124-2, etc.) concurrently, sequentially, or in part concurrently in part sequentially. Examples of media program sources include but are not limited to any of: cable distribution systems, satellite broadcast systems, over-the-air broadcast stations, network-based content servers, etc.

A channel as described herein refers to a media data pipeline (e.g., between a media program source and a tuner-equipped device, etc.) that carries audio and/or video signals, streams of media programs, in-band control and data information (e.g., along with a stream of a media program, etc.), out-of-band control and data information (e.g., separate from any stream of media program, etc.), etc. A channel may be a unidirectional or bidirectional channel for which a tuner can be provisioned (e.g., tuned, etc.) to receive media programs from a media program source. Examples of channels include but are not limited to any of: cable channels, broadcast channels, broadband channels, media data streams, media data download, media data deliveries, etc. A channel can be provided to the tuner-equipped device (102) through one or more of over-the-air broadcasts, cable networks, satellite broadcasts, mobile data networks, networks comprising any of the internet, local area networks (LANs), wide area networks (WANs), dedicated links, private computer networks, public computer networks, enterprise computer networks, etc. Some examples of channel, tuner and tuner-equipped (multimedia) devices (one or more of which may be tuner-equipped devices) are described in U.S. patent application Ser. No. 13/651,248, owned by the Applicant and which is incorporated by reference as though originally disclosed herein.

A tuner (e.g., 106-1, 106-2, etc.) may refer to an audio tuner, a video tuner, an audiovisual tuner, a system resource unit, a system component, a signal processing unit, etc., which can be provisioned, tuned, allocated, assigned, used, etc., (e.g., on demand, in advance, etc.) by the tuner-equipped device (102) to receive one or more media programs from one or more media program sources (e.g., 118, etc.). A tuner can be configured at any given time by the tuner-equipped device (102) to start receiving media data from a specific channel in one or more channels from a media program source (e.g., 118, etc.) and/or to stop receiving media data from any other channel in the channels.

In some embodiments, the scheduler (108) can be configured to receive advance and/or real time scheduling information relating to individual media programs from one or more program schedule sources. A program schedule source may be a program schedule server system implemented by one or more computing devices to provide advance and/or real time scheduling information to one or more tuner-equipped devices (e.g., 102, etc.) concurrently, sequentially, or in part concurrently in part sequentially. Examples of program schedule sources include but are not limited to any of: cable distribution systems, satellite broadcast systems, over-the-air broadcast stations, network-based content servers, internet sources, etc. A program schedule source may, but is not required to, be a part of a media program source (e.g., 118, etc.). In some embodiments, the tuner-equipped device (102) can receive, from one or more program schedule sources, at least a part of the scheduling information over one or more network connections.

Scheduling information may refer to, without limitation, information such as electronic program guides, program lists on various content servers, program lists on various multimedia devices (e.g., tuner-sharing devices, tuner client devices, etc.), etc., that describes what media programs may be available from media program sources such as content providers, network operators, cable networks, broadcast stations, broadcast sources, broadband sources, media data stores from remote and local multimedia devices, etc. Examples of scheduling information include but are not limited to any of: start time of individual media programs, end time of individual media programs, program attributes (e.g., channel, resolution, title, rating, etc.), etc.

In some embodiments, the tuner-equipped device (102) or the user interface (112) therein, can be configured to receive user input (e.g., via a remote control device, a pointer device for a graphic user interface, a menu, an explicit textual input, a short message generated by the user, etc.) from a user. A tuner-equipped device (e.g., 102, etc.) as described herein may be configured to present screen displays to, and to receive user commands from, a user. The user may navigate interactively among the screen displays to specific media programs in which the user is interested, and to direct the tuner-equipped device (102) to obtain information about media programs (e.g., in live TV, streaming, etc.), to play selected media programs, to receive, download, side-load, etc., media programs. In some embodiments, side-loading refers to a loading of a media program performed in parallel with a playing of another media program.

A tuner client device (e.g., 124-1, 124-2, etc.) includes any, some or all of: a client user interface (e.g., graphic interface, remote control interface, etc.), a client display interface (e.g., connecting to an external HDMI display, connecting to an integrated display, etc.), a client data repository, zero or more tuners, a streaming application (e.g., 122-1, 122-2, etc.), etc. In an embodiment, a tuner client device (e.g., 124-1, 124-2, etc.) represents any device capable of streaming video content from a tuner-equipped device, recording media programs (e.g., storing such programs on a remote device, storing such programs locally, etc.), interacting with one or more tuner-equipped devices (one of which may be designated as a default host for an individual tuner client device) in connection of tuner requests and/or tuner tasks, receiving messages, requests, responses, displays, notifications, prompts, etc., from other devices (e.g., a tuner-equipped device, etc.), sending messages, requests, responses, etc., (e.g., based on user input, etc.) to other devices (e.g., a tuner-equipped device, etc.), etc. In some embodiments, tuner client device (e.g., 124-1, 124-2, etc.) can be configured to run as a client to a different system (e.g., a tuner-equipped device 102, etc.), present displays to a user, obtain user input from a user locally at the tuner client device (e.g., 124-1, 124-2, etc.), forward the user input to the different system, generate information based on the user input, transmitting the information to the different system, etc. In some embodiments, tuner client device (e.g., 124-1, 124-2, etc.) is configured to process or present multimedia content. For example, a tuner client device (e.g., 124-1, 124-2, etc.) can process or present a media program selected by a user of the tuner client device (e.g., 124-1, 124-2, etc.). A tuner client device (e.g., 124-1, 124-2, etc.) may represent a mobile device, such as a tablet computer, e-reader, mobile communication device, thin client, etc.

Tuner client devices (e.g., 124-1, 124-2, etc.) and tuner-equipped devices (e.g., 102, etc.) in a tuner sharing system may be connected with a network connection 114. The network connection 114 may be, but is not limited to, a local network connection, a wireless connection, a wire-based connection, an ad hoc network connection established through a network discovery process, etc. For example, one or more tuner client devices (e.g., 124-1, 124-2, etc.) and one or more tuner-equipped devices (e.g., 102, etc.) may be a part of a local network at a specific location such as a room, a house, a building, a site, a shop, a park, etc. Access points, routers, etc., may be used to provide the network connection 114.

One, some or all of the tuner-equipped device (102), the tuner client devices (124-1, 124-2, etc.), the media program source (118), etc., as illustrated in FIG. 1 can have one or more network connections to one or more networks (e.g., 128). These network connections may enable a device/system/server to communicate with a variety of other devices/systems/servers not necessarily all depicted in FIG. 1. A multimedia device (e.g., 102, 124-1, 124-2, etc.) as described herein can, but is not limited to be any of: digital video recorders, set-top boxes, tablet computers, handheld devices, laptops, e-readers, personal computing devices, game devices, display systems, etc. It should be noted that any, some or all of the illustrated channels and the network connections can be implemented through the network connections. A network (e.g., 128, etc.) as described herein can, but is not limited to be any of: local area networks, wired or wireless networks, blue tooth networks, wide area networks, the internet, intranets, extranets, dedicated links such as serial links, HDMI connections and USB connections, combinations of these and other networks and links, etc.

As used herein, a media program may comprise audio and/or video content including but not limited to any of: audio and/or video data, audio and/or video transcription data, multimedia data, internet downloaded content data, multimedia data with markup language pages, videos, movies, multimedia presentations, audio books, electronic books, podcasts, etc. A media program may be received with any of a wide variety of formats defined by standard or proprietary specifications including, but not limited to, any related to: analog TV channel, digital TV channel, CD, MPEG-1, MPEG-2, and MPEG-2.5 Audio Layer III (MP3), Advanced Audio Coding (AAC), DVD, HD DVD, Blu-ray Disc, H.261, H.263, H.264/MPEG-4, HDMI, etc.

Media programs (e.g., TV shows, movies, live broadcasts, etc.) may run/last for varying time durations. In an example, a TV show may last 30 minutes. In another example, a movie may last two hours. In yet another example, a live broadcast may have indeterminate time duration until the broadcast is over. A media program as described herein may be copyright free and thus content of the media program may be copied without legal limitation. Alternatively, a media program may be copyright protected and thus the content of the media program may only be copied, recorded or distributed if digital rights to the media program for performing these operations are secured and verified. In some embodiments, a tuner-equipped device (102) as described herein may be configured to work with other systems if necessary and verify whether a user of a multimedia device (e.g., a tuner-equipped device, a tuner client device, etc.) possesses sufficient digital rights to a media program. The recording of the media program may be performed in compliance with the user's verified digital rights to the media program.

Digital rights as described herein include, but are not limited to, any of: playing rights, copying rights, distribution rights, etc. In response to a successful interrogation/validation of the user's digital rights to the media program, the tuner-equipped device (102) may be configured to record the media program in compliance with the digital rights that have been verified.

Menus, icons, and web pages may be displayed a multimedia device (e.g., 102, 124-1, 124-2, etc.) as described herein to the user based on information included in a tag. The user may interact with the menu, icon, or web page through an input device. The multimedia device (e.g., 102, 124-1, 124-2, etc.) performs the actions associated with the menu, icon, or web page and the user's input. Tags may be used to create indexes in media data, media streams, media files, etc. This allows the user to jump to particular indexes in the media program, a different media program, a different display, etc.

3.0 Tuner States, Attributes and Ownership

In some embodiments, a tuner state is determined at least in part by a combination of three tuner attributes: tuner task, focus, and activity. Some or all of possible values for these tuner attributes are illustrated in the following table:

TABLE 1

| Tuner Task | Focus | Activity |
|---|---|---|
| User Recording | Background | Active |
| Fuzzy Recording | Foreground | Inactive |
| Live Caching | | Confirmed Inactive |
| Live Streaming | | |
| None (e.g., Idle) | | |

A tuner can be referred to by its focus and activity. For example, a tuner that is both active and in the foreground can be referred to as a foreground active tuner. If this tuner were recording, its state could to be given as: "foreground active and recording" or "a foreground active tuner that is recording." If a tuner is not performing any tuner tasks, it is said to be in the "idle" state. In some embodiments, an idle tuner cannot be active or in the foreground. In some embodiments, the idle state is reserved for a power-saving state of a tuner.

Tuner attributes as described herein include, but are not limited to, any of the following:

InputID: an attribute such as an integer ID, etc., assigned to a tuner. It is used to uniquely identify a specific tuner. In some embodiments, once assigned, the value does not change; for example, tuner 0 is always tuner 0.

Enabled: an attribute such as a Boolean (e.g., "true" or "false", "1" or "0", etc.), etc., that defines whether a given tuner is enabled or disabled. This tuner attribute may be set to true by a system comprising the tuner, after the system starts up.

Foreground: an attribute such as a Boolean (e.g., "true" or "false", "1" or "0", etc.), etc., to track whether a tuner is deemed to be in the foreground, based on presence or lack of presence of the most recent activities with a tuner; if this attribute for a tuner is set to true, content obtained with the tuner is likely currently displayed on a primary output connected to (e.g., physically connected to, etc.) a device that has been assigned the tuner. In some embodiments, a multimedia device can have only one tuner in the foreground as indicated by the "Foreground" attribute value (e.g., "true", "1", etc.). In some embodiments, a system comprises at least one tuner in the foreground. During a playback of a recording, no tuner may be used to output content to a display; in some embodiments, the last foreground tuner may remain in the foreground (e.g., as before the playback of the recording, etc.) and return to output content to the display once the playback ends. A foreground tuner as used herein refers to a tuner most recently viewed by a user as determined from user activities.

LastUserActivity: an attribute tracking the amount of time (e.g., the number of minutes, etc.) that has passed since a user last interacted with a tuner. This attribute can be used to help set a value for another attribute "UserActive". The setting of "UserActive" may be based on a difference between the current system time and an InteractionTime for the tuner. Here, the InteractionTime may represent a system timestamp (e.g., a time value that increases as long as the system is running, etc.) of the last remote activity received for the tuner.

In some embodiments, in response to a device claiming the ownership of a tuner, the InteractionTime for the tuner is set to the current system time; and the LastUserActivity goes to 0. In some embodiments, in response to a remote pressing activity being received for a tuner while a user interacts with the tuner, the InteractionTime for the tuner is set to the current system time; and the LastUserActivity goes to 0. In some embodiments, when the system resets, the system's CurrentTime is reset to 0; the InteractionTime for each tuner in the system is reset to 0; and the LastUserActivity goes to 0.

UserActive: an attribute such as a Boolean (e.g., "true" or "false", "1" or "0", etc.), etc., to track whether the user has interacted with a tuner recently. The activity timeouts for a foreground tuner and a background tuner differ. A foreground tuner may be transitioned into a background tuner if no user activity with the tuner is detected within a foreground activity timeout such as a remote control idle timeout, etc. Any tuner that is not the foreground tuner may be considered by the system as a background tuner. A background tuner may be transitioned from an active state to an inactive state if no user activity with the tuner is detected within a background activity timeout such as a focus timeout (e.g., a further time period of 15 minutes, 30 minutes, etc., after a tuner was placed in the background state upon a 90 minutes, 120 minutes, etc., time period of no activity, etc.), etc. A Focus Timeout refers to an amount of time after a tuner is put into the background (loses focus) before the tuner becomes inactive. This only applies to background tuners. The value is set at 15 minutes, 30 minutes, etc. If the LastUserActivity of a tuner is less than the activity timeout, then the "UserActive" attribute is true (e.g., a Boolean value of "true", etc.). The "UserActive" attribute may be set to true for all tuners at a startup of the system since the last remote activity was reset to the current system time (e.g., 0, etc.) upon the startup of the system. Here, the term "startup" may refers to a startup of a tuner-equipped device (e.g., a DVR) with tuners in the system that includes the tuner-equipped device and zero or more networked devices—which may have been started, are being started, or will be started at a later time—that may request tuners from the tuner-equipped device.

InputStatus: an attribute that defines what (e.g., tuner activity, etc.) a tuner is doing right now, what state the tuner is in, etc. Examples of tuner activities include but are not limited only to: any of the following.

LiveCaching: The tuner is temporarily saving video from live TV into a video cache. The cache stores a series of clips that are added and removed to keep the most recent portion (e.g., the size of which may be determined by a parameter such as a CACHE_SIZE, etc.) of live playback as captured by the tuner with current tuning data. A user can access the cache by tuning to the tuner, use trick plays with the cache, perform (e.g., by pressing a REC control, etc.) a live cache conversion to convert the existing cache into a recording, which can then span more than the size of the most recent portion supported by the cache. The tuner activity of "LiveCaching" may correspond to the default state of a tuner subject to exceptions related to power-saving policies implemented by the system.

UserRecording: A tuner is in this state is saving user-requested video to disk that can be accessed as a recording, for example, in My Show. For example, the user has requested this recording either by a single-explicit request, a WishList or Season Pass.

FuzzyRecording: A tuner in this state is recording video that the user did not explicitly request (e.g., system-generated suggestions for a user without the user explicitly identifying the suggestions, etc.). Content such as video, etc., in FuzzyRecording is non-user-requested, whereas content in UserRecording as described above is user-requested.

LiveStreaming: A tuner in this state is being used by a networked device to watch live TV.

VOD: A tuner in this state is being used to watch video on demand. As used herein, VOD refers to a video-on-demand technology that requires a tuner when in use.

ExclusiveLocked: A tuner in this state may not be used for any other activities until it is released or another process tries to break the lock. Tuner locks are reserved for a small subset of scenarios, e.g., a process (e.g., to show emergency alert messages, etc.) that requires all tuners.

EAM: A tuner in this state is tuned to an emergency alert message (EAM). An EAS refers to an Emergency Alert System, which issues Emergency Alert Messages. These are tuner tasks that are broadcast by a government in case of emergency (usually a request to tune to a certain channel). Any device with a CableCARD in it must act upon this tuner task, canceling any other tuner tasks that may otherwise be in progress.

PendingRecording: This state (e.g., status, tuner activity, etc.) is a kind of lock which indicates that a tuner is being reserved to begin recording a (e.g., user-requested, non-user-requested, etc.) recording. This status may change or transition into UserRecording or FuzzyRecording.

PendingCacheConversion: This state (e.g., status, tuner activity, etc.) is a kind of lock which indicates that a tuner is being reserved to begin recording a recording from a user's in-progress live TV session. This status may be an intermediate status from LiveCaching to UserRecording.

Idle: If a tuner is not performing any tuner tasks, it is said to be in the idle state. An idle tuner may not be (a) currently owned, (b) active or (c) in the foreground. The idle state may be used with power-saving (e.g., system, user-specified, etc.) policies/settings/preferences.

CurrentTuningData: the channel that the tuner is currently tuned to.

CurrentOwner: a reference to the device that is currently using the tuner on its output. In some embodiments, a device may be limited to owning up to a set number (e.g., 1, 2, etc.) of tuners at any given time. This attribute is cleared (e.g., set to zero, null, etc.) when the device relinquishes the tuner. The device may be deemed to relinquish the tuner, for example, after a timeout related to the foreground state expires or lapses with no response from a user when prompted by a confirmation dialog, after a user goes to a UI with no picture in guide (PIG), after a playback of a recording starts, after an exclusive lock is placed on all tuners, etc. In some embodiments, an owned tuner is physically located on a tuner-equipped device (e.g., DVR, etc.) but currently being used watch live TV or VOD on a (e.g., tuner-less, etc.) tuner client device. In some embodiments, an owned tuner is placed in a foreground state. The number of owned tuners by a tuner client device may be limited to a set number at a given time.

LastOwner: a reference to a device that last used the tuner on its output. Only one tuner can be marked as having the device as its last owner (e.g., when a device is marked as a LastOwner on one tuner, any other reference to the device as another tuner's LastOwner is removed).

As used herein, "tuner ownership," "tuner owned," or "tuner being owned" relates to a state of a tuner in which the tuner is mapped to a device to indicate that the tuner is currently in use on that device. In some embodiments, a tuner ownership is a one-to-one relationship between a tuner and a device such that only one device can own a tuner at any given time. In some embodiments, some or all (e.g., tuner client devices only, tuner client devices and tuner-equipped devices, etc.) of devices may be restricted in terms of concurrent ownerships such that a device (e.g., a tuner client device only, a tuner client device or a tuner-equipped device, etc.) can only own one tuner—or two tuners, or some other number of tuners the system is configured with or preconfigured with—at a time. A tuner ownership can be a temporary state, for example, until the owning device relinquishes, be deprived of, etc., the tuner ownership.

In some embodiments, in addition to tracking the current owner of a tuner, a tuner sharing system or a tuner-equipped device therein is configured to track the device that last owned the tuner. The last ownership of a tuner may be used to support tuner selection operations such as tuner swapping, tuner toggling, etc. These operations may require information about last ownerships of tuners involved in the operations, in addition to the current tuner ownerships.

In some embodiments, a user can give up a tuner, for example, by going to a user interface (UI) screen without picture in guide (PIG), etc. When the user subsequently enters live TV, the system may be configured to use the last ownership of the tuner to determine which tuner (e.g., the same tuner last owned by the user, etc.) should be given to the user.

In some embodiments, the last ownership of a tuner is a one-to-one relationship between a tuner and a device such that only one device can be marked as the last owner of the tuner at any given time.

In some embodiments, a tuner ownership is relinquished, expired, deprived of, etc., when any of the following events occur: a. a time out of a certain duration such as 90 minutes, etc., in which qualified user activities are absent occurs; b. a user of the owning device goes to a UI screen without PIG; c. a playback of a recording (which does not require a tuner) starts; d. an exclusive lock on the tuner is granted (e.g., to another device, process, user, operation, mode, tuner activity, etc.); e. a user-initiated release of tuner occurs, for example, via Info Banner (e.g. while in live TV press INFO, SELECT & select option to "Stop watching live TV", press & hold LIVE TV+CLR, etc.); etc.

In some embodiments, tuner client devices can be limited to own a certain number of tuners collectively (e.g., three for some or all of tuner client devices, etc.) or individually (e.g., one per tuner client device, two for a particular tuner client device, etc.).

In some embodiments, one or more tuners are specifically reserved, assigned, etc., to a tuner-equipped device for ownerships. A reserved tuner refers to a tuner on a tuner-equipped device that has been set aside for use by clients to either watch live TV or VOD. Reserved tuners can be borrowed (e.g., temporarily, etc.), but can never be recording. The reserved tuners can be located on the tuner-equipped device and used to prevent or reduce the need to prompting users on the tuner-equipped device and on tuner client devices that might have ownerships of tuners needed by the tuner-equipped device. In these embodiments, a tuner ownership is not taken away from the tuner-equipped device even if there is no qualified user activity occurring on the tuner-equipped device for a time duration that equals a time out for ownership relinquishing that is applicable to other devices. Additionally or optionally, a user of the tuner-equipped device can comes back to a tuner (e.g., for live TV, etc.) even if the user has been engaging in an activity (e.g., recording playback, etc.) that does not use a tuner.

In some embodiments, a tuner that is not currently owned may enter an idle mode after an additional time period (e.g., 15 minutes, 30 minutes, etc.). In some embodiments, a tuner that is in a pause state may not enter the idle mode even if there is a long time period of inactivity.

4.0 End-to-End Tuner Task Request Handling

Figure 3A:
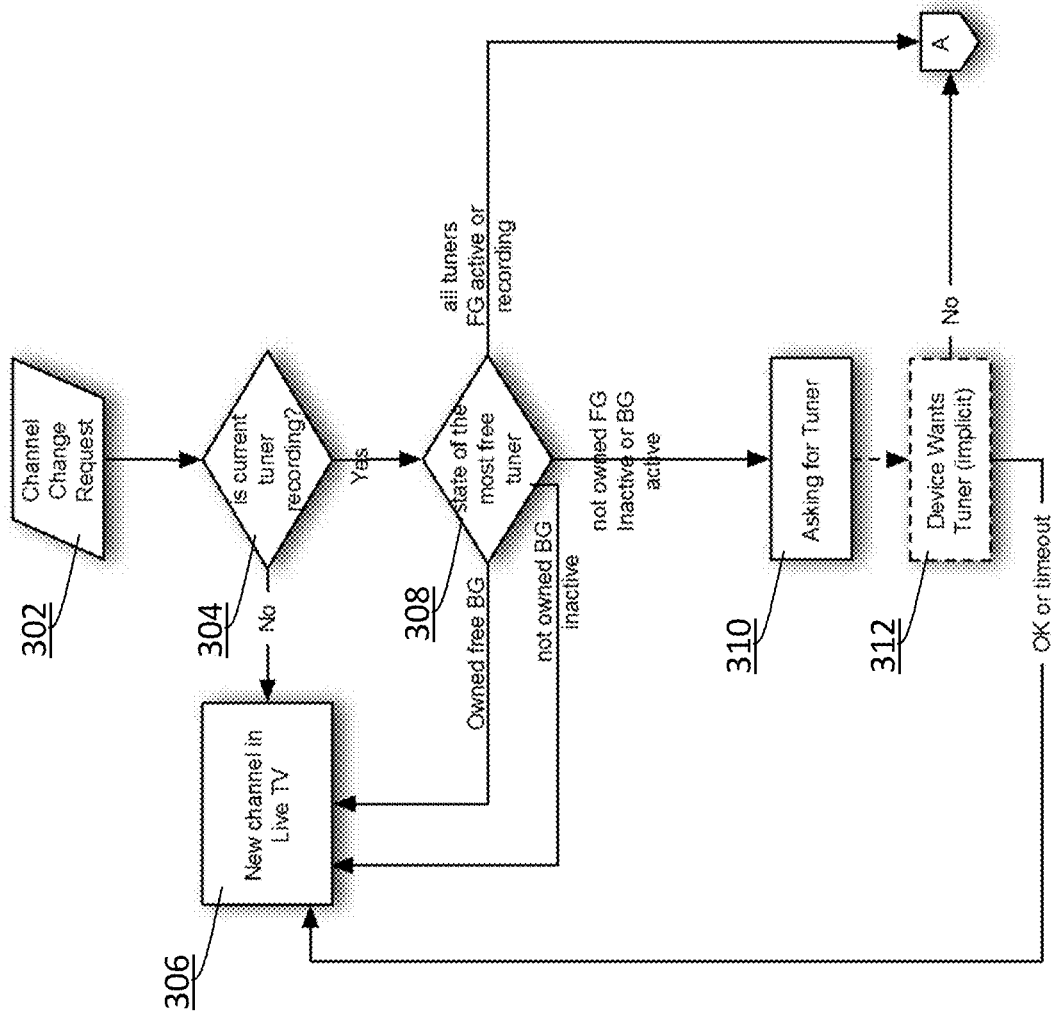
FIG. 3A and FIG. 3B illustrate an example flow diagram for channel change.

Techniques as described herein can be used to support handling user-initiated or system-initiated requests relating to a variety of tuner tasks. For the purpose of illustration only, FIG. 3A illustrates an example flow diagram for channel change. In some embodiments, after a requester makes a tuner request (302), a tuner sharing system may be configured to present a display to the requester as shown in FIG. 6G. In block 304, in response to receiving the tuner request (302) for a channel change from a current channel to a requested channel (e.g., as identified in the tuner request, etc.), the system may be configured to determine whether the tuner currently owned by the requester (e.g., a device sends the tuner request, a DVR user sends the request, etc.) is recording on the current channel. In some embodiments, if it is determined that the tuner is not recording on the current channel, the system may be configured to select the tuner to satisfy the tuner request and tune the tuner from the current channel to the requested channel (306). In some embodiments, if it is determined that the tuner is recording on the current channel, in block 308, the system may be configured to filter out unavailable tuners from a plurality of tuners, sort the remaining tuners if any, and locate the state of the most free tuner if any. In some embodiments, the system may select a tuner in one of an owned free background tuner state, a not owned background state, an inactive state, etc., to tune to the requested channel (306) in satisfying the tuner request (302).

In some embodiments, in block 310, the system may ask for a user's permission—in some embodiments, a timeout occurred when the user fails to respond may be taken as a permission; in some other embodiments, a timeout occurred when the user fails to respond may be taken as a refusal—to take a tuner in one of a not owned foreground tuner state, an inactive background state, a background active state, etc., in order to use the tuner to satisfy the tuner request. For example, a dialog (312), a message, etc., may be displayed to the user. If the user refuses to give the permission to use the tuner, the process flows to block A. However, if the user gives the permission to use the tuner, the system may be configured to tune the tuner to the requested channel (306) in satisfying the tuner request (302).

In some embodiments, in block 308, the system may determine that there exists no tuner available without asking for permission and that there also exists no tuner for which permission may be sought through a dialog (312), message, etc. For example, all tuners may be in foreground active or recording on different channels. If that is the case, the system may be configured to present to the requester a display such as FIG. 6H and the process flow goes to block A.

Figure 3B:
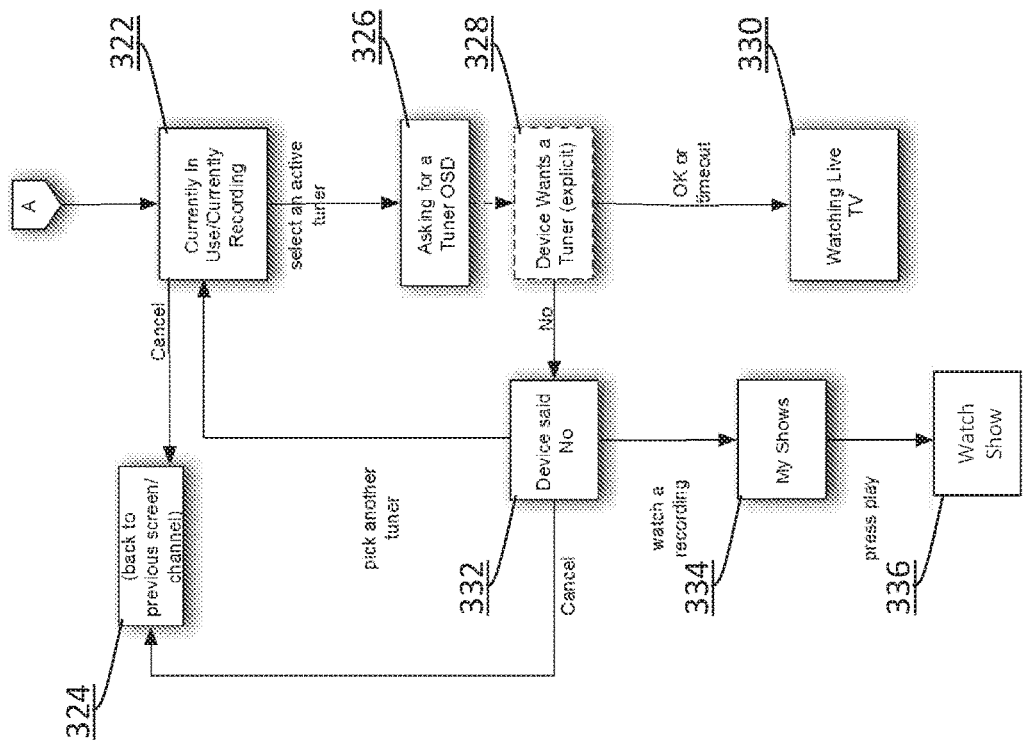

In some embodiments, in block A, the system may be configured to reject the tuner request and ends the processing of the tuner request. In some embodiments, in block A, the system may be configured to start executing an example process flow as shown in FIG. 3B, which gives the requester more options (e.g., to ask for a tuner from another device or user, to watch a recording, etc.). For example, in block 322, the system may be configured to present to the requester a display with options to cancel the tuner request, to select an active tuner for asking a user's (e.g., tuner owner's, etc.) permission, etc. If the requester chooses to cancel the request in block 322, the requester may be back to a previous screen/channel (e.g., the current channel being recorded when the tuner request for channel change was made, etc.) before the tuner request was made. If the requester chooses to select an active tuner for asking a user's permission, the system may be configured to select an active tuner perhaps among a plurality of active tuners and ask for a user's permission to use the active tuner (which means the current tuner activity with the active tuner would be canceled most likely) with a dialog (328).

In some embodiments, the tuner to be requested in a dialog (e.g., 312, 328, etc.) is implicitly selected by the system based on, for example, tuner attributes (e.g., least active, user active, etc.) without the requester identifying the tuner. In some embodiments, the tuner to be requested in a dialog (e.g., 312, 328, etc.) is explicitly confirmed by the requester; for example, the system may select an actively used tuner one by one in an order based on tuner attributes (e.g., the owner in the living room, the owner in the media room, the tuner is least active, the tuner is more active, etc.); the requester still needs to explicitly confirm that this is a tuner for which a request for a user's permission is to be displayed, presented, etc.

If the user gives the permission to use the active tuner, in block 330, the system may be configured to tune the active tuner to live TV in the requested channel (306) in satisfying the tuner request (302). Otherwise, if the user refuses to give the permission to use the active tuner, in block 332, as shown in FIG. 6I, the system may be configured to present to the requester options to cancel the request, to pick another active tuner if there still exists an active tuner for which a user's permission may be sought, to watch "my shows" (e.g., recorded programs for which viewing does not require a tuner, etc.), etc. If the requester chooses to watch my shows, in block 334, the system may present a list of recorded programs for "my shows". In response to receiving the requester's selection of a recorded program in block 336, the system may present the selected recorded program to the requester.

Tuner selection processes, operations, tuner conflict check processes, operations, etc., as described herein may be implemented by a tuner selection unit (e.g., 120 of FIG. 1, etc.) as a part of process flows as illustrated in FIG. 3A and FIG. 3B. For example, filtering, sorting, conflict checking, etc., may be implemented in one or more of the process flows of FIG. 3A and FIG. 3B, etc.

In some embodiments, the system is configured to concurrently handle two or more tuner requests. In some embodiments, the system is configured to serialize two or more requests and at any given time to perform tuner selection and conflict checking for one tuner request; a display such as FIG. 6J may be presented to one or more requesters that are being placed in waiting states.

5.0 Live TV Tuner Requests

Figure 4A:
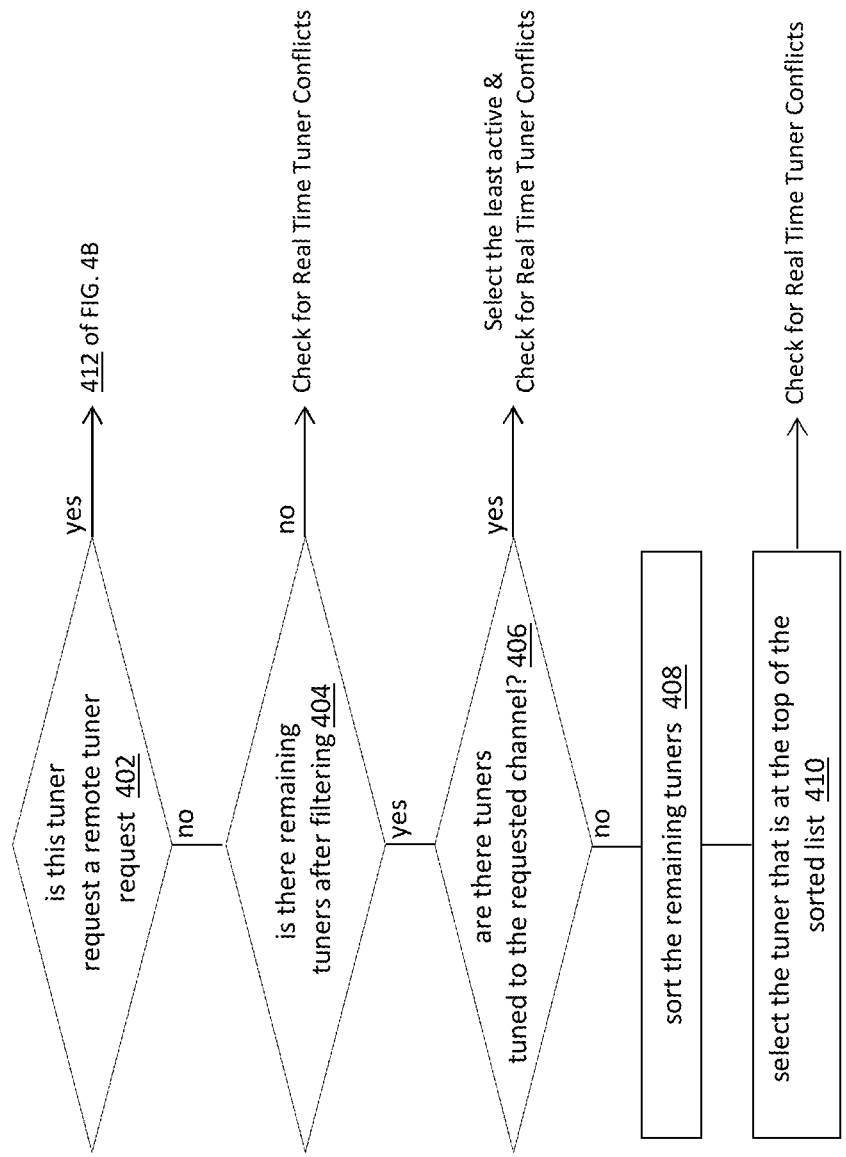
FIG. 4A through FIG. 4H illustrate example tuner selection operations.

FIG. 4A illustrates an example tuner selection process flow that may be performed in response to a live TV tuner request. The example process may be performed by one or more computing devices such as a tuner-equipped device in a tuner sharing system. A live TV tuner request is a request for a tuner to watch live TV at a requested channel. The request can be triggered, without limitation, in any of the following scenarios: when a user presses a LIVE TV button from a user interface; when a user selects an in-progress show in a program guide; when a user selects "Watch now . . . from live TV" from a display; when a user interface display times out to live TV, when a playback of QAM VOD asset ends (the tuner request may be sent with information identifying a previously tuned channel that was used before the playback); when a user changes channel in the live TV context (e.g., which may include changes channel to a VOD channel, etc.); etc.

In block 402, the tuner-equipped device, or a tuner selection unit therein, determines whether a received live TV tuner request is a remote tuner request. A remote tuner request refers to a tuner request from a tuner client device. If that is the case, the process flow goes to block 412 of FIG. 4B. Otherwise, the process flow goes to block 404.

In block 404, the tuner-equipped device filters out (e.g., exclude for tuner selection, etc.) all tuners for which any of the following is true: a. Tuner is locked (e.g., InputStatus=ExclusiveLocked, etc.), b. Tuner is performing a cache conversion (e.g., InputStatus=PendingCacheConversion, etc.), c. Tuner is owned by another device (e.g., a tuner has been assigned to the other device and is in the foreground state), d. Tuner is disabled (e.g., Enabled=False, etc.), etc. Subsequently, the tuner-quipped device determines whether there is any tuner remaining for tuner selection. If not, the process flow goes to "Check for Real-Time Tuner Conflicts" operations. Otherwise, the process flow goes to block 406.

In block 406, the tuner-equipped device determines whether there already exist one or more tuners tuned to the requested channel. If so, the tuner-equipped device selects the least active of these tuners and the process flow goes to "Check for Real Time Tuner Conflicts" operations. Otherwise, the process flow goes to block 408.

It should be noted that this process flow may be a part of an overall process that moves a user of the tuner-equipped device from one tuner to another tuner. For example, the user on behalf of which the tuner request was made may presently own a tuner, which may be given up implicitly upon the system assigning a new tuner to the tuner client device. In some embodiments, the user may be moved to a tuner already tuned to the requested channel for which the tuner has captured an existing cache. Such a tuner move from one tuner a user had to another tuner with an existing cache of the selected tuner may be referred to as an implicit tuner swap. A tuner swap, whether explicit or implicit, may comprise a move of a new tuner from the background to the foreground for a requester, and a correlated move of the requester's current tuner from the foreground to the background.

In block 408, the tuner-equipped device sorts the remaining tuners, for example, based on the following tuner attribute values/states: a. Least active (e.g., LastUserActivity from highest to lowest, etc.); b. Idle state, such that tuners where Idle="true" are listed first; c. Owned last, such that any tuner whose LastOwner is the requesting tuner client device is listed first; d. Currently owned, such that any tuner whose CurrentOwner is the requesting device is listed first; etc.

In some embodiments, if a channel number is specified, the ordered tuners may be further sorted based on the following tuner attribute values/states: e. Fuzzy Recording (e.g., Suggestion, etc.), such that tuners whose InputStatus=FuzzyRecording are brought to the top; f. Not Recording, such that any tuners that have an InputStatus other than FuzzyReocrding or UserRecording are brought to the top; etc.

In some embodiments, if more than one factor is applicable among factors b through f, whichever factor listed first above controls. In some other embodiments, if more than one factor is applicable among factors b through f, the tuner-equipped device may implement a specific precedence order to determine which of multiple applicable factors applies (e.g., first, etc.).

In block 410, the tuner-equipped device selects the tuner that is at the top of the sorted list and the process flow goes to "Check for Real Time Tuner Conflicts" operations.

5.1 All Live Caching

In a first example, consider a scenario in which all tuners (with ID 0, 1, 2 and 3) are caching respectively on channels 2, 3, 4 and 5, and a user of the tuner equipped device (e.g., a DVR, etc.) is watching channel 2 and now changes to channel 200 to trigger a live TV tuner request.

The tuners are initially in the states as shown in the following table:

TABLE 2

| ID | Status | Last Activity | Owner | Last Owner | Channel |
|---|---|---|---|---|---|
| 0 | Live Caching | 3 | DVR | — | 2 |
| 1 | Live Caching | 10 | — | — | 3 |
| 2 | Live Caching | 15 | — | — | 4 |
| 3 | Live Caching | 50 | — | — | 5 |

The process flow of FIG. 4A applies to this live TV tuner request for a requested channel 200 as the request is not a remote tuner request. In this scenario, the tuner-equipped device does not exclude any tuner in block 404. The tuner-equipped device also determines that there is no existing tuner tuned to the requested channel 200 in block 406.

The tuner-equipped device first sorts the remaining tuners (all the tuners, in this scenario) based on tuner attribute values related to "Last Activity" into the following order: tuner 3, tuner 2, tuner 1, and tuner 0. The values of the tuner attributes "Idle" and "Owned Last" have no effects as these values are the same among all the tuners. The tuner-equipped device then sorts the currently ordered tuners based on tuner's attribute values related to "Currently Owned," into the following order: tuner 0, tuner 3, tuner 2, and tuner 1 by moving tuner 0 to the top of the remaining tuners.

Since the requested channel number is specified in the tuner request, the tuner-equipped device further attempts to sort the currently ordered tuners based on tuner attribute values of a. Fuzzy Recording and b. Not Recording. Since none of the remaining tuners is in "Fuzzy Recording" and all of the remaining tuners are in "Not Recording," the current order of the remaining tuners is not changed.

In this example, in block 410, the tuner-equipped device selects tuner 0 at the top of the tuner list as ordered in the previous steps, determines that tuner 0 can be tuned to the requested channel 200 and assigns tuner 0 to the user in response to the live TV tuner request. With tuner 0, the user would tune to channel 200 with no cache. Cache of tuner 0 for channel 2 may be lost. As a result, the tuners are now respectively tuned to 200, 3, 4 and 5 in "Live Caching" as indicated in the following table:

TABLE 3

| ID | Status | Last Activity | Owner | Last Owner | Channel |
|---|---|---|---|---|---|
| 0 | Live Caching | 3 | DVR | — | 200 |
| 1 | Live Caching | 10 | — | — | 3 |
| 2 | Live Caching | 15 | — | — | 4 |
| 3 | Live Caching | 50 | — | — | 5 |

5.2 All Recording

In a second example, consider a scenario in which all tuners (with ID 0, 1, 2 and 3) are recording respectively on channels 2, 3, 4 and 5, and a user of the tuner equipped device (e.g., a DVR, etc.) is watching channel 2 and now changes to channel 200 to trigger a live TV tuner request.

The tuners are initially in the states as shown in the following table:

TABLE 4

| ID | Status | Last Activity | Owner | Last Owner | Channel |
|---|---|---|---|---|---|
| 0 | User Recording | 3 | DVR | — | 2 |
| 1 | User Recording | 10 | — | — | 3 |
| 2 | User Recording | 15 | — | — | 4 |
| 3 | User Recording | 50 | — | — | 5 |

The process flow of FIG. 4A applies to this live TV tuner request for a requested channel 200 as the request is not a remote tuner request. In this scenario, the tuner-equipped device does not exclude any tuner in block 404. The tuner-equipped device also determines that there is no existing tuner tuned to the requested channel 200 in block 406.

The tuner-equipped device first sorts the remaining tuners (all the tuners, in this scenario) based on tuner attribute values related to "Last Activity" into the following order: tuner 3, tuner 2, tuner 1, and tuner 0. The values of the tuner attributes "Idle" and "Owned Last" have no effects as these values are the same among all the tuners. The tuner-equipped device then sorts the currently ordered tuners based on tuner's attribute values related to "Currently Owned," into the following order: tuner 0, tuner 3, tuner 2, and tuner 1 by moving tuner 0 to the top of the remaining tuners.

Since the requested channel number is specified in the tuner request, the tuner-equipped device further attempts to sort the currently ordered tuners based on tuner attribute values of a. Fuzzy Recording and b. Not Recording. Since none of the remaining tuners is in "Fuzzy Recording" and all of the remaining tuners are in "Not Recording," the current order of the remaining tuners is not changed.

In this example, in block 410, the tuner-equipped device selects tuner 0 at the top of the tuner list as ordered in the previous steps. However, since tuner 0 is currently in "User Recording" in channel 2, the tuner-equipped device determines that tuner 0 cannot be tuned to the requested channel 200, and rejects the tuner request with a reason "All Tuners Recording" (e.g., all user recording, no fuzzy recording, no live caching, etc.). As a result, the tuners are still respectively tuned to 2, 3, 4 and 5 in "User Recording" as indicated in TABLE 4.

5.3 Live Cache—Implicit Tuner Swap

In a third example, consider a scenario in which all tuners (with ID 0, 1, 2 and 3) are caching respectively on channels 2, 3, 4 and 5, and a user of the tuner equipped device (e.g., a DVR, etc.) is watching channel 2 and now changes to channel 3 to trigger a live TV tuner request.

The tuners are initially in the states as shown in Table 2. The process flow of FIG. 4A applies to this live TV tuner request for a requested channel 3 as the request is not a remote tuner request. In this scenario, the tuner-equipped device does not exclude any tuner in block 404. The tuner-equipped device also determines that there is an existing tuner (tuner 1) tuned to the requested channel 3 in block 406. Since there is only one tuner presently tuned to the requested channel 3 in this example, in block 410, the tuner-equipped device selects tuner 1, assigns tuner 1 to the user in response to the live TV tuner request. With tuner 1, the user would tune to channel 3 with an existing cache of tuner 1. As a result, the tuners are now still tuned to 2, 3, 4 and 5 in "Live Caching" as indicated in the following table:

TABLE 5

| ID | Status | Last Activity | Owner | Last Owner | Channel |
|---|---|---|---|---|---|
| 0 | Live Caching | 3 | — | DVR | 2 |
| 1 | Live Caching | 0 | DVR | — | 3 |
| 2 | Live Caching | 15 | — | — | 4 |
| 3 | Live Caching | 50 | — | — | 5 |

5.4 Channel Change after an Implicit Tuner Swap

In a fourth example, consider a scenario in which all tuners (with ID 0, 1, 2 and 3) initially are caching respectively on channels 2, 3, 4 and 5. Then, a user of the tuner equipped device (e.g., a DVR, etc.) who is watching channel 2 changes to channel 3 to trigger a first live TV tuner request. After switching to channel 3, the user changes to channel 200 to trigger a second live TV tuner request. A channel change cancels whatever tuner task/activity is currently on a tuner, tunes the tuner to a different channel, and/or (potentially) starting a recording of the content found at the different location. A channel change may specifically refer to a change of tuner task/activity caused by user input, not caused by a scheduled event like a recording requested by a scheduler.

The tuners are initially in the states as shown in Table 2. The process flow of FIG. 4A applies to the first live TV tuner request for a requested channel 3 as the first request is not a remote tuner request and results a successful assignment of tuner 1 to the user as indicated in Table 5.

The process flow of FIG. 4A then applies to the second live TV tuner request for a requested channel 200 as the second request is also not a remote tuner request. In this scenario, the tuner-equipped device does not exclude any tuner in block 404. The tuner-equipped device also determines that there is no existing tuner tuned to the requested channel 200 in block 406.

The tuner-equipped device first sorts the remaining tuners (all the tuners, in this scenario) based on tuner attribute values related to "Last Activity" into the following order: tuner 3, tuner 2, tuner 0, and tuner 1. The tuner-equipped device then sorts the currently ordered tuners based on tuner's attribute values related to "Owned Last" into the following order: tuner 0, tuner 3, tuner 2, and tuner 1 by moving tuner 0 to the top of the remaining tuners. In some embodiments, this is the first applicable factor after the remaining tuners are sorted based on "Last Activity." In some embodiments, this first applicable factor controls; other subsequent factors may be skipped.

In this example, in block 410, the tuner-equipped device selects tuner 0 at the top of the tuner list as ordered in the previous steps, determines that tuner 0 can be tuned to the requested channel 200 and assigns tuner 0 to the user in response to the second live TV tuner request. With tuner 0, the user would tune to channel 200 with no cache. Cache of tuner 0 for channel 2 may be lost. As a result, the tuners are now respectively tuned to 200, 3, 4 and 5 in "Live Caching" as indicated in the following table:

TABLE 6

| ID | Status | Last Activity | Owner | Last Owner | Channel |
|---|---|---|---|---|---|
| 0 | Live Caching | 0 | DVR | — | 200 |
| 1 | Live Caching | 1 | — | DVR | 3 |
| 2 | Live Caching | 15 | — | — | 4 |
| 3 | Live Caching | 50 | — | — | 5 |

5.5 No Tuner Available

In a fifth example, consider a scenario in which all tuners (with ID 0, 1, 2 and 3) are owned respectively on channels 2, 3, 4 and 5, and a different user (e.g., client 4, etc.) of the tuner equipped device (e.g., a DVR, etc.) now request a tuner to watch live TV to trigger a live TV tuner request.

The tuners are initially in the states as shown in the following table:

TABLE 7

| ID | Status | Last Activity | Owner | Last Owner | Channel |
|---|---|---|---|---|---|
| 0 | Live Caching | 3 | DVR | — | 2 |
| 1 | User Recording | 10 | Client1 | — | 3 |
| 2 | Live Streaming | 15 | Client2 | — | 4 |
| 3 | Live Streaming | 50 | Client3 | — | 5 |

The process flow of FIG. 4A applies to this live TV tuner request as the request is not a remote tuner request. In this scenario, the tuner-equipped device does not filter out any tuners because it is determined that a. Tuner is locked (e.g., InputStatus=ExclusiveLocked, etc.), or b. Tuner is performing a cache conversion (e.g., InputStatus=PendingCacheConversion, etc.). However, the tuner-equipped device filters out all the tuners because it is determined for each of the tuners that c. Tuner is owned by another device (e.g., a tuner has been assigned to the other device and is in the foreground state). Any subsequent filtering such as those based on d. Tuner is disabled (e.g., Enabled=False, etc.), etc., may be skipped.

Accordingly, in block 404, the tuner-quipped device determines that there is no tuner remaining for tuner selection, and rejects the tuner request with a reason "No Tuners Available." As a result, the tuners are still respectively tuned to 2, 3, 4 and 5 as indicated in TABLE 7.

5.6 Additional Live Caching Examples

To process a live TV tuner request, a tuner sharing system or a tuner-equipped device therein may be configured to apply the following selection rules in order: 1. any tuner that is already on a requested channel as identified by the live TV tuner request if known is selected first; 2. selecting a tuner such as a free tuner (e.g., not currently owned, not last owned, etc.) to avoid canceling recordings, impacting tuner toggling or swapping, etc.; 3. Selecting an owned/last owned tuner (e.g., in the background state, etc.); selecting a recording tuner as a non-owned—for example, assigned to be secondarily used but not owned by a device that issues the live TV tuner request, etc.—live TV tuner if that is all that is available; etc.

Figure 2A:
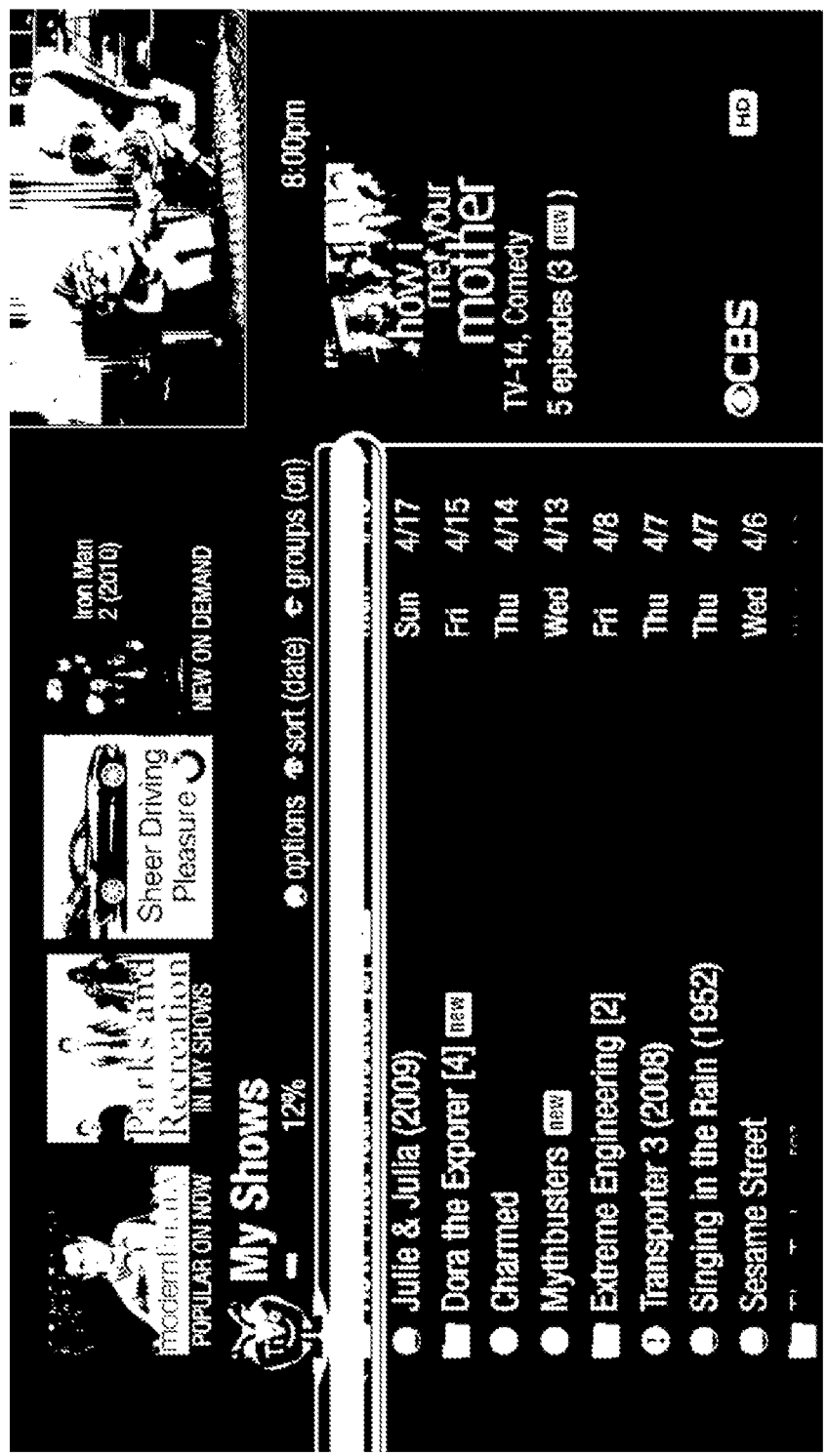
FIG. 2A through FIG. 2S illustrate example displays in connection with tuner selection operations.
Figure 2B:

In some embodiments, the system may be configured to process a live TV tuner request from a device in the PIG (picture in guide) mode, as shown in FIG. 2A, by allowing the device to move into a live TV with its presently owned tuner (for the PIG mode), as shown in FIG. 2B.

For example, a plurality of tuners in a system comprising a DVR (e.g., a tuner-equipped device, etc.) and one or more tuner client devices (e.g., iPad, Nexus, tablet computer, mobile device, etc.) may be in their respective tuner activities/states initially as indicated in the following table:

TABLE 8

| ID | Status | Last Activity | Owner | Last Owner | Channel |
|----|--------|---------------|-------|------------|---------|
| 0 | Live Caching | 3 | DVR | — | 720 |
| 1 | User Recording | 10 | — | DVR | 3 |
| 2 | Live Streaming | 15 | Client1 | — | 4 |
| 3 | Live Caching | 50 | — | — | 5 |

For the purpose of illustration only, a DVR user initially is in a PIG (picture in guide) display as shown in FIG. 2A with tuner 0 live caching a video content (e.g., channel 720, etc.) displayed in the upper-right corner of the display while the user is viewing program information (not necessarily channel 720) in the display.

After the DVR user presses a button for live TV, the DVR may filter out tuner 2 from the plurality of tuners into a set of remaining tuners as indicated in the following table:

TABLE 9

| ID | Status | Last Activity | Owner | Last Owner | Channel |
|----|--------|---------------|-------|------------|---------|
| 0 | Live Caching | 3 | DVR | — | 720 |
| 1 | User Recording | 10 | — | DVR | 3 |
| 3 | Live Caching | 50 | — | — | 5 |

The remaining tuners may be sorted so that the top of the remaining tuners may be selected in response to a tuner request generated by the DVR user's pressing of the button. In this case, tuner 0 in the remaining tuners after sorting remains at the top because tuner 0 is currently owned by the DVR user and is selected to be used by the DVR user to enter live TV with.

Figure 2C:
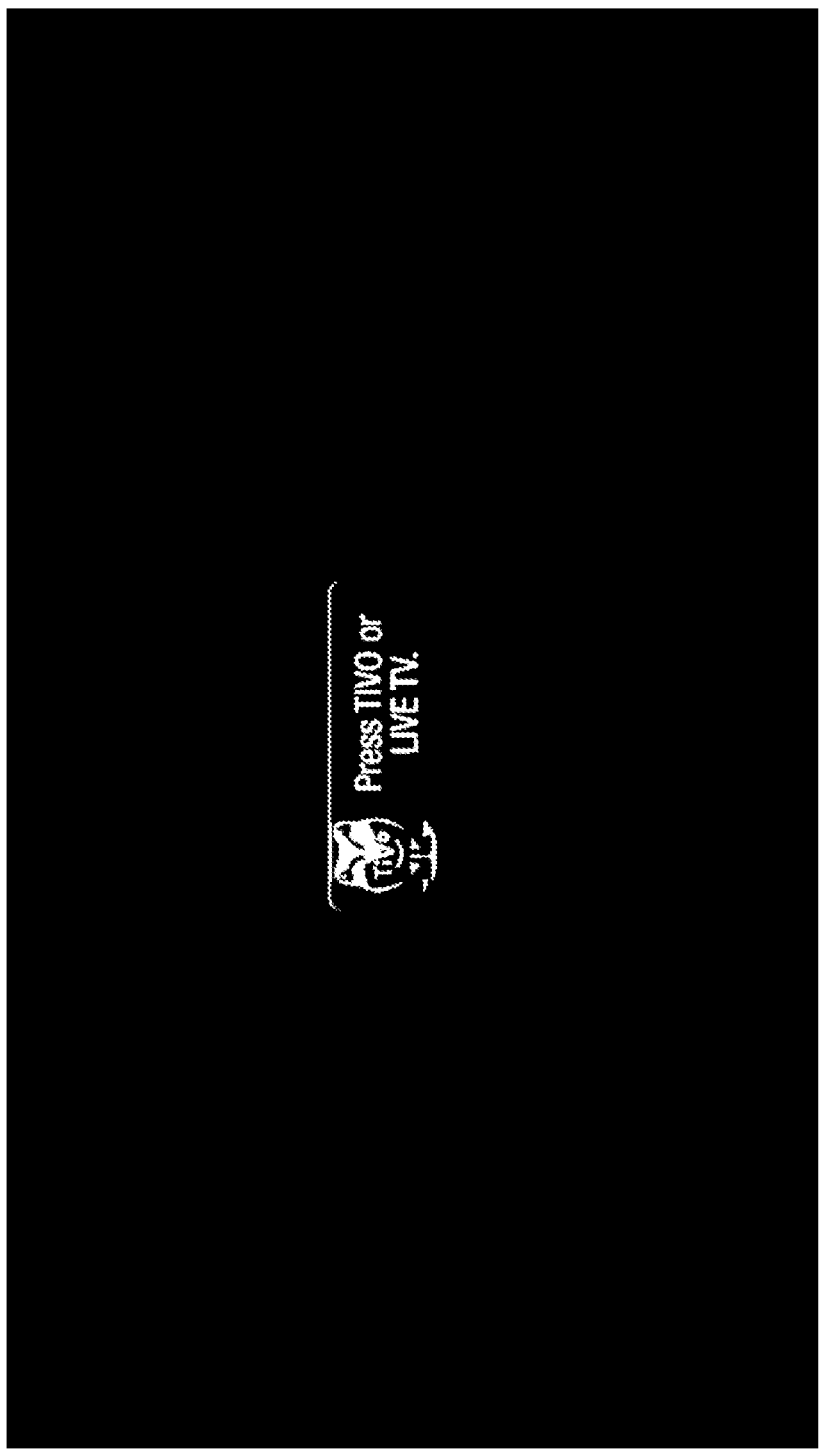
Figure 2D:

In some embodiments, the system may be configured to process a live TV tuner request from a device entering live TV for the first time (without a currently owned tuner), as shown in FIG. 2C, by allowing the device to move into a live TV with a least active eligible tuner, as shown in FIG. 2D.

For example, a plurality of tuners in a system comprising a DVR (e.g., a tuner-equipped device, etc.) and one or more tuner client devices (e.g., iPad, Nexus, tablet computer, mobile device, etc.) may be in their respective tuner activities/states initially as indicated in Table 8.

For the purpose of illustration only, a Client 2 (e.g., a mobile device, etc.) makes a live TV tuner request in order to enter live TV the first time without any tuner currently or last owned by the Client 2.

In response to receiving the live TV tuner request from Client 2, the DVR may filter out tuners 0 and 2 from the plurality of tuners into a set of remaining tuners as indicated in the following table:

TABLE 10

| ID | Status | Last Activity | Owner | Last Owner | Channel |
|----|--------|---------------|-------|------------|---------|
| 1 | User Recording | 10 | — | DVR | 3 |
| 3 | Live Caching | 50 | — | — | 5 |

The remaining tuners may be sorted so that the top of the remaining tuners may be selected, as shown in the following table:

TABLE 11

| ID | Status | Last Activity | Owner | Last Owner | Channel |
|----|--------|---------------|-------|------------|---------|
| 3 | Live Caching | 50 | — | — | 5 |
| 1 | User Recording | 10 | — | DVR | 3 |

In this case, tuner 3 in the remaining tuners after sorting is moved to the top because tuner 3 is the least (or the lesser) active of the remaining tuners and is selected to be used by the Client 2 to enter live TV with.

Figure 2E:
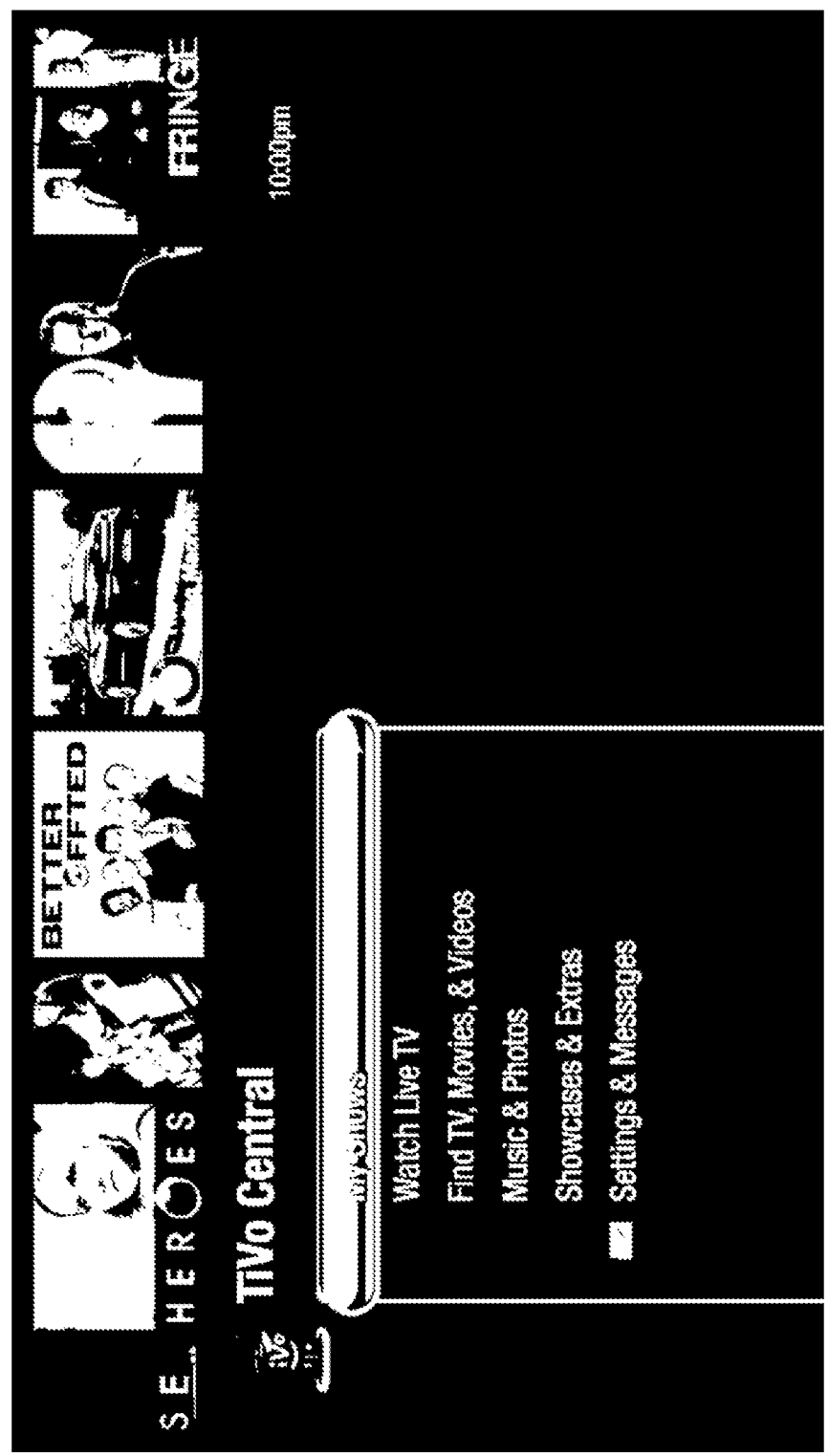

In some embodiments, the system may be configured to process a live TV tuner request from a device first entering a UI screen without PIG, as shown in FIG. 2E, from live TV, as shown in FIG. 2D, and then reentering live TV, as shown in FIG. 2D, without a currently owned tuner. The system can be configured to allow the device to move into the live TV with the same tuner that was owned by the device before entering the UI screen without PIG.

For example, a plurality of tuners in a system comprising a DVR (e.g., a tuner-equipped device, etc.) and one or more tuner client devices (e.g., iPad, Nexus, tablet computer, mobile device, etc.) may be in their respective tuner activities/states initially as indicated in the following table:

TABLE 12

| ID | Status | Last Activity | Owner | Last Owner | Channel |
|----|--------|---------------|-------|------------|---------|
| 0 | Live Caching | 3 | DVR | — | 720 |
| 1 | User Recording | 10 | — | DVR | 3 |
| 2 | Live Streaming | 15 | — | Client1 | 4 |
| 3 | Live Caching | 50 | — | — | 5 |

For the purpose of illustration only, a Client 1 (e.g., a mobile device, etc.) makes a live TV tuner request in order to re-enter live TV without any tuner currently owned by the Client 1. After the DVR user presses a button for live TV, the DVR may filter out tuner 0 from the plurality of tuners into a set of remaining tuners as indicated in the following table:

TABLE 13

| ID | Status | Last Activity | Owner | Last Owner | Channel |
|---|---|---|---|---|---|
| 1 | User Recording | 10 | — | DVR | 3 |
| 2 | Live Streaming | 15 | — | Client1 | 4 |
| 3 | Live Caching | 50 | — | — | 5 |

The remaining tuners may be sorted so that the top of the remaining tuners may be selected in response to the tuner request. In this case, tuner 2 in the remaining tuners after sorting is moved to the top because tuner 2 was last owned by Client 1 and is selected to be used by Client 1 to enter live TV with.

In some embodiments, the system may be configured to process a live TV tuner request from a device first entering a UI screen without PIG from live TV and then reentering live TV without a currently owned tuner by allowing the device to move into a live TV with a different tuner than the tuner that was owned by the device before entering the UI screen without PIG. For example, while the device is in the UI screen, the tuner the device was using is claimed by another device. Subsequently, when a user of the device directs the device to re-enter live TV, the device is assigned with another tuner (e.g., least active, etc.).

Figure 2F:
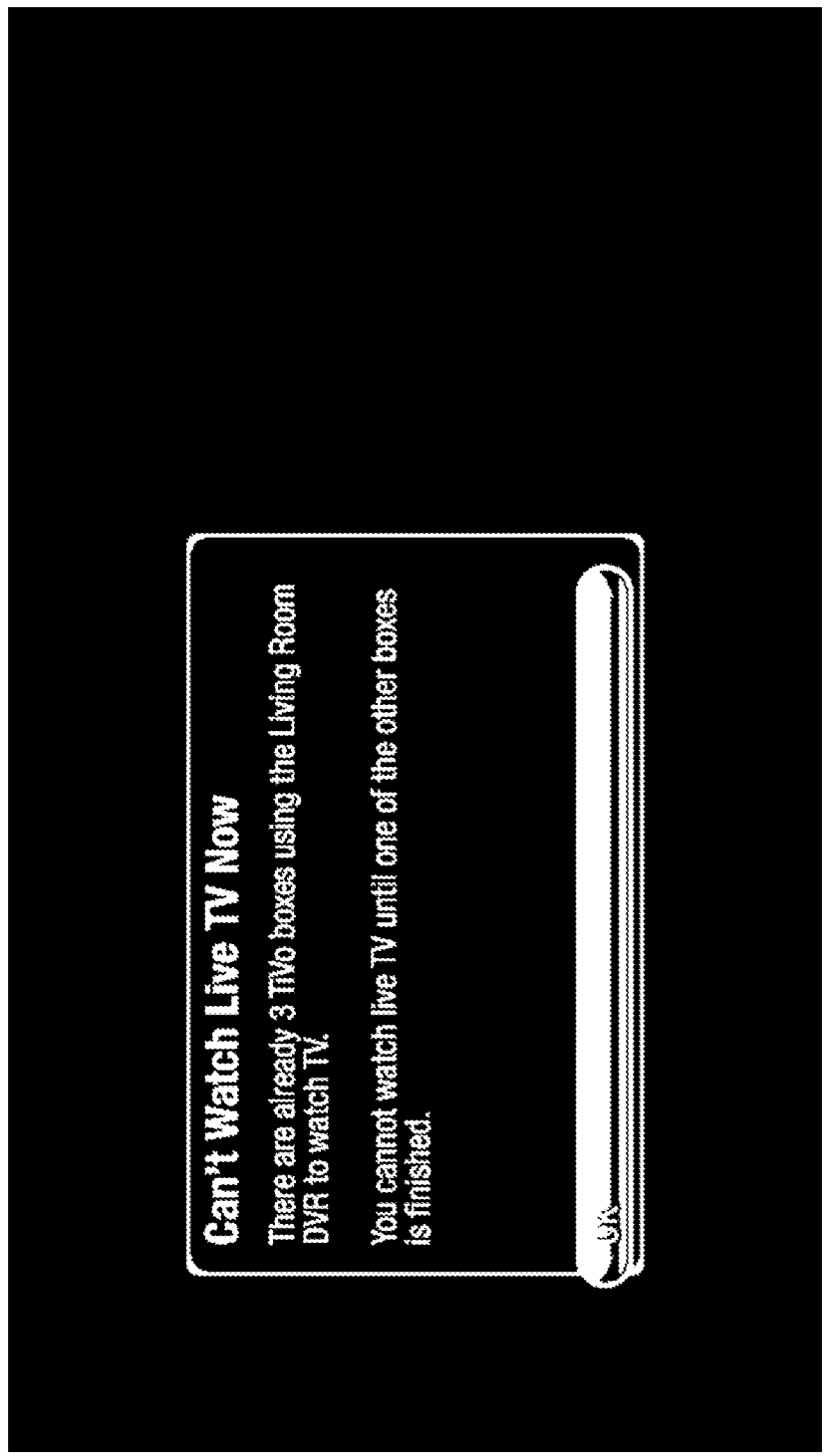

In some embodiments, the system may be configured to reject a device's tuner request, for example, when the system cannot locate a tuner for the device, when the number of outbound streams has reaches a configured maximum either individually for the device or collectively for a set of devices including the device making the live TV tuner request, when all tuners are in use, etc. A display such as shown in FIG. 2F may be presented to the user at the device.

For example, a tuner-equipped device may be configured dynamically or preconfigured to limit the number of streams below a maximum (e.g., 3 streaming clients for live TV or recording, etc.). Even if there is no such maximum configured for the number of (concurrent) streams, all tuners may be actively used on the tuner-equipped devices and other tuner client devices, when a specific tuner client device makes a live TV tuner request.

Figure 2G:
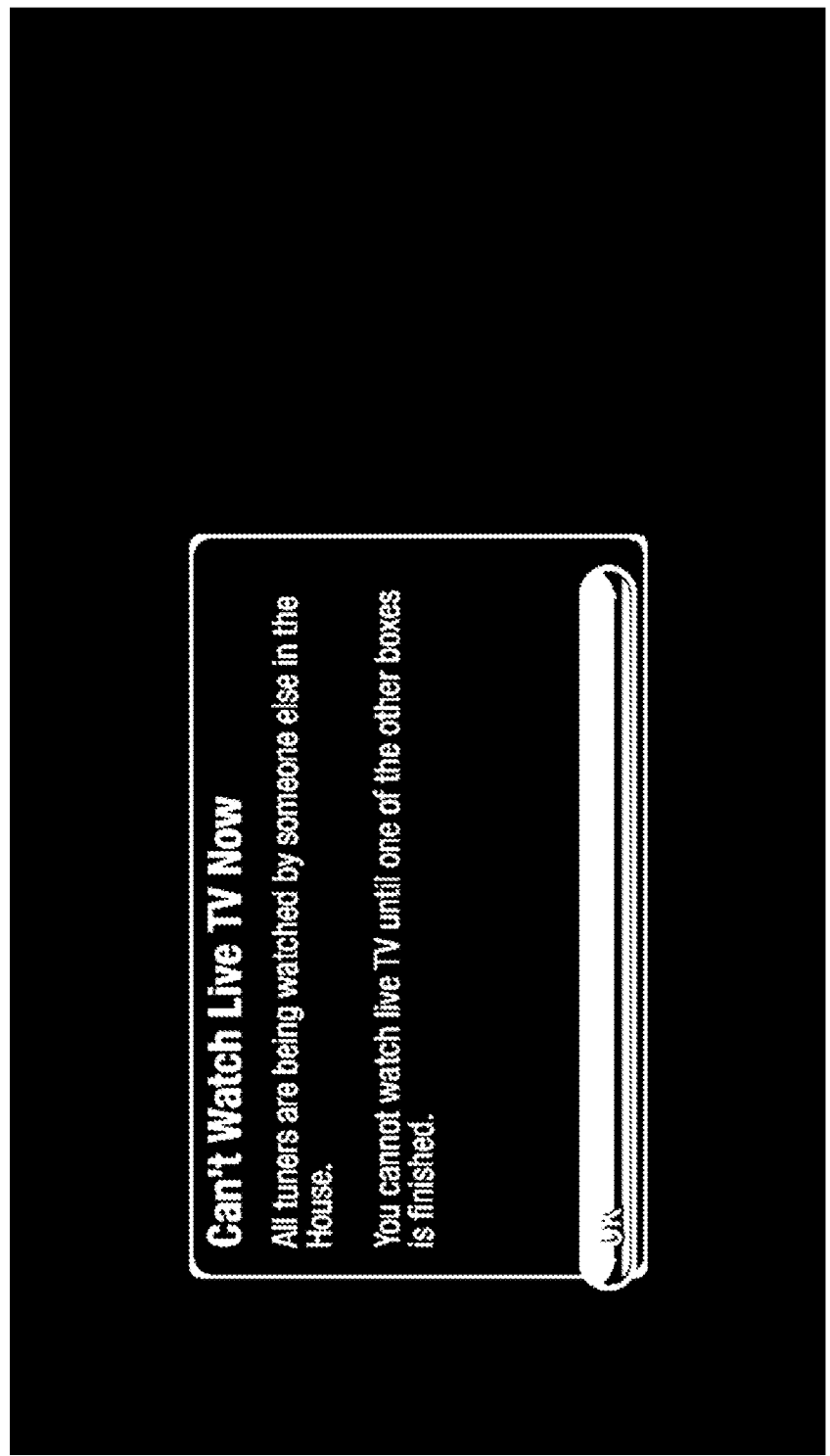

If a device requests for a live TV tuner but a tuner cannot be granted, the system may present a denial message in a dialog, a corner of a display, etc. For example, a display such as shown in FIG. 2G may be presented to the user at the device, when a tuner request is rejected because all tuners are actively used. In some embodiments, an option may be presented at a UI screen to indicate how to free up a tuner currently in use in real time, for example, by requesting the system to display, send, etc., a message to the current owner of the tuner to solicit a release of the tuner by the current owner.

6.0 Tuner Selection Process Flows for Remote Requests

Figure 4B:
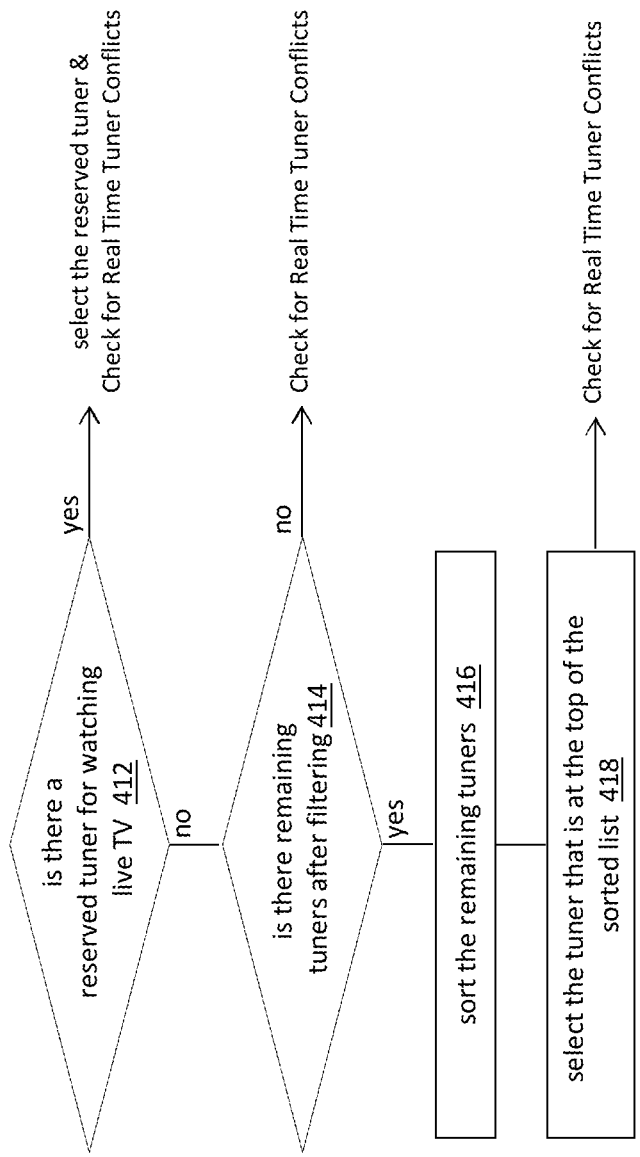

FIG. 4B illustrates an example tuner selection process flow that may be performed in response to a remote live TV tuner request. The example process may be performed by one or more computing devices such as a tuner-equipped device in a tuner sharing system. A remote live TV tuner request is a request made by a tuner client device for a tuner to watch live TV at a requested channel. The request can be triggered, without limitation, in any of the following scenarios: when a user presses a LIVE TV button from a user interface; when a user selects an in-progress show in a program guide; when a user selects "Watch now . . . from live TV" from a display; when a user interface display times out to live TV, when a playback of QAM VOD asset ends (the tuner request may be sent with information identifying a previously tuned channel that was used before the playback); etc.

In block 412, the tuner-equipped device, or a tuner selection unit therein, determines whether the tuner client device is already using a reserved tuner for watching live TV. If so, the tuner-equipped device selects the reserved tuner and the process flow goes to Check for Real Time Tuner Conflicts. If not, the process flow goes to block 414.

In block 414, the tuner-equipped device filters out (e.g., exclude for tuner selection, etc.) all tuners for which any of the following is true: a. Tuner is NOT reserved for networked devices (e.g., client tuner devices, etc.), b. Tuner is streaming live TV (e.g., InputStatus=LiveStreaming, etc.), c. Tuner is locked (e.g., InputStatus=ExclusiveLocked, etc.); etc. Subsequently, the tuner-equipped device determines whether there is at least one tuner tuned to the requested channel, which is not active (i.e. UserActive=false). If so, the tuner-equipped device filters out all other tuners that do not tune to the requested channel. Subsequently, the tuner-quipped device determines whether there is any tuner remaining for tuner selection. If so, the process flow goes to block 416. If not, the process flow goes to "Check for Real Time Tuner Conflicts" operations.

In block 416, the tuner-equipped device sorts the remaining tuners, for example, based on the following tuner attribute values/states: a. Most recently active (e.g., LastUserActivity from lowest to highest, etc.); b. Enabled state, such that tuners where Enabled="true" are listed first; etc.

In block 418, the tuner-equipped device selects the tuner that is at the top of the sorted list and the process flow goes to "Check for Real Time Tuner Conflicts" operations.

7.0 Explicit Tuner Swap

Figure 2H:
Figure 21:

In some embodiments, one or more filtering rules applied to tuners when handling tuner swap requests are the same as one or more rules applied to tuners when handling live TV tuner requests. In some embodiments, one or more sorting rules applied to tuners when handling tuner swap requests are different from those applied to tuners when handling live TV tuner requests. For example, when handling tuner swap requests, a tuner sharing system may implement one or more sorting rules that favor most (e.g., recently, etc.) active and/or favor last owned tuners by devices making the tuner swap requests. If none of the tuners is available for tuner swaps, the system may output OSD messages indicating that all tuners are in use, as shown in FIG. 2H and FIG. 2I.

Figure 4C:
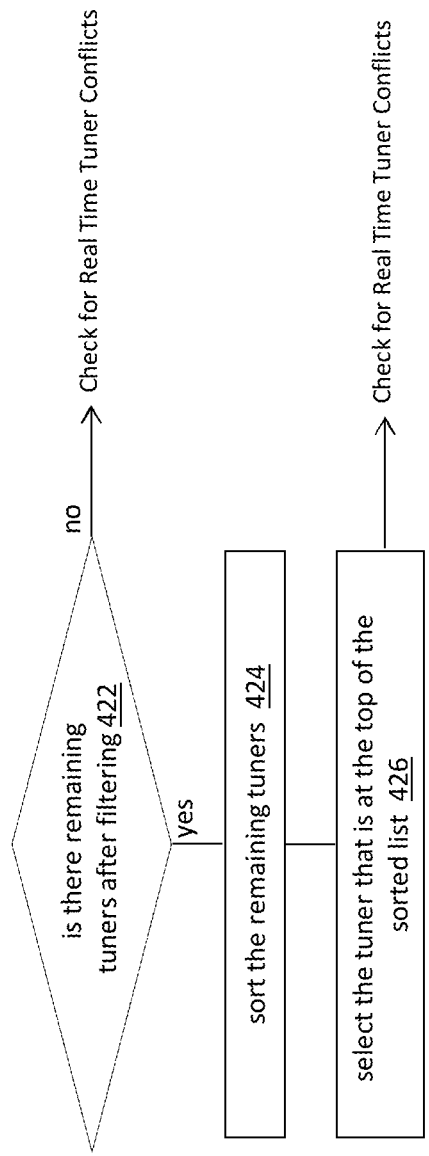

FIG. 4C illustrates an example tuner selection process flow that may be performed in response to a tuner swap request. The example process may be performed by one or more computing devices such as a tuner-equipped device in a tuner sharing system. A tuner swap request is a request made by a user to swap to another tuner using the user's current LIVE TV tuner.

In block 422, the tuner-equipped device, or a tuner selection unit therein, filters out (e.g., exclude for tuner selection, etc.) all tuners for which any of the following is true: a. Tuner is locked (e.g., InputStatus=ExclusiveLocked, etc.); b. Tuner is performing a cache conversion (e.g., InputStatus=PendingCacheConversion, etc.); c. Tuner is owned by another device; d. Tuner is disabled (Enabled=False); etc. Subsequently, the tuner-quipped device determines whether there is any tuner remaining for tuner selection. If so, the process flow goes to block 424. If not, the process flow goes to "Check for Real Time Tuner Conflicts" operations.

In block 424, the tuner-equipped device sorts the remaining tuners, for example, based on the following tuner attribute values/states: a. Most recently active (e.g., LastUserActivity from lowest to highest, etc.); b. Owned last, such that any tuner whose LastOwner is the requesting device is listed first; etc.

In block 426, the tuner-equipped device selects the tuner that is at the top of the sorted list and the process flow goes to "Check for Real Time Tuner Conflicts" operations.

8.0 Video on Demand

In some embodiments, for a VOD tuner request, a tuner sharing system may be configured to take a least active/unowned/non-recording tuner and/or to favor a tuner already tuned to the requested VOD channel. If there are no such tuners, the system can use a currently owned tuner by the device (or the user thereon) making the VOD tuner request. If there is no currently owned tuner, then a tuner conflict may be declared—one or more dialogs that may include alternative selections may be presented to one or more users to resolve the conflict, etc.

Figure 2J:
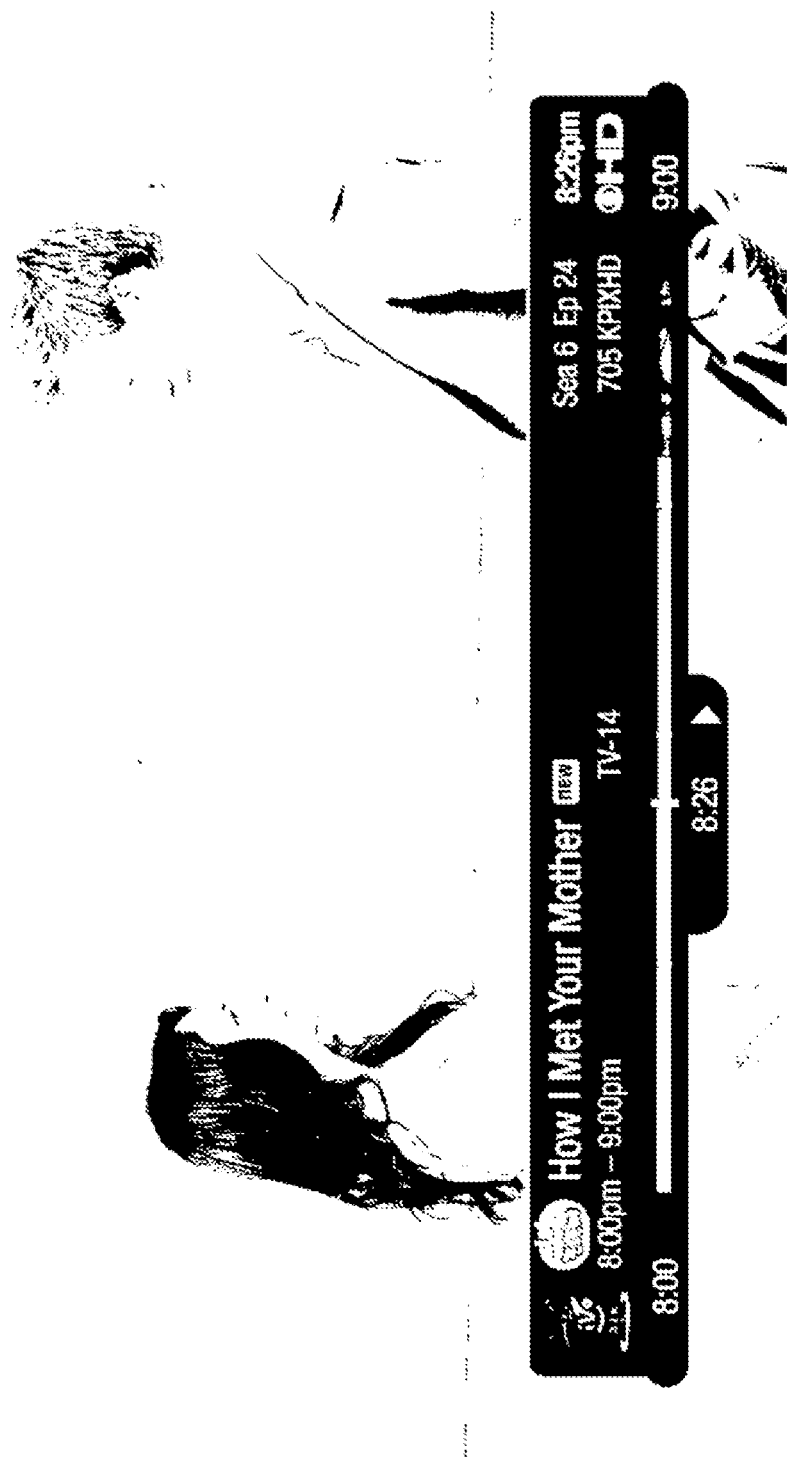

In addition, the system may be configured to continue tuner activities on non-selected tuners. For example, a non-selected tuner from which the device is now moved to a different tuner for VOD operations, etc., may continue live caching on a channel previously tuned to by the device as shown in FIG. 2J, so that if the device re-enter live TV as shown in FIG. 2N after the VOD operations as shown in FIG. 2M, the same tuner with a live cache on the channel before the VOD channel may still be available to the device in live TV. If the non-selected tuner is no longer available, a different tuner without a live cache on the channel before the VOD channel as shown in FIG. 5O may be selected for the device to re-enter live TV.

Figure 4D:
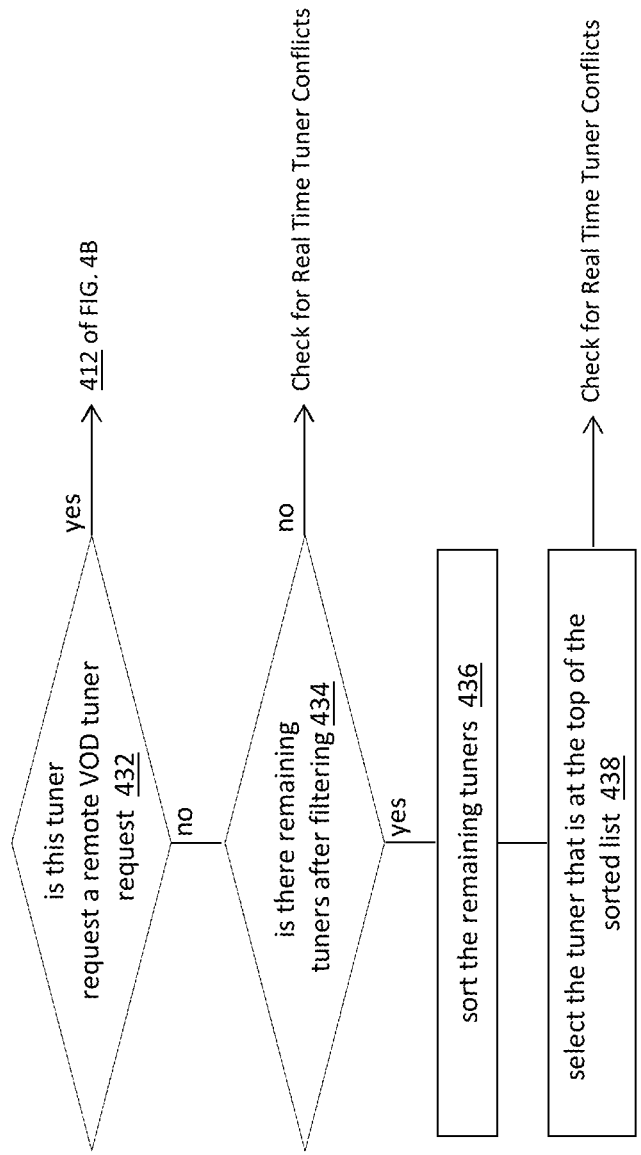

FIG. 4D illustrates an example tuner selection process flow that may be performed in response to a VOD tuner request. The example process may be performed by one or more computing devices such as a tuner-equipped device in a tuner sharing system. A VOD tuner request is a request for a tuner to watch QAM VOD (e.g., Opus, etc.). The request can be triggered, for example, from an application such as one based on Home Media Engine (HME) technologies provided by TiVo Inc., etc. In some embodiments, if the request for a VOD tuner is done via a channel change (e.g., a PlayLive request), the process flow of FIG. 4D may not apply; instead such a request (via a channel change) may be treated as a live TV tuner request.

In block 432, the tuner-equipped device, or a tuner selection unit therein, determines whether a received VOD tuner request is a remote VOD tuner request. A remote VOD tuner request refers to a VOD tuner request from a tuner client device. If that is the case, the process flow goes to block 412 of FIG. 4B (e.g., the remote VOD tuner request is handled the same way as a remote live TV tuner request, etc.). Otherwise, the process flow goes to block 434.

In block 434, the tuner-equipped device filters out (e.g., exclude for tuner selection, etc.) all tuners for which any of the following is true: a. Tuner is locked (e.g., InputStatus=ExclusiveLocked, etc.), b. Tuner is performing a cache conversion (e.g., InputStatus=PendingCacheConversion, etc.), c. Tuner is owned by another device (e.g., a tuner has been assigned to the other device and is in the foreground state), d. Tuner is disabled (e.g., Enabled=False, etc.), etc. Subsequently, the tuner-quipped device determines whether there is any tuner remaining for tuner selection. If not, the process flow goes to "Check for Real Time Tuner Conflicts" operations. Otherwise, the process flow goes to block 436.

In block 436, the tuner-equipped device sorts the remaining tuners, for example, based on the following tuner attribute values/states: a. Least active (e.g., LastUserActivity from highest to lowest, etc.); b. Fuzzy Recording (e.g., Suggestion, etc.), such that tuners whose InputStatus=FuzzyRecording are brought to the top; c. Not Recording, such that any tuners that have an InputStatus other than FuzzyReocrding or UserRecording are brought to the top; d. Idle state, such that tuners where Idle="true" are listed first; etc.

In some embodiments, if the item at the top of the list is recording user requested show (e.g., InputStatus=UserRecording, etc.), the tuner-equipped device further sorts the remaining tuners by: f. Currently Owned, such that any tuner whose CurrentOwner is the requesting device is listed first.

In some embodiments, if more than one factor is applicable among factors b through d, whichever factor listed first above controls. In some other embodiments, if more than one factor is applicable among factors b through d, the tuner-equipped device may implement a specific precedence order to determine which of multiple applicable factors applies (e.g., first, etc.).

In block 438, the tuner-equipped device selects the tuner that is at the top of the sorted list to satisfy the VOD tuner request and the process flow goes to "Check for Real Time Tuner Conflicts" operations.

In an example, a plurality of tuners in a system comprising a DVR (e.g., a tuner-equipped device, etc.) and one or more tuner client devices (e.g., iPad, Nexus, tablet computer, mobile device, etc.) may be in their respective tuner activities/states initially as indicated in the following table:

TABLE 14

| ID | Status | Last Activity | Owner | Last Owner | Channel |
| --- | --- | --- | --- | --- | --- |
| 0 | User Recording | 3 | DVR | — | 720 |
| 1 | User Recording | 10 | — | DVR | 3 |
| 2 | User Recording | 15 | — | — | 4 |
| 3 | User Recording | 50 | — | — | 5 |

For the purpose of illustration only, a DVR user initially is in channel 720 as shown in FIG. 2J with tuner 0 recording video content (e.g., channel 720, etc.).

Figure 2K:
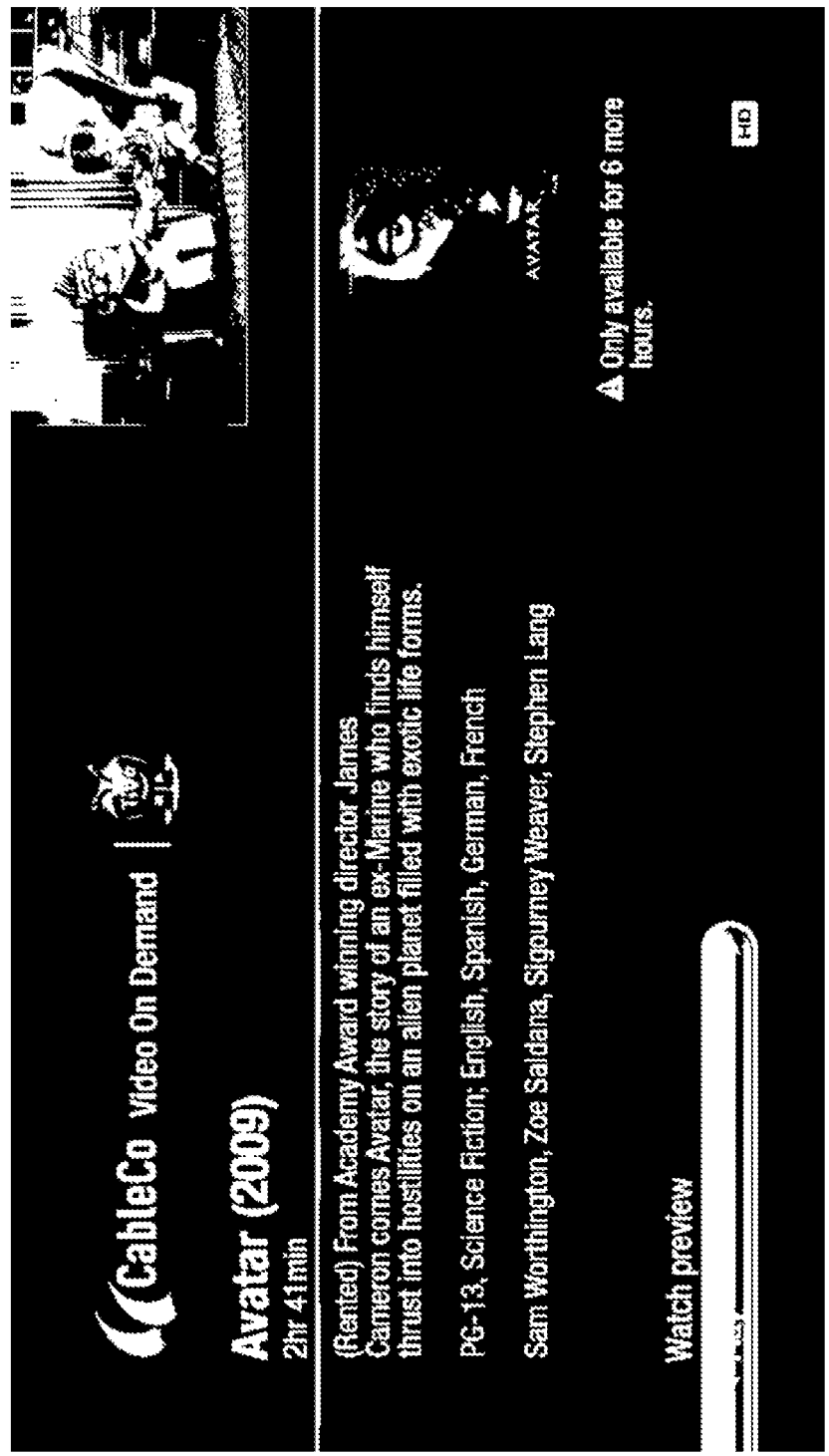

After the DVR user selects a pay per view item "Avatar (2009)" as shown in FIG. 2K, the DVR does not filter out any tuner from the plurality of tuners. The remaining tuners as shown in TABLE 14 are then sorted by the DVR. The sorting of the remaining tuners may be based on the least active attribute first. Since one of the remaining tuners, namely tuner 0 is currently owned by the DVR user, tuner 0 is moved to the top of the remaining tuners. The sorted tuners are indicated in the following table:

TABLE 15

| ID | Status | Last Activity | Owner | Last Owner | Channel |
| --- | --- | --- | --- | --- | --- |
| 0 | User Recording | 3 | DVR | — | 720 |
| 3 | User Recording | 50 | — | — | 5 |
| 2 | User Recording | 15 | — | — | 4 |
| 1 | User Recording | 10 | — | DVR | 3 |

Figure 2L:
Figure 2M:
Figure 2N:
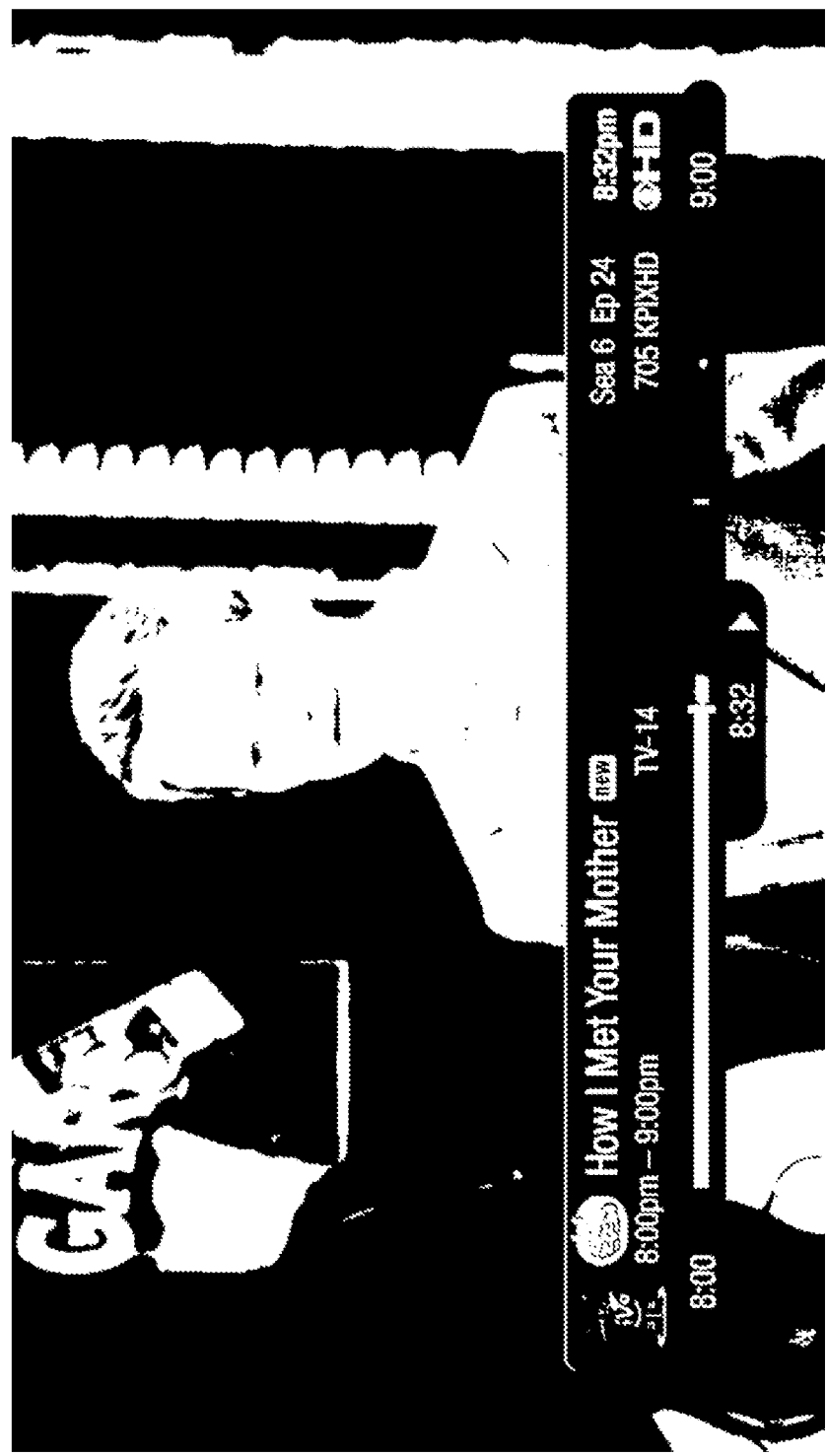
Figure 2O:
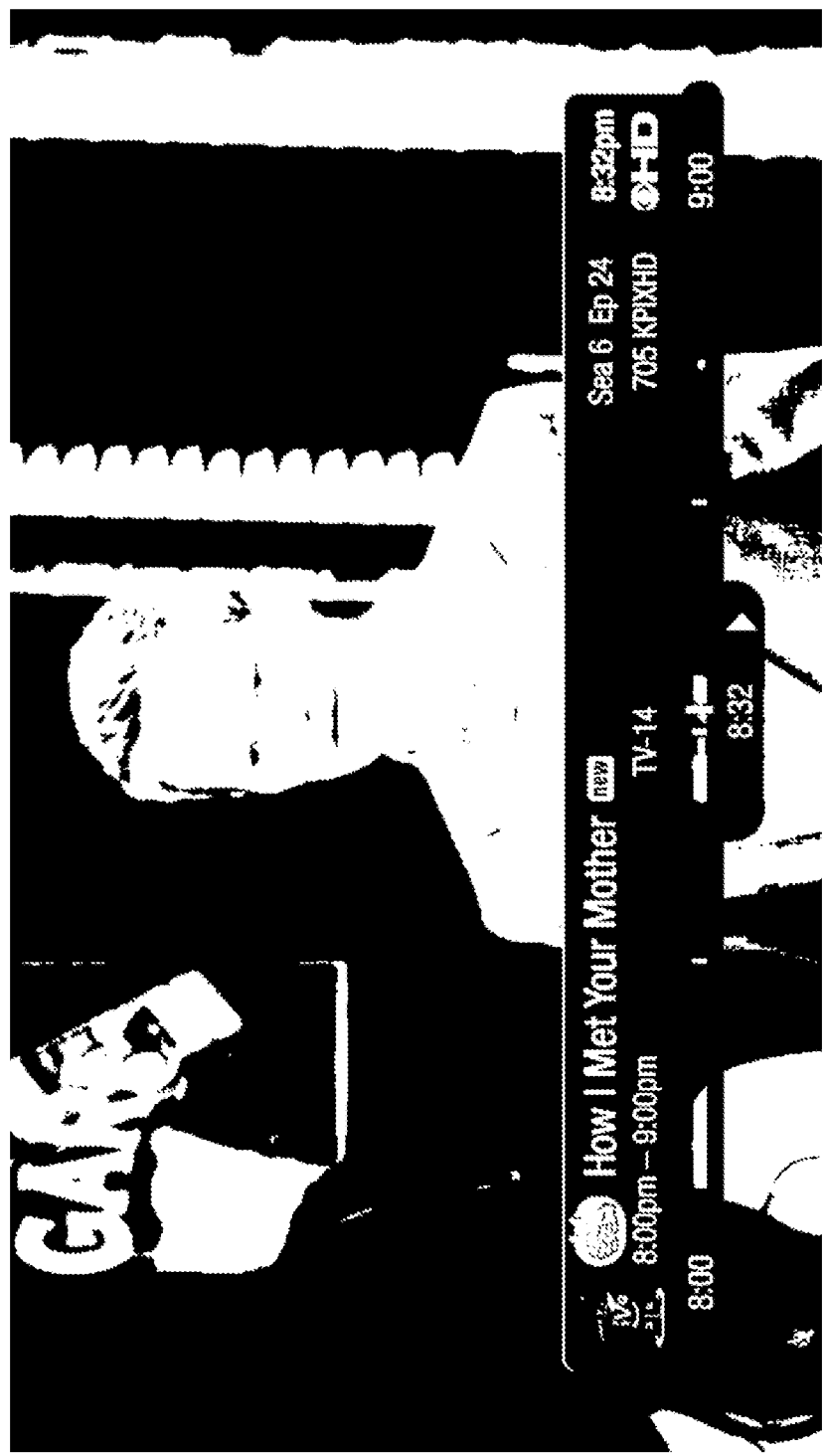

Subsequently, a "Check for Real Time Tuner Conflicts" invoked for this VOD tuner request determines that all tuners are recording and that a selected tuner 0 is recording another channel 720, the DVR returns "Resource Unavailable" with a reason "All Tuners Recording" (e.g., all user recording, no fuzzy recording, no live caching, etc.). A dialog as shown in FIG. 2L may be shown to the DVR user to ask whether the DVR user's recording tuner 0 should continue the current recording on channel 720 or should instead be used for recording the pay per view "Avatar (2009)" by canceling the current recording on channel 720.

In another example, a plurality of tuners in a system comprising a DVR (e.g., a tuner-equipped device, etc.) and one or more tuner client devices (e.g., iPad, Nexus, tablet computer, mobile device, etc.) may be in their respective tuner activities/states initially as indicated in the following table:

TABLE 16

| ID | Status | Last Activity | Owner | Last Owner | Channel |
|---|---|---|---|---|---|
| 0 | User Recording | 3 | DVR | — | 720 |
| 1 | Fuzzy Recording | 10 | — | DVR | 3 |
| 2 | User Recording | 15 | — | — | 4 |
| 3 | User Recording | 50 | — | — | 5 |

For the purpose of illustration only, a DVR user initially is in channel 720 as shown in FIG. 2J with tuner 0 recording video content (e.g., channel 720, etc.).

After the DVR user selects a pay per view item "Avatar (2009)" as shown in FIG. 2K, the DVR does not filter out any tuner from the plurality of tuners. The remaining tuners as shown in TABLE 16 are then sorted by the DVR. The sorting of the remaining tuners may be based on the least active attribute first. Since one of the remaining tuners, namely tuner 1 is performing fuzzy recording (e.g., not a user-requested recording, a suggestion, etc.), tuner 1 is moved to the top of the remaining tuners. The sorted tuners are indicated in the following table:

TABLE 17

| ID | Status | Last Activity | Owner | Last Owner | Channel |
|---|---|---|---|---|---|
| 1 | Fuzzy Recording | 10 | — | DVR | 3 |
| 3 | User Recording | 50 | — | — | 5 |
| 2 | User Recording | 15 | — | — | 4 |
| 0 | User Recording | 3 | DVR | — | 720 |

Subsequently, a "Check for Real Time Tuner Conflicts" invoked for this VOD tuner request determines that the selected tuner 1 is not performing a user recording, the DVR returns "Resource Granted." The DVR may proceed to perform user recording on the pay per view "Avatar (2009)" with tuner 1 as shown in FIG. 2M without presenting any dialog.

9.0 Background Node Discovery Tuner Request

In some embodiments, OSD messages, dialogs, displays, etc., informing a user of tuner conflicts in this type of tuner requests may be reduced, avoided, suppressed, etc., even when there do exist tuner conflicts.

Figure 4E:
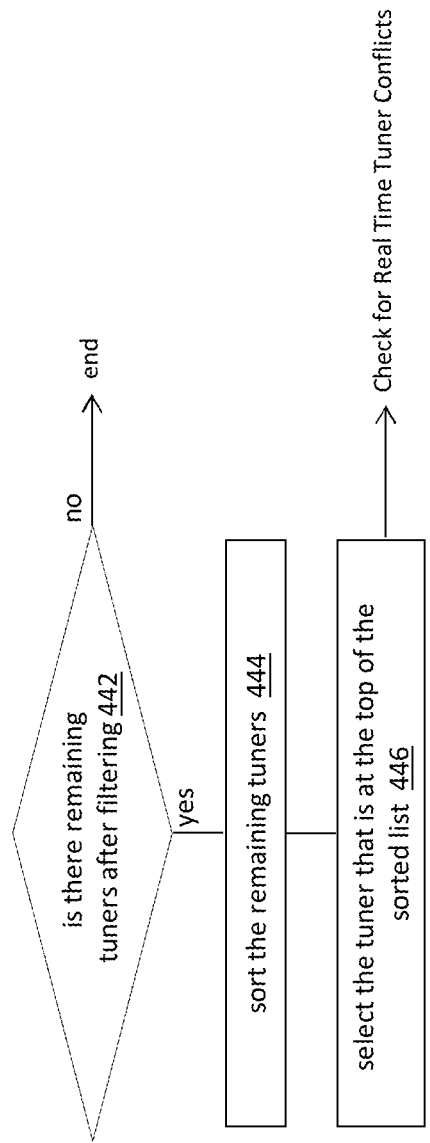

FIG. 4E illustrates an example tuner selection process flow that may be performed in response to a tuner request in connection with background node discovery for VOD content such as Magnum Opus VOD, etc. The example process may be performed by one or more computing devices such as a tuner-equipped device in a tuner sharing system.

In block 442, the tuner-equipped device, or a tuner selection unit therein, filters out (e.g., exclude for tuner selection, etc.) all tuners for which any of the following is true: a. Tuner is locked (e.g., InputStatus=ExclusiveLocked, etc.), b. Tuner is performing a cache conversion (e.g., InputStatus=PendingCacheConversion, etc.), c. Tuner is recording a user-requested show (e.g., InputStatus=UserRecording, etc.), d. Tuner is owned by another device (e.g., a tuner has been assigned to the other device and is in the foreground state), e. Tuner is disabled (e.g., Enabled=False, etc.), etc. Subsequently, the tuner-equipped device determines whether there is any tuner remaining for tuner selection. If not, the tuner-equipped device may terminate the background node discovery operation. Otherwise, the process flow goes to block 444.

In block 444, the tuner-equipped device sorts the remaining tuners, for example, based on the following tuner attribute values/states: a. Least active (LastUserActivity from highest to lowest); b. Not Recording, such that any tuners that have an InputStatus other than FuzzyReocrding or UserRecording are brought to the top; c. Idle state, such that tuners where Idle="true" are listed first; etc.

In some embodiments, if more than one factor is applicable among factors b and c, whichever factor listed first above controls. In some other embodiments, if more than one factor is applicable among factors b and c, the tuner-equipped device may implement a specific precedence order to determine which of multiple applicable factors applies (e.g., first, etc.).

In block 446, the tuner-equipped device selects the tuner that is at the top of the sorted list to be used for background node discovery relating to VOD content, and the process flow goes to "Check for Real Time Tuner Conflicts" operations.

10.0 Tuner Lock Request

Figure 4F:
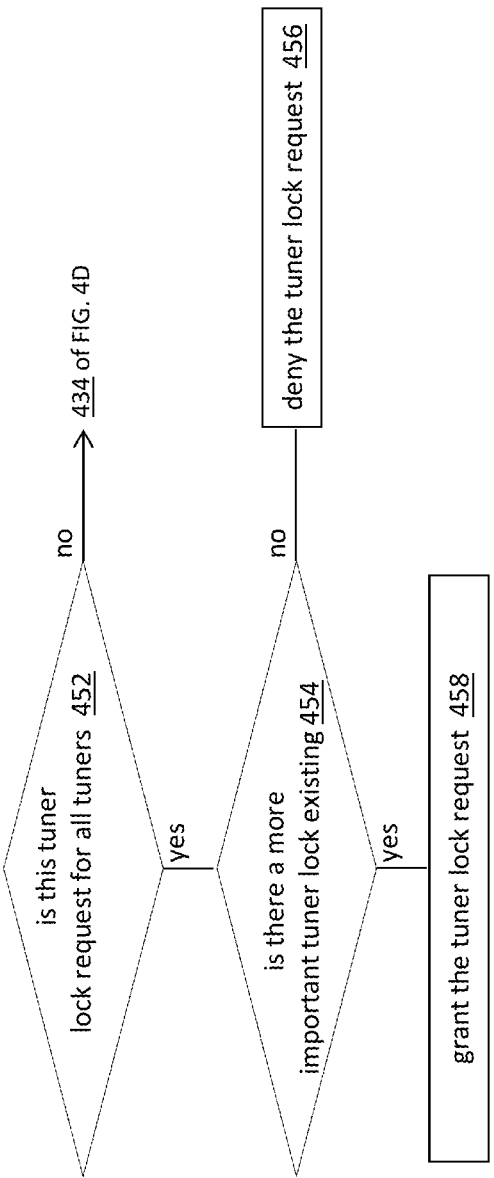

FIG. 4F illustrates an example tuner selection process flow that may be performed in response to an exclusive tuner request triggered by a tuner-equipped device, a user of the tuner-equipped device, etc. The example process may be performed by one or more computing devices such as a tuner-equipped device in a tuner sharing system. An exclusive tuner request may be used to lock a specific tuner (e.g., used for HME VOD transport stream ID (TSID) scan, etc.). An exclusive tuner request may also be used to lock all tuners for other exclusive lock reasons such as when a process, operation, mode, etc., requires all tuners, etc. A tuner lock request for locking all tuners lock is not denied unless a higher priority lock on tuners already exists. A system as described herein may be configured to evaluate respective priorities based on reason IDs associated with the existing tuner locks and the requested tuner locks. Attributes other than reason IDs may also be used in place of, or in addition to, reason IDs for the purpose of evaluating priorities of existing tuner locks and requested tuner locks. In some embodiments, a tuner lock request for a specific tuner may be used in scenarios in which it is preferable to use the same tuner for two or more tuner activities. For example, a tuner lock request may be used to secure or select a tuner for a transport stream ID, and the selected tuner may be used for playback, VOD, etc.

In block 452, the tuner-equipped device, or a tuner selection unit therein, determines whether the exclusive tuner request is for all tuners. If so, the process flow goes to 454. Otherwise, the process flow goes to block 434 of FIG. 4D "VOD Tuner Request."

In block 454, the tuner-equipped device determines whether there exists an exclusive lock on all tuners (e.g., InputStatus=ExclusiveLock, etc.) AND whether the reason for the existing lock if any is more important than the reason given in the current exclusive tuner request (e.g., based on reason IDs in the existing lock or in the current exclusive tuner request, etc.). If it is determined that there is an existing exclusive lock on all the tuners with a more important reason than that of the current exclusive tuner request, then the tuner-equipped device denies the current exclusive tuner request in block 456. If it is determined that there is not any existing exclusive lock on all the tuners with a more important reason than that of the current exclusive tuner request, then the tuner-equipped device grants the requested exclusive tuner lock on all tuners in response to the current exclusive tuner request and the process flows go to "Check for Real Time Tuner Conflicts" operations in block 458.

11.0 Remote Tuner Lock Request

Figure 4G:
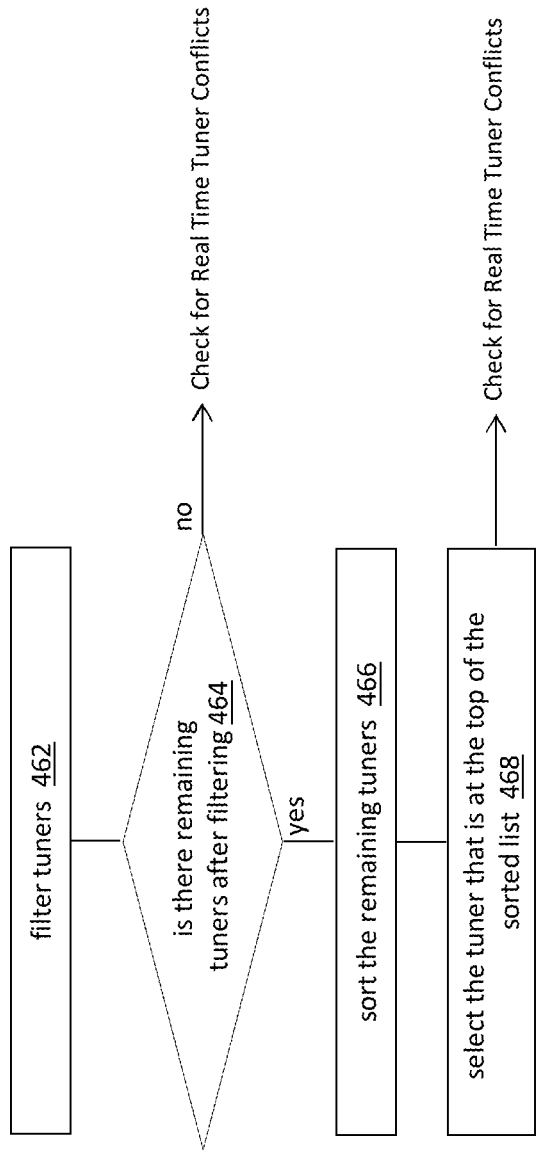

FIG. 4G illustrates an example tuner selection process flow that may be performed in response to an exclusive tuner request triggered by a tuner client device, a user of the tuner client device, etc. The example process may be performed by one or more computing devices such as a tuner-equipped device in a tuner sharing system. A remote exclusive tuner request may be used to lock a specific tuner (e.g., used for HME VOD transport stream ID (TSID) scan, etc.).

In block 462, the tuner-equipped device, or a tuner selection unit therein, Filter out all tuners for which any of the following is true: a. Tuner is NOT reserved for networked devices; b. Tuner is streaming live TV (e.g., InputStatus=LiveStreaming, etc.); c. Tuner is locked (e.g., InputStatus=ExclusiveLocked); etc.

In block 464, the tuner-equipped device determines whether there are any remaining tuners. If so, the process flow goes to block 466. Otherwise, the process flow goes to "Check for Real Time Tuner Conflicts" operations.

In block 466, the tuner-equipped device sorts the remaining tuners in the following order. In block 468, the tuner-equipped device selects the tuner at the top of the list as a response to the tuner request: a. Most active (e.g., LastUserActivity from lowest to highest, etc.); etc. The process flow goes to "Check for Real Time Tuner Conflicts" operations.

12.0 Recording Tuner Requests

For scheduled recordings, a recording tuner request may be generated prior to (e.g., one minute before, two minutes before, etc.) the recording start time so that any conflict dialogs can be presented to the user. The selected tuner is then flagged as a "pending recording." Subsequently, a "recording tuner reevaluate" process may be run (e.g., a minute, two minutes, at the recording start time, etc.) after the recording tuner request to handle any state changes that might have occurred by that time. The "recording tuner reevaluate" process may select a different tuner than the one that was flagged as "pending recording."

In some embodiments, when a user tries to record an in-progress program, a tuner sharing system as described herein may be configured to avoid taking a tuner that someone else is using, unless it is already tuned to the requested channel. Furthermore, the system is configured to determine whether the user request recording a show that the user is watching, and if so, the tuner which the user may be selected (e.g., to the exclusion of other tuners tuned to the requested channel, etc.) to handle the user's request for recording. In some embodiments, the system is configured to determine an originating device and/or an originating user and/or an originating scheduler. The system may be configured to determine that a recording tuner request is for recording an in-progress program or for a scheduled program. The system may be configured to determine whether the request is made from a displayed program guide, a UI display, by pressing a button (e.g., "REC" button, etc.) in live TV, from a scheduler, from another device, from a tuner-equipped device, from a tuner client device, etc.

In some embodiments, a tuner sharing system may be configured to select a tuner in response to a recording tuner request based on the following order of preference: 1. already tuned to channel, either owned by this device or least active; 2. in the state of pending recording for the requested recording; 3. idle; 4. least active; 5. a recording about to end; 6. fuzzy recording (e.g., a Suggestion, etc.); etc.

Figure 4H:
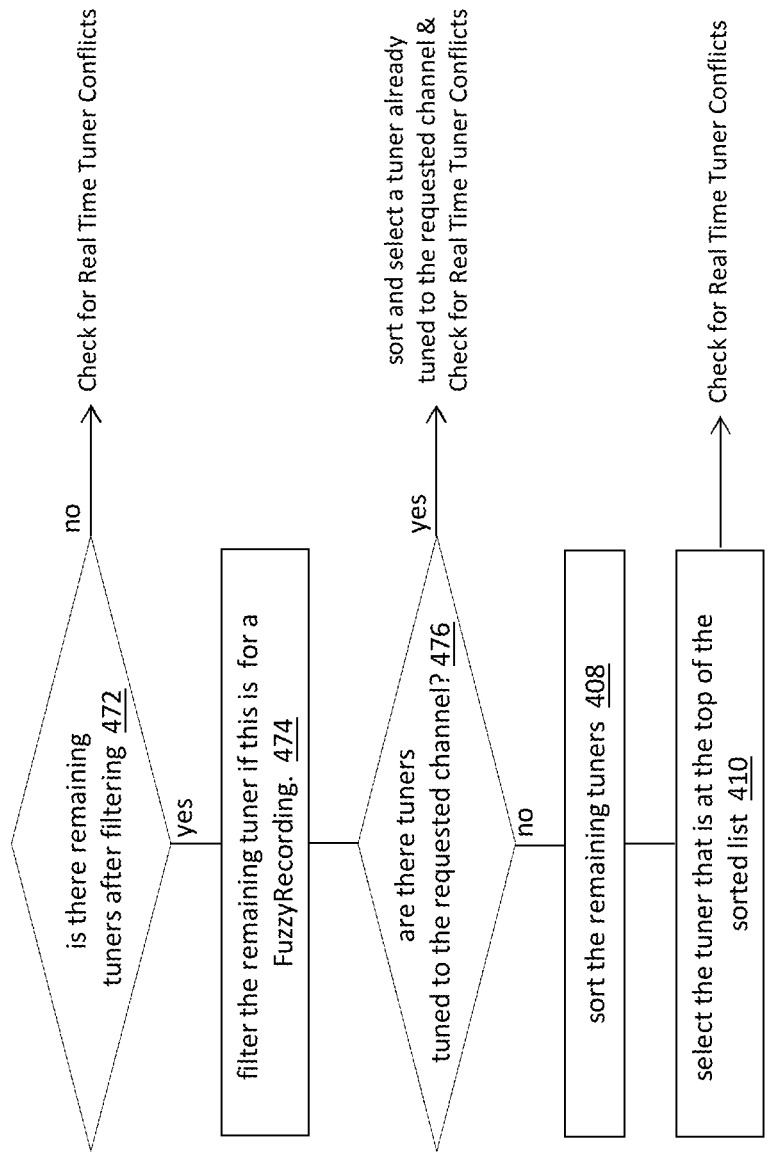

FIG. 4H illustrates an example tuner selection process flow that may be performed in response to a recording tuner request. The example process may be performed by one or more computing devices such as a tuner-equipped device in a tuner sharing system. The request can be triggered, without limitation, in any of the following scenarios: when a user presses a recording button from a user interface; prior to when a scheduled recording will start in one minute; etc.

In block 472, the tuner-equipped device, or a tuner selection unit therein, filters out (e.g., exclude for tuner selection, etc.) all tuners for which any of the following is true: a. Tuner is locked (e.g., InputStatus=ExclusiveLocked, etc.), b. Tuner is performing a cache conversion (e.g., InputStatus=PendingCacheConversion, etc.), c. Tuner is currently displaying a conflict dialog, d. Tuner is currently recording a user-requested show (e.g., InputStatus=UserRecording, etc.) AND the recording is not ending soon (e.g., pending stop, etc.), e. Tuner is disabled (e.g., Enabled=False, etc.), etc. In some embodiments, if this is a recording request initiated in real-time by a user, the tuner-equipped device also filters out all tuners for which any of the following is true: f. Tuner is owned by another device AND not tuned to requested channel, etc.

Subsequently, the tuner-quipped device determines whether there is any tuner remaining for tuner selection. If not, the process flow goes to "Check for Real Time Tuner Conflicts" operations. Otherwise, the process flow goes to block 474.

In block 474, the tuner-quipped device performs additional filtering on the remaining tuner. In some embodiments, if this is a recording request for a FuzzyRecording (Suggestion), the tuner-equipped device filters out all tuners for which any of the following is true: g. Owned tuners, h. Active tuners, etc. As used herein an active tuner may refer to a tuner which a tuner sharing system determines based on one or more tuner attributes including those related to user activities as receiving content that a user is immediately interested in viewing; the one or more tuner attributes may indicate how recently that the tuner was viewed by the user, which, for example, is measured by occurrences or lack of occurrences of a focus timeout, a remote control idle timeout, etc. A remote control idle timeout refers to an amount of time that is to pass after the last button press related to a foreground tuner on a remote control before the foreground tuner becomes inactive. This may apply to the foreground tuner. The value may be set at 90 minutes, 95 minutes, etc.

In block 476, the tuner-equipped device determines whether there is a tuner tuned to the requested channel. If so, the tuner-equipped device filters out all other tuners not tuned to the requested channel. The tuner-equipped device sorts the remaining tuners, for example, based on the following tuner attribute values/states: i. Least active (e.g., LastUserActivity from highest to lowest, etc.); ii. Currently owned, such that any tuner whose CurrentOwner is the requesting device is listed first (e.g., if the request was initiated in real-time by a user, etc.); etc. The tuner-equipped device then selects the tuner that is at the top of the sorted list, and the process goes to "Check for Real Time Tuner Conflicts" operations. In some embodiments, if more than one factor is applicable among factors i and ii, whichever factor listed first above controls. In some other embodiments, if more than one factor is applicable among factors i and ii, the tuner-equipped device may implement a specific precedence order to determine which of multiple applicable factors applies (e.g., first, etc.).

In block 476, if it is determined that there is no tuner tuned to the requested channel, the process flow goes to block 478, in which the tuner-equipped device sorts the remaining tuners, for example, based on the following tuner attribute values/states: a. FuzzyRecording (e.g., Suggestion, etc.), such that tuners whose InputStatus=FuzzyRecording are brought to the top; b. Recording pending stop, such that tuners that have their current recording ending are brought to the top; c. Least active (LastUserActivity from highest to lowest); d. Bring any tuner that is unowned to the top; e. Idle state, such that tuners where Idle="true" are listed first; f. Bring any tuner that is flagged for this upcoming recording to the top; etc. In block 480, the tuner-equipped device then selects the tuner that is at the top of the sorted list, and the process goes to "Check for Real Time Tuner Conflicts" operations. In some embodiments, if more than one factor is applicable among factors a through f, whichever factor listed first above controls. In some other embodiments, if more than one factor is applicable among factors a through f, the tuner-equipped device may implement a specific precedence order to determine which of multiple applicable factors applies (e.g., first, etc.).

In some embodiments, a "recording tuner reevaluate" process may be triggered when a scheduled recording is about to start. In some embodiment, the "recording tuner reevaluate" process generates a new recording tuner request, which may be processed by the process flow of FIG. 4H.

In an example, a plurality of tuners in a system comprising a DVR (e.g., a tuner-equipped device, etc.) and one or more tuner client devices (e.g., iPad, Nexus, tablet computer, mobile device, etc.) may be in their respective tuner activities/states initially as indicated in the following table:

TABLE 18

| ID | Status | Last Activity | Owner | Last Owner | Channel |
|---|---|---|---|---|---|
| 0 | Recording | 35 | — | — | 605 |
| 1 | Recording | 10 | Client1 | — | 606 |
| 2 | Live Caching | 15 | DVR | — | 607 |
| 3 | Live Caching | 50 | — | — | 608 |

For the purpose of illustration only, a Client 1 (e.g., a mobile device, etc.) makes a tuner request in order to move from channel 606 to channel 605, for which tuners 0 and 1 are in recording status. In response, the DVR may filter out tuner 2 from the plurality of tuners into a set of remaining tuners as indicated in the following table:

TABLE 19

| ID | Status | Last Activity | Owner | Last Owner | Channel |
|---|---|---|---|---|---|
| 0 | Recording | 35 | — | — | 605 |
| 1 | Recording | 10 | Client1 | — | 606 |
| 3 | Live Caching | 50 | — | — | 608 |

The remaining tuners may be sorted so that the top of the remaining tuners may be selected in response to the tuner request. In this case, tuner 0 in the remaining tuners after sorting will be at the top because tuner 0 was already tuned to the requested channel, channel 605 and is selected to be used by Client 1 to move from channel 606 to channel 605. As a result, Client 1 successfully swaps to a recording tuner, tuner 0, already tuned to the requested channel.

In another example, consider a scenario in which all tuners (with ID 0, 1, 2 and 3) are caching respectively on channels 2, 3, 4 and 5, and a user of the tuner equipped device (e.g., a DVR, etc.) is watching channel 2 and now changes to channel 3 to trigger a live TV tuner request.

The tuners are initially in the states as shown in Table 2. The process flow of FIG. 4A applies to this live TV tuner request for a requested channel 3 as the request is not a remote tuner request. In this scenario, the tuner-equipped device does not exclude any tuner in block 404. The tuner-equipped device also determines that there is an existing tuner (tuner 1) tuned to the requested channel 3 in block 406. Since there is only one tuner presently tuned to the requested channel 3 in this example, in block 410, the tuner-equipped device selects tuner 1, assigns tuner 1 to the user in response to the live TV tuner request. With tuner 1, the user would tune to channel 3 with an existing cache of tuner 1. As a result, the tuners are now still tuned to 2, 3, 4 and 5 in "Live Caching" as indicated in the following table:

TABLE 20

| ID | Status | Last Activity | Owner | Last Owner | Channel |
|---|---|---|---|---|---|
| 0 | Live Caching | 3 | — | DVR | 2 |
| 1 | Live Caching | 0 | DVR | — | 3 |
| 2 | Live Caching | 15 | — | — | 4 |
| 3 | Live Caching | 50 | — | — | 5 |

In an example, tuners in a system comprising a DVR (e.g., a tuner-equipped device, etc.) and one or more tuner client devices (e.g., iPad, Nexus, tablet computer, mobile device, etc.) may be in respective tuner activities/states initially as indicated in the following table:

TABLE 21

| ID | Status | Last Activity | Owner | Last Owner | Channel | Ending? |
|---|---|---|---|---|---|---|
| 0 | User Recording | 3 | DVR | — | 720 | N |
| 1 | User Recording | 10 | — | DVR | 600 | N |
| 2 | User Recording | 15 | — | — | 601 | N |
| 3 | User Recording | 50 | — | — | 602 | N |

For the purpose of illustration only, a DVR user initially is in channel 720 as shown in FIG. 2J with tuner 0 recording video content (e.g., channel 720, etc.).

Figure 2P:
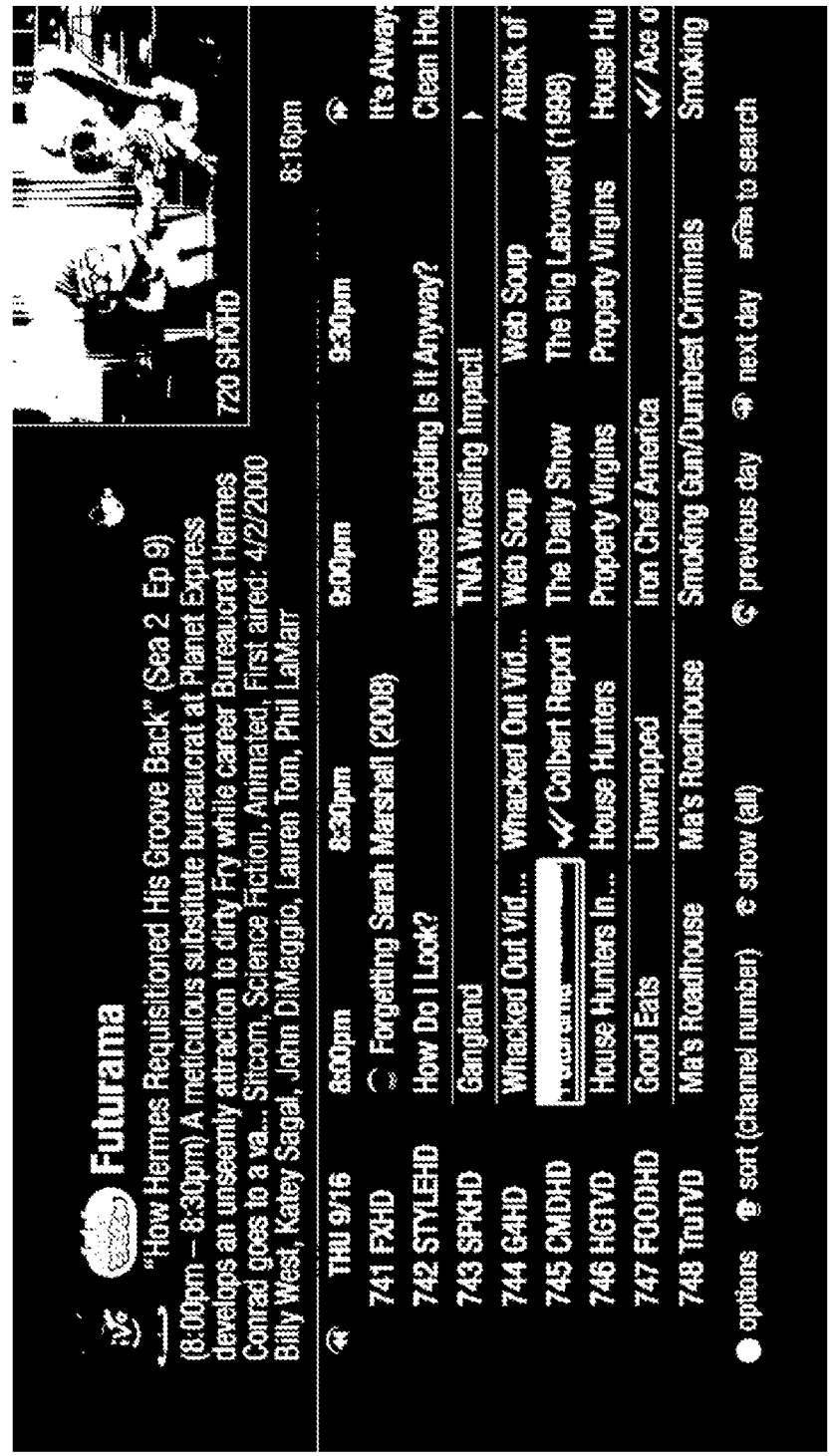

After the DVR user goes into a PIG display as shown in FIG. 2P with channel 720 in the upper-right corner of the PIG display and selects channel 745 for recording, the DVR filters out all tuners from the plurality of tuners with no remaining tuners, as each tuner is currently recording a user-requested show (e.g., InputStatus=UserRecording, etc.) AND it recording is not ending soon.

Figure 2Q:
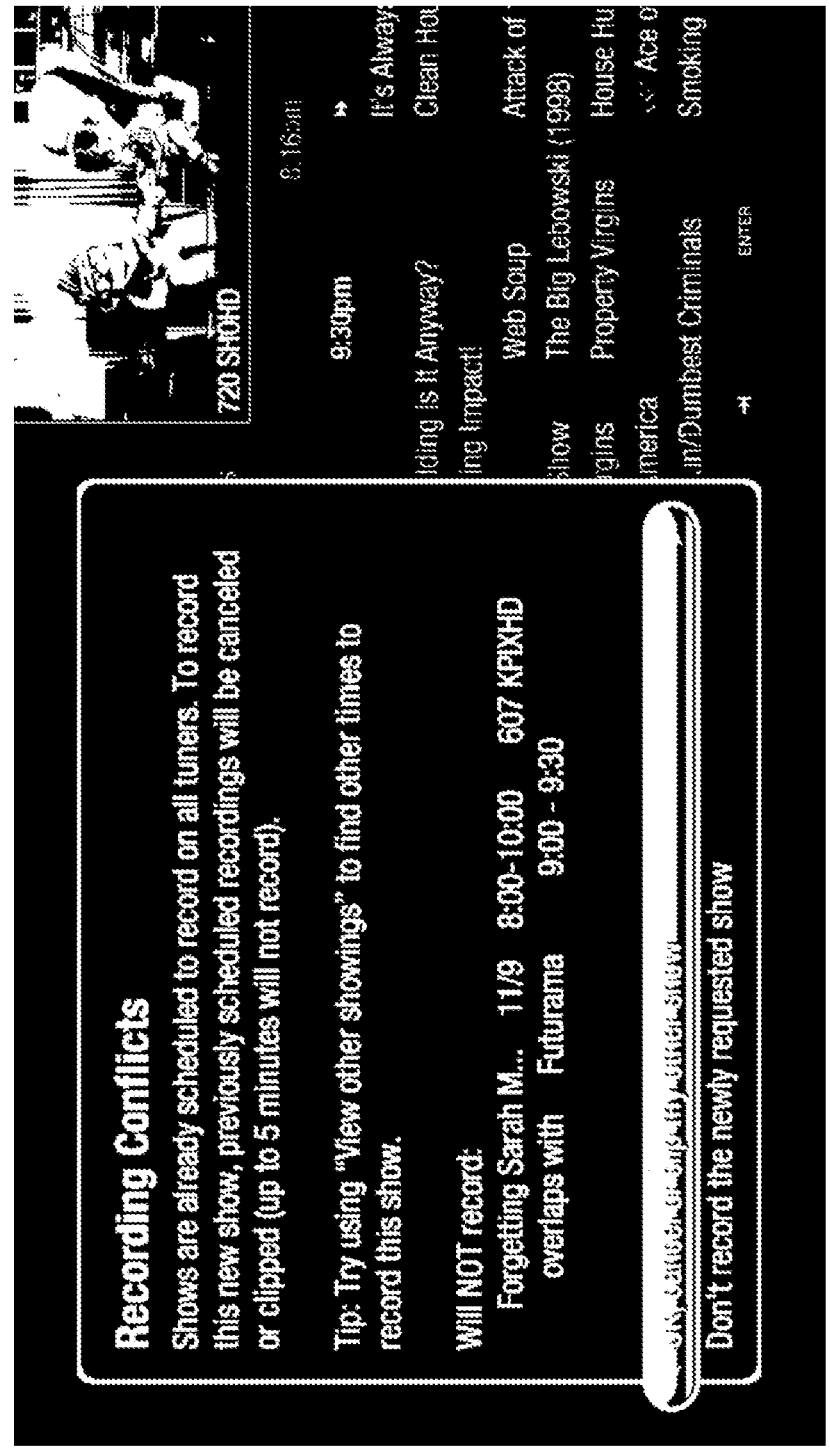

In some embodiments, in processing a tuner request, the DVR may be configured to determine that one or more user recordings are available for cancellation. A tuner request as described herein may carry information identifying whether the request is triggered by a (live) user or a scheduler (e.g., a user has pre-scheduled a recording on a channel, a system has provided a suggestion for recording a program without user identifying the program, etc.). In response to (e.g., the DVR, etc.) determining that the recording tuner request is triggered by a user, the DVR determines whether there exists user recordings either un-owned by any device or owned by the requesting device. The DVR may include these user recordings or alternatively select (e.g., based on an order of preferences related to one or more tuner attributes, etc.) zero, one or more of these user recordings as available recordings for cancellation. An option to cancel one of the available recording may be presented in a conflict dialog as shown in FIG. 2Q. On the other hand, in response to (e.g., the DVR, etc.) determining that the recording tuner request is not triggered by a (live) user but by a scheduler, the DVR may be configured to deny the recording tuner request. No option to cancel one of the available recording may be presented in a conflict dialog as shown in FIG. 2Q.

In another example, the tuners are in their respective tuner activities/states initially as indicated in the following table, instead of Table 21:

TABLE 22

| ID | Status | Last Activity | Owner | Last Owner | Channel | Ending? |
|---|---|---|---|---|---|---|
| 0 | User Recording | 3 | DVR | — | 720 | N |
| 1 | User Recording | 10 | — | — | 600 | N |
| 2 | Live Streaming | 15 | Client1 | — | 601 | — |
| 3 | Live Streaming | 50 | Client2 | — | 602 | — |

In response to receiving a recording tuner request for channel 745, the DVR still filters out all tuners from the plurality of tuners with no remaining tuners, since each tuner is either 1. currently recording a user-requested show (e.g., InputStatus=UserRecording, etc.) AND the recording is not ending soon or 2. currently streaming.

Figure 2R:
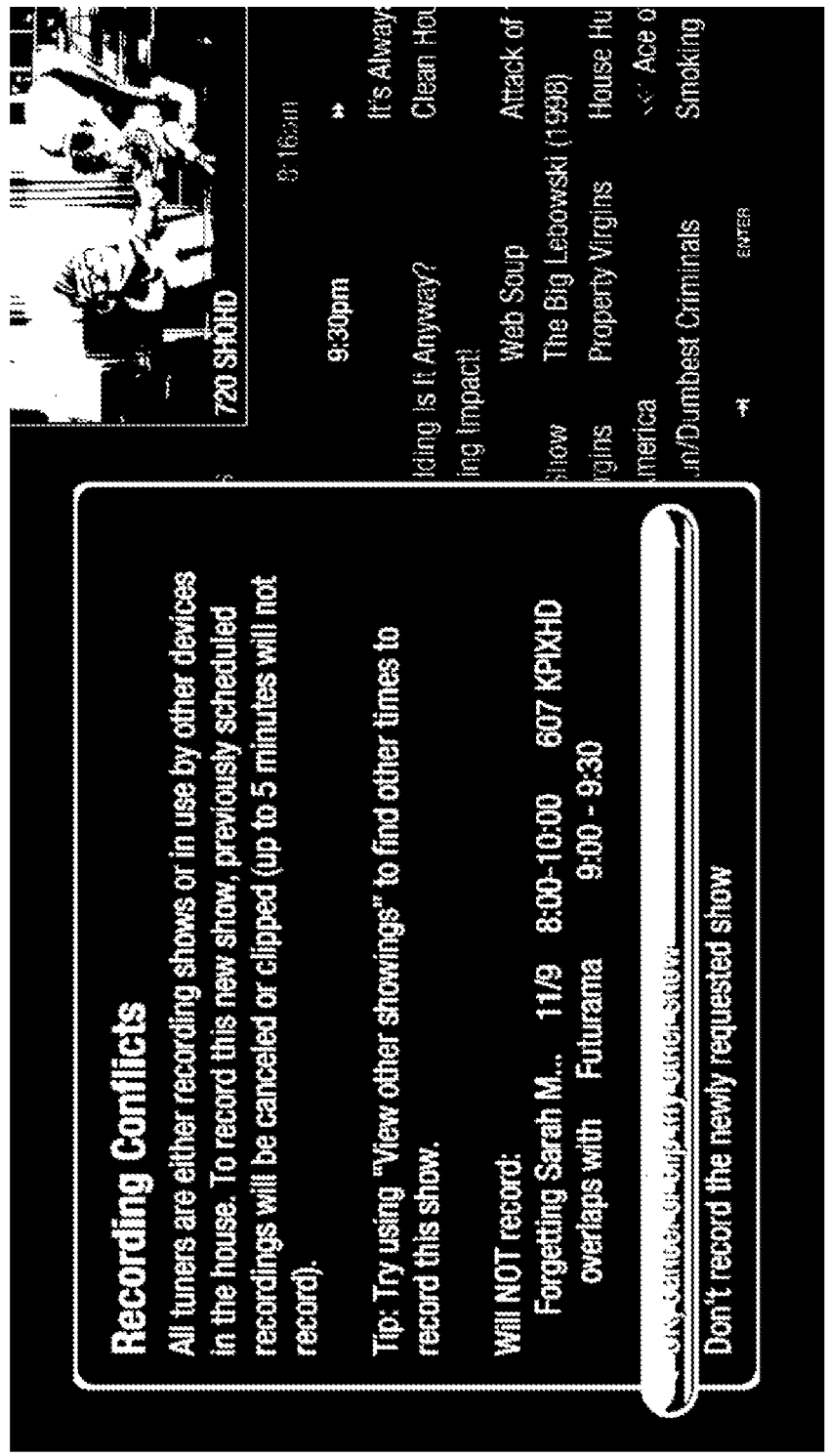

In response to (e.g., the DVR, etc.) determining that the recording tuner request is triggered by a user, the DVR determines whether there exists tuners whose current tuner activities/states allow for cancellation. In response to determining that other tuners 0, 2 and 3 are owned and that the user recording with tuner 1 is unowned (or not owned), the DVR determine that tuner 1 represents the best option available for cancellation. An option to cancel the recording with tuner 1 may be presented in a conflict dialog as shown in FIG. 2R.

On the other hand, in response to determining that the recording tuner request is triggered by a scheduler, the DVR may determine that tuners 2 and 3, rather than tuner 1, represent the best options available for cancellation, as messages requesting possible relinquishments of tuners can be displayed at the other devices that own tuners 2 and 3. In contrast, tuner 1 has no user to present any message to for canceling the existing tuner activity of tuner 1. An option to cancel or clip live streaming with one (e.g., the least active one, tuner 3, etc.) or more (e.g., the least active ones, tuners 2 and tuner 3, etc.) of tuners 2 and 3 may be presented in a conflict dialog as shown in FIG. 2R.

In a further example, the tuners are in their respective tuner activities/states initially as indicated in the following table, instead of Table 21 or 22:

TABLE 23

| ID | Status | Last Activity | Owner | Last Owner | Channel | Ending? |
|---|---|---|---|---|---|---|
| 0 | Live Caching | 3 | DVR | — | 720 | — |
| 1 | User Recording | 10 | Client1 | — | 600 | N |
| 2 | Live Streaming | 15 | Client2 | — | 601 | — |
| 3 | Live Streaming | 50 | Client3 | — | 602 | — |

In response to receiving a recording tuner request for channel 745 from a Client 4, the DVR still filters out all tuners from the plurality of tuners with no remaining tuners, since each tuner is owned by other devices other than Client 4 and is either 1. currently recording a user-requested show (e.g., InputStatus=UserRecording, etc.) AND the recording is not ending soon or 2. currently streaming/live caching.

Figure 2S:
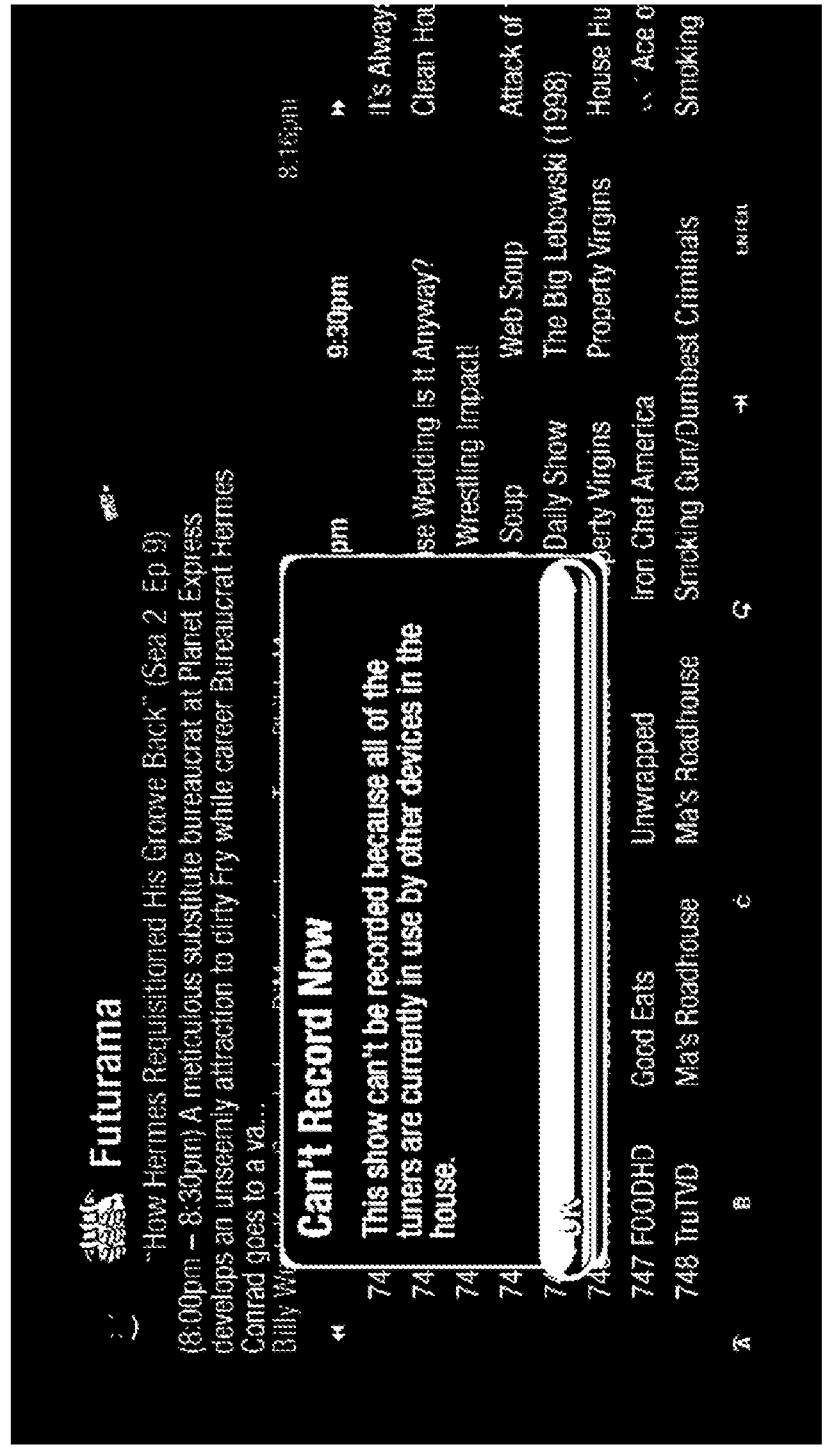

In response to (e.g., the DVR, etc.) determining that the recording tuner request is triggered by a user (e.g., on Client 4, etc.), the DVR determines whether there exists tuners whose current tuner activities/states allow for cancellation. In response to determining that all tuners are owned by the other devices and that no user recording is ending, the DVR determines that there is no option available for cancellation. A message may be presented in a conflict dialog as shown in FIG. 2S.

On the other hand, in response to (e.g., the DVR, etc.) determining that the recording tuner request is not triggered by a (live) user (e.g., on Client 4, etc.) but by a scheduler (e.g., on the DVR, etc.), the DVR may determine that tuner 3 with a non-recording tuner activity and the least active tuner attribute among all the tuners represents the best options available for cancellation. An option to cancel or clip live streaming with tuner 3 may be presented in a conflict dialog as shown in FIG. 2R.

Now consider a scenario in which there exists at least one fuzzy recording (e.g., not a user recording, a suggestion generated by a system without user intervention, etc.). In an example, the tuners are in their respective tuner activities/states initially as indicated in the following table:

TABLE 24

| ID | Status | Last Activity | Owner | Last Owner | Channel | Ending? |
|---|---|---|---|---|---|---|
| 0 | User Recording | 3 | DVR | — | 720 | — |
| 1 | Fuzzy Recording | 10 | — | — | 600 | N |
| 2 | User Recording | 15 | — | — | 601 | — |
| 3 | User Recording | 50 | Client2 | — | 602 | — |

In response to receiving a recording tuner request for channel 745, the DVR filters out all tuners except tuner 1, which is performing fuzzy recording, from the plurality of tuners.

If the recording tuner request is from a (live) user, tuner 1 is selected for recording channel 745 as requested and marked as UserRecording; the new recording starts; and the fuzzy recording on tuner 1 is canceled accordingly. On the other hand, if the recording tuner request is from a scheduler, tuner 1 is selected for recording channel 745 as requested and marked as PendingRecording. The fuzzy recording may be canceled when the program selected for recording is about to start.

In some embodiments, when a recording tuner request to record a program in a requested channel is made, there exists a tuner already tuned to the requested channel. In an example, the tuners are in their respective tuner activities/states initially as indicated in the following table:

TABLE 25

| ID | Status | Last Activity | Owner | Last Owner | Channel | Ending? |
|---|---|---|---|---|---|---|
| 0 | User Recording | 3 | DVR | — | 720 | N |
| 1 | Live Caching | 10 | — | — | 600 | — |
| 2 | Live Caching | 15 | — | — | 601 | — |
| 3 | Live Caching | 50 | — | — | 745 | — |

In response to receiving a recording tuner request for channel 745, the DVR selects tuner 3 (e.g., to start recording on channel 745 if the request is from a user, to place tuner 3 in Pending Recording for a scheduled recording if the request is from a scheduler, etc.), which is already tuned to the requested channel.

In another example, the tuners are in their respective tuner activities/states initially as indicated in the following table:

TABLE 26

| ID | Status | Last Activity | Owner | Last Owner | Channel | Ending? |
|----|--------|---------------|-------|------------|---------|---------|
| 0 | User Recording | 3 | DVR | — | 720 | N |
| 1 | Live Caching | 10 | — | — | 600 | — |
| 2 | Live Caching | 15 | — | — | 601 | — |
| 3 | Live Streaming | 50 | Client2 | — | 745 | — |

In response to receiving a recording tuner request for channel 745, the DVR selects tuner 3 (e.g., to start recording on channel 745 if the request is from a user, to place tuner 3 in Pending Recording for a scheduled recording if the request is from a scheduler, etc.), which is already tuned to the requested channel. The owner and streaming client, Client 2, may be presented with an indication of live cache conversion relating to any concurrent recording activity of tuner 3.

In some embodiments, when a recording tuner request to record a program in a requested channel is made, there exist multiple tuners already tuned to the requested channel. In an example, the tuners are in their respective tuner activities/states initially as indicated in the following table:

TABLE 27

| ID | Status | Last Activity | Owner | Last Owner | Channel | Ending? |
|----|--------|---------------|-------|------------|---------|---------|
| 0 | Live Caching | 3 | DVR | — | 720 | — |
| 1 | Live Streaming | 10 | Client1 | — | 745 | — |
| 2 | Live Streaming | 15 | Client2 | — | 745 | — |
| 3 | User Recording | 50 | Client3 | — | 602 | N |

In response to receiving a recording tuner request for channel 745 by a user or a scheduler of the DVR, the DVR determines that tuners 1 and 2 are already tuned to channel 745, and selects tuner 2 (e.g., to start recording on channel 745 and mark tuner 2 as user recording if the request is from a user, to place tuner 2 in Pending Recording for a scheduled recording if the request is from a scheduler, etc.), which is the least active (or the less active) of tuners 1 and 2 already tuned to the requested channel.

In another example, the tuners are in their respective tuner activities/states initially as indicated in the following table:

TABLE 28

| ID | Status | Last Activity | Owner | Last Owner | Channel | Ending? |
|----|--------|---------------|-------|------------|---------|---------|
| 0 | Live Caching | 3 | DVR | — | 745 | — |
| 1 | Live Streaming | 10 | Client1 | — | 745 | — |
| 2 | Live Streaming | 15 | Client2 | — | 745 | — |
| 3 | User Recording | 50 | Client3 | — | 602 | N |

In response to receiving a recording tuner request for channel 745 from a user of the DVR, the DVR selects tuner 0 to start recording on channel 745 since the request is from a user of DVR and the DVR already owns a tuner, tuner 0, to the requested channel; tuner 0 is marked as User Recording. In some embodiments, tuners 1 and 2, although also tuned to the requested channel, see no immediate effect. In some embodiments, a display may carry an information banner to show a shortcut to the recording on channel 745. In some embodiments, the information banner with the shortcut may be displayed when there is more content recorded than cached. In some embodiments, the shortcut to the recording on channel 745 may appear when tuner 1 or 2 performs channel change operations. In some embodiments, an already tuned tuner that has the most cache is selected instead. In some embodiments, even if another of the already tuned tuners has more cache, tuner 0 owned by the requesting device/user is still selected.

On the other hand, in response to receiving a recording tuner request for channel 745 from a scheduler of the DVR, the DVR selects tuner 2 to start recording on channel 745 since the request is not from a user of DVR and tuner 2 is the least active among the tuners already tuned to the requested channel; tuner 2 is marked as Pending Recording. The owner and streaming client, Client 2, may be presented with an indication of live cache conversion relating to any concurrent recording activity of tuner 2.

13.0 Tuner State Processes

Tuner state processes, operations, etc., (e.g., to determine whether a tuner becomes unused, to determine a tuner behavior such as tuning back a tuner, etc.) may run when a tuner activity ends and does not have a scheduled/pending activity to begin. These processes, operations, etc., may be triggered, for example, in any of the following events: when a recording ends; when the system (e.g., the tuner-equipped device, etc.) reboots, when a tuner exits out of a VOD playback, when the system (e.g., the tuner-equipped device, etc.) exits out of a low-power mode (e.g., Standby, etc.); etc.

To determine tuner behavior/state, a tuner state process, operation, etc., as described herein may apply the following rules in order:

1. If the system was restarted, enable the tuner, tune to the last channel as defined by "Auto-Tune All Tuners," and start caching (e.g., InputStatus=LiveCaching, Enabled=true, etc.) on the last channel.

2. If the tuner just finished recording: a. if the recording was not requested by the user (e.g., a Suggestion, etc.) AND the tuner has no current/last owner (e.g., CurrentOwner and LastOwner are null, etc.), then re-tune to the last tuned channel; and b. otherwise, stay on the current channel and start caching (e.g., InputStatus=LiveCaching, etc.).

3. If the tuner just finished VOD playback, tune to the last tuned channel on that tuner and start caching (e.g., InputStatus=LiveCaching, etc.).

After a reboot, a scheduler as described herein may re-send recording tuner requests for any shows that should have been recording or that were interrupted.

14.0 Operations Requiring Control of all Tuners

Techniques as described herein can be used to support processes, operations, operational modes, etc., that assume control of all tuners. In some embodiments, such a process, operation, etc., stops some or all of in-progress recordings, downloads, streaming and live TV caching. Examples of such processes, operations, states, etc., include but are not limited only to, any of the following:

Active Standby Mode: In the Active Standby mode, the system will not show video, record programs, or respond to broadband service requests. In some embodiments, certain events may temporarily bring it out of this state into a "MutedOn" state, in which recordings and streaming can be fulfilled; once the request is completed, the system returns to Active Standby. In some embodiments, recordings, downloads, and live TV caching are not interrupted in this mode;

however, in-progress streaming is interrupted. In some embodiments, once the system exits this mode, tuners stay in their current states.

Allocate Tuners for Networked Devices Process: All in-progress recordings, live TV streaming, live caching, etc., may be halted for this process. In some embodiments, after the process is complete, each tuner will re-tune to its previously tuned channel; interrupted recordings may not resume.

Operations relating to Advanced Program Guide (APG) Boot (e.g., to acquire data from satellite, etc.), Guided Setup, Restart or Reset (NPK Boot), Satellite Setup (Auto-Config), Testing Signal Strength (e.g., Cable, Antenna, Satellite, etc.): While one or more of these operations are being performed at the tuner-equipped device, connections to networked devices (e.g., clients that request for tuners, etc.), along with all recordings and streaming, may be interrupted. In some embodiments, after the operations complete, user-requested recordings and downloads may resume. In some embodiments, if no recordings are scheduled, all tuners tune to the same channel as defined in the Auto-Tune All Tuners mode; all tuners remain on the same channel until a request to change the channel is made by either a user or a scheduler (e.g., resident on the tuner-equipped device, etc. In some embodiments, when a user triggers operations for Guided Setup, a display such as FIG. 6L may be shown to the user.

Firmware Upgrade: In some embodiments, a firmware upgrade commandeers all tuners and does not release them until the firmware upgrade completes. In some embodiments, all in-progress recordings, live TV streaming, live caching, etc., are interrupted and any upcoming recordings will be cancelled if the tuner is still unavailable. In some embodiments, all tuners will re-tune to its previously tuned channel; however, interrupted recordings may not resume.

Channel Scan (e.g., antenna, cable, etc.): All in-progress recordings, live TV streaming, live caching, etc., are halted for this operation. In some embodiments, after this operation completes, all tuners will tune to the same channel as defined in the Auto-Tune All Tuners mode. In some embodiments, all tuners will remain on the same channel until a request to change the channel is made by either a user or a scheduler.

Auto-Tune All Tuners: After certain processes, operations, modes, etc., which take control of all tuners, the tuners are not returned to their original states, but to this mode. In some embodiments, a tuner in this mode is tuned to the channel last tuned on the tuner, actively used by the tuner-equipped device such as DVR, etc., if known.

Tuner interruption events can occur in the system to interrupt tuner activities. Examples of such events include but are not limited only to, any of: cable card removed, tuning adaptor removed, cable card reset, tuning adaptor reset, etc. In some embodiments, the impacts on tuner activities by any of these events are similar to those related to firmware upgrade as discussed above.

15.0 Tuner Conflicts

Tuner conflict dialogs (e.g., on a TV connected with a DVR, on an integrated display of a networked device, etc.) can be triggered by a scheduler when a specific user-request may require cancelling or altering in-progress recordings, already scheduled recordings, etc. Tuner conflict dialogs can also be presented when the system is attempting to take a tuner in real-time, which may interrupt what the user is doing. In some embodiments, the system may be configured to prompt one or more tuner conflict dialogs to claim a tuner that is likely being watched by someone (e.g., has an owner, being presented on an output, etc.).

In some embodiments, when trying to assign a tuner for a specific tuner activity, the system tries to assign a tuner that is likely to be free (e.g., as scheduled, etc.) or take a tuner that is least active (real-time) to avoid prompting a user or several users. In a whole home environment (e.g., most if not all of the devices in the system are at a single location, etc.), a tuner conflict dialog is presented on a device that will be affected by a tuner conflict corresponding to the tuner conflict dialog.

In some embodiments, if a tuner appears to be unavailable for a (e.g., just-in-time, etc.) tuner request, a tuner conflict dialog is presented, unless the request does not affect a user's current activity. For example, the following may be exceptions that do not result in a prompt (e.g., with a tuner conflict dialog, etc.): an upcoming recoding requires a tuner that is unavailable AND the user to which the tuner is currently assigned to is watching one of the following: i. a recording*, ii. pay-per-view (PPV), iii. QAM video-on-demand (VOD)*, iv. broadband-based VOD, etc. In some embodiments, the above exceptions marked with asterisks "*" applies unless there is a reminder attached to the recording; if there is a reminder, the user is prompted anyway. A reminder refers to a user-requested prompt that appears when a specific recording is about to start. In some embodiments, the prompt may appear regardless of whether or not there is a conflict.

In some embodiments, tuner conflict dialogs may be presented to one or more users for two tuners at the same time.

In some embodiments, a tuner can be shared but not owned by more than one device at the same time. In some embodiments such as a whole home environment with multiple networked devices requesting tuners from a tuner-equipped device, etc., two or more tuners may tune to the same channel, as multiple users of different devices may simultaneously request the same channel and no tuner can be assigned to more than one device at a given time.

Tuner conflict processes, operations, etc., (e.g., to determine whether there will be a tuner conflict between a scheduled recording and another future tuner activity/state, to determine whether there is a real-time tuner conflict between impending and/or present tuner activities/states, etc.) may be invoked, for example, in tuner selection processes.

15.1 Future Tuner Conflicts

In some embodiments, when a future tuner conflict among two or more requested tuner activity items for a tuner is detected, for example, by a tuner-equipped device or a scheduler therein, the item with the lowest priority, among the requested tuner activity items, may be either canceled or clipped (e.g., clipped in the beginning, clipped in the end, etc.).

In some embodiments, two or more requested tuner activity items may be ordered in priorities from least important (e.g., first canceled, etc.) to most important (e.g., last canceled, etc.), for example, as follows:

1. suggestions, which may be sorted by priority, lowest to highest;

2. video clips for showcases and promotions, which may be sorted by priority, lowest to highest.

3. tuner activities involving software downloads/updates embedded in video frames.

4. low priority explicit candidate, which may be a. low priority explicit recordings such as a single explicit recording scheduled from a content provider service, website, portable, etc., with a setting "only record if nothing else conflicts"; b. single explicit recordings whose program guide data has changed; etc. When program guide data changes affecting a single explicit recording, the scheduler can search for a new showing and try to schedule recording the new showing. When the new showing is proposed, it may be proposed at a low priority. This gives a preference to the scheduled recordings that have not changed or have not been affected by program guide data change.

5. repeat recordings—which may include but are not limited only to any of: recordings from all repeating user program sources such as season passes, wish lists, repeating manuals, showcase passes, etc. In some embodiments, the repeat recordings sorted by season pass priority, lowest to highest and then by start time (e.g., in the reverse time order, etc.).

6. single explicit recordings. In some embodiments, these recordings are sorted by start time (e.g., in the reverse time order, etc.).

7. Pay Per View.

8. On foreground. In some embodiments, this applies to a recording that is currently being displayed; for example, the recording is in-progress.

9. explicit candidate. In some embodiments, this is a special transient priority that only occurs while an explicit recording is being proposed or requested. When it is committed, the priority changes to "single explicit."

To decide whether to clip or cancel a requested tuner activity item among multiple conflicting items, the tuner-equipped device may be configured to determine whether a recording for the requested (e.g., requested earlier, etc.) tuner activity item is in-progress. If that is the case, the tuner-equipped device may be configured to clip the recording up to a certain amount, rather than cancel the recording.

If a requested tuner activity item, for which a recording is subject to clipping or cancelling, is still in the future, the tuner-equipped device may be configured to determine whether a partial recording is allowed for that recording. If that is the case, the tuner-equipped device may be configured to keep the partial recording if the amount of clipping of the recording is below a clipping threshold such as 10%, 5 minutes, 10 minutes, etc., of the total duration without clipping.

The tuner-equipped device may be configured to determine whether stopping the recording at the time of the conflict loses less than the clipping threshold, or whether starting the recording at the time of the conflict loses less than the clipping threshold. Based on one or both of these determinations, the tuner-equipped device may determine clipping early, clipping late, in an affected recording, or cancelling the affected recording.

In some embodiment, if a requested tuner activity item, for which a recording is subject to clipping or cancelling, is still in the future, and if the tuner-equipped device determines that a partial recording is not allowed for that recording (e.g., based on an attribute of the requested tuner activity, etc.), then the tuner-equipped device proceed to cancel the requested tuner activity item (e.g., without determining whether a clipping is possible or how much the clipping is relative to the total duration of a corresponding recording, etc.).

15.2 Real-Time Tuner Conflicts

Process that is applied for every real-time tuner request. This process will either return 'Resource Granted' or 'Resource Unavailable,' along with a reason for the latter. A tuner conflict process, operation, etc., that determines whether there is a real-time tuner conflict between impending and/or present tuner activities/states, etc., may be invoked when a real-time tuner request is made. The tuner conflict process, operation, etc., may return "Resource Granted" or "Resource Unavailable," along with a reason for the latter.

15.2.1 All Tuner Requests

In some embodiments, in performing "Check for Real Time Tuner Conflicts" for all tuner requests, the tuner-equipped device is configured to determine whether all tuners are filtered out (e.g., no remaining tuners for selection, etc.) in a tuner selection process, operation, etc., in response to each of these tuner requests. If it is determined that all tuners are filtered out, then the tuner-equipped device further determines whether all tuners are locked. If it is determined that all tuners are locked, then the tuner-equipped device returns "Resource Unavailable" with a reason "All Tuners Locked." On the other hand, if it is determined that not all tuners are locked, the tuner-equipped device returns "Resource Unavailable" with a reason "No Tuner Available."

In some embodiments, if a (e.g., selected, etc.) tuner is invalidated by another user (e.g., other than the user who triggers the tuner request leading to the selected tuner, etc.) who chooses to deny use of the tuner via a conflict resolution dialog, the tuner-equipped device returns "Resource Unavailable" with a reason "Denied by User."

In some embodiments, if a (e.g., selected, etc.) tuner is recording a Suggestion or the incoming request is for a Suggestion, the tuner-equipped device further invokes "Special Rules for FuzzyRecording Conflicts."

As described herein, a return value such as "Resource Granted," "Resource Unavailable," "No Tuner Available," etc., and/or a reason provided with the return value can be received, parsed, determined, looked up, acted up, etc., in one or more processes/modules/units/dialog/displays. For example, a return value and/or a reason with the return value may be used in a tuner selection process, operation, dialog, display, etc., to determine a next step to take, to cause one or more on-screen display (OSD) messages to be presented in one or more dialogues, displays, etc., to one or more users of one or more of tuner-equipped devices or tuner requesting devices, etc.

In some embodiments, the tuner-equipped device may return "Resource Granted," "Resource Unavailable," "No Tuner Available," etc., with a reason or message that someone else is watching a recording tuner on a requested channel, and give the requesting device or the requesting user an option to go to the recording tuner, which may be currently owned by a different user and/or a different device. The recording tuner that is currently performing a user recording on the requested channel may be provided as a second selection in addition to a selected tuner (which may be a first selection). One or more UI displays with one or more messages (e.g., OSD messages, etc.) may be used to show and explain available selections—a tuner for sharing but not owning, a tuner for which the requesting user can cause a message to be presented to the current owner of the tuner for possible relinquishment by the current owner, etc.—to the requesting user and/or one or more involved users.

For example, tuners in a system comprising a DVR (e.g., a tuner-equipped device, etc.) and one or more tuner client devices (e.g., iPad, Nexus, tablet computer, mobile device, etc.) may be in respective tuner activities/states initially as indicated in the following table:

TABLE 29

| ID | Status | Last Activity | Owner | Last Owner | Channel |
|---|---|---|---|---|---|
| 0 | User Recording | 35 | Client2 | — | 605 |
| 1 | User Recording | 10 | Client1 | — | 606 |
| 2 | Live Caching | 15 | DVR | — | 607 |
| 3 | Live Caching | 50 | — | — | 608 |

For the purpose of illustration only, a Client 1 initially is in channel 606 with tuner 1 live streaming a video content that is displayed in a display of Client 1 and then makes a tuner request to move to, swap to, etc., channel 605 currently owned by Client 2 for recording.

In response, the DVR may filter out tuners 0 and 2 from the plurality of tuners into a set of remaining tuners as indicated in the following table:

TABLE 30

| ID | Status | Last Activity | Owner | Last Owner | Channel |
|---|---|---|---|---|---|
| 1 | User Recording | 10 | Client1 | — | 606 |
| 3 | Live Caching | 50 | — | — | 608 |

The remaining tuners may be sorted so that the top of the remaining tuners may be selected. In this case, tuner 1 in the remaining tuners after sorting remains at the top because tuner 1 is currently owned by Client 1 and is selected to be used by Client 1 to enter user recording on the requested channel, channel 605.

The DVR may also be configured to determine (e.g., as a part of performing conflict check, etc.) that a recording tuner, tuner 0, is currently tuned to the requested channel, 605, but is recording for a different user. Upon determining so, the recording tuner 0 that is currently performing a user recording on the requested channel may be provided as a second selection in addition to the selected tuner 1 (which may be a first selection). One or more UI displays with one or more messages (e.g., OSD messages, etc.) may be used to show and explain available selections—tuner 0 for sharing but not owning, tuner 0 for which the requesting user can cause a message to be presented to the current owner of the recording tuner 0 for possible relinquishment by the current owner, etc.—to the requesting user and/or one or more involved users.

15.2.2 Live TV Tuner Request/VOD Tuner Request

In some embodiments, in performing a "Check for Real Time Tuner Conflicts" for a live TV tuner request or a VOD tuner request, a tuner-equipped device as described herein is configured to determine whether a selected tuner is currently performing a user recording on a channel other than the channel which is requested (e.g., InputStatus=UserRecording & CurrentTuningData is NOT the same as requested channel, etc.). If that is not the case, the tuner-equipped device returns "Resource Granted." If it is determined that the selected tuner is currently performing a user recording on a channel other than the channel which is requested, then tuner-equipped device is configured to determine whether all tuners are recording. If so, the tuner-equipped device returns "Resource Unavailable" with a reason "All Tuners Recording" (e.g., all user recording, no fuzzy recording, no live caching, etc.). Otherwise, the tuner-equipped device returns "Resource Unavailable" with a reason "All Tuners in Use."

15.2.3 Recording Tuner Request

In some embodiments, in performing "Check for Real Time Tuner Conflicts" for a recording tuner request, the tuner-equipped device is configured to determine whether the request is for a scheduled recording that will start in a time shorter than a time duration threshold (e.g., less than one minute, less than two minutes, etc.) from the time when the request is received for processing. If it is determined that the request is for a scheduled recording that will start in a time shorter than the time duration threshold, the tuner-equipped device returns "Resource Unavailable" with a reason "About to Start Recording" if any of the following is true:

1. A (e.g., selected, etc.) tuner is currently owned (e.g., CurrentOwner is not null, etc.) AND the tuner is not on the requested channel.

2. A (e.g., selected, etc.) tuner has a last owner (e.g., LastOwner is not null, etc.) that matches another tuner's current owner (e.g., CurrentOwner of tuner x=Last Owner of the tuner, etc.). An attribute of "PROMPT FOR BACK-GROUND TUNER#" is set to Yes (e.g., requiring prompting a user for an affected background tuner, etc.), and LastUserActivity is less than a focus timeout related to the background state.

3. The tuner request is for an upcoming recording with a specific reminder such as "#SUPPORT LOUD RECORDINGS#"=Yes, etc., attached.

If it is determined that the request is for a scheduled recording that will start in a time shorter than the time duration threshold, the tuner-equipped device returns "Resource Granted" for a selected tuner for the recording tuner request. If the selected tuner is recording a Suggestion on another channel than the one that is requested, the tuner-equipped device silently cancels the recording for the Suggestion and fulfills the (incoming) recording tuner request.

In some embodiments, a conflict resolution dialog is presented when "Resource Unavailable" is returned. In some other embodiments, a conflict resolution dialog is not presented even when "Resource Unavailable" is returned.

15.2.4 Exclusive Tuner Request

In some embodiments, in performing "Check for Real Time Tuner Conflicts" for a recording tuner request, the tuner-equipped device is configured to return "Resource Unavailable" if any of the following applies:

1. some tuners are recording non-Suggestions AND streaming (e.g., InputStatus=LiveStreaming OR UserRecording, etc.). The tuner-equipped device can be configured to provide a reason "Recording & Streaming" to be returned to the caller of the "Check for Real Time Tuner Conflicts" operation.

2. At least 1 tuner is recording a non-Suggestion (e.g., InputStatus=UserRecording, etc.). The tuner-equipped device can be configured to provide a reason "Recording" to be returned to the caller of the "Check for Real Time Tuner Conflicts" operation.

3. At least 1 tuner is streaming (e.g., InputStatus=LiveStreaming, etc.). The tuner-equipped device can be configured to provide a reason "Streaming" to be returned to the caller of the "Check for Real Time Tuner Conflicts" operation.

15.3 Special Rules for Fuzzy Recording Conflicts

In some embodiments, the tuner-equipped device can be configured to apply special rules that involve fuzzy recording (e.g., based on a Suggestion, not based on a user's explicit recording request, etc.) when performing "Check for Future Tuner Conflicts" and/or "Check for Real Time Tuner Conflicts." In an example, if the selected tuner is recording a Suggestion on a channel other than the one that is requested AND is not currently owned (e.g., Current Owner is null, etc.), the tuner-equipped device can be configured to apply a special rule in which the recording for the Suggestion is silently cancelled and to return "Resource Granted" for the selected tuner. In another example, for a recording tuner request, if the request is for a Suggestion, and if the selected tuner is currently owned (e.g., CurrentOwner is not null, etc.), the tuner-equipped device can be configured to apply a special rule in which the requested recording by the recording tuner request is silently cancelled.

16.0 Tuner Toggling

In some embodiments, tuner selection processes, operations, etc., as described herein may be used to support tuner requests generated in tuner toggling. In some embodiments, the system comprising one, two or more tuner-equipped devices and zero, one, two or more tuner client devices may be configured to allow a user to specify how many tuners a user can toggle through. A default number (e.g., two, three, a total number of tuners in the system, etc.) may be set initially and/or overridden later. Thus, when the devices in the system are distributed, for example, throughout a home, a user at any part of the home is able to perform tuner swapping operations and/or tuner toggling operations through two, three or more tuners in the system (e.g., locally, etc.) at the tuner-equipped devices or (e.g., remotely, etc.) from a tuner client device.

In some embodiments, a user input device such as a tuner client device, a user remote, etc., may be configured (e.g., with a button, a selection input, a hovering action, etc.) to allow a user to only toggle between the current tuner and the last tuner used by the host, to toggle among three or more tuners not in certain states (e.g., not owned, background, foreground, etc.), to toggle among three or more tuners not in certain states (e.g., locked, different users owning, etc.), to toggle among three or more tuners including the current tuner and possibly including tuners owned or used by other active users/other devices, etc. In some embodiments, one or more tuners owned by a tuner client device, at which a user is performing/requesting tuner toggling, may be skipped in tuner toggling (e.g., may not be toggled through, etc.).

In some embodiments, tuner toggling may proceed sequentially (e.g., based on an attribute such as "lastUserActivity" such as a tuner with the least recent user activity is toggled to first, etc.; based on tuner ID such as tuner 0, tuner 1 . . . ; etc.) among (skipping tuners owned by clients). For example, tuner toggling enables a user to cycle through four tuners in the same sequential order such as tuner 0, tuner 1, tuner 2, tuner 3, tuner 0, tuner 1, etc.

In some embodiments, a specific tuner attribute such as "primary", etc., may be used to denote the latest tuner with which a user has watched for more than a specific time duration such as N seconds, etc. The specific tuner attribute may be used to control the behaviors of tuner toggling, and enable a user to perform tuner swap between two tuners, toggling between three tuners . . . , and up to toggling among all tuners. For example, For the purpose of illustration only, four tuners are available on a system sharing system for tuner toggling; a current (e.g., default, etc.) toggling sequence for the four tuners without taking into account the "primary" tuner attribute may be: tuner 0, tuner 1, tuner 2, tuner 3, and then tuner 0, tuner 1 . . . , etc. In some embodiments, each time when a user presses tuner toggling button, the tuner immediately following the primary tuner moves to the front of the tuner sequence and becomes the foreground tuner with which the user can watch. For the purpose of illustration, for the following three examples, the toggling sequence initially is tuner 0, foreground, primary; tuner 1, background; tuner 2, background; and tuner 3, background. That is, tuner 0 initially is the current foreground process as well as the current primary tuner (with the "primary" tuner attribute).

In a first example, a user "rapidly" toggles through tuners, for example, trying to get to a specific tuner. At the first tuner toggling, as the tuner (tuner 1) immediately after the primary tuner (tuner 0) is move to the foreground, the toggling sequence becomes tuner 1, foreground; tuner 0, background, primary; tuner 2, background; and tuner 3, background. The user does not stay in tuner 1 for more than N seconds; thus, at the second tuner toggling, as the tuner (tuner 2) immediately after the primary tuner (tuner 0) is move to the foreground, the toggling sequence becomes tuner 2, foreground; tuner 1, background; tuner 0, background, primary; and tuner 3, background. The user does not stay in tuner 2 for more than N seconds; thus, at the third tuner toggling, as the tuner (tuner 3) immediately after the primary tuner (tuner 0) is move to the foreground, the toggling sequence becomes tuner 3, foreground; tuner 2, background; tuner 1, background; and tuner 0, background, primary. As can be seen above, all four tuners are cycled through successively according to the current toggling order.

In a second example, a user does not "rapidly" toggles through tuners, but rather watches tuner 0 and tuner 1 each time for more than N seconds. At the first tuner toggling, as the tuner (tuner 1) immediately after the primary tuner (tuner 0) is move to the foreground, the toggling sequence becomes tuner 1, foreground; tuner 0, background, primary; tuner 2, background; and tuner 3, background. The user stays in tuner 1 for more than N seconds; thus, the toggling sequence dynamically changes into tuner 1, foreground, primary; tuner 0, background; tuner 2, background; and tuner 3, background. At the second tuner toggling, as the tuner (tuner 0) immediately after the primary tuner (tuner 1) is move to the foreground, the toggling sequence becomes tuner 0, foreground; tuner 1, background, primary; tuner 2, background; and tuner 3, background. That is, tuner 0 is swapped back into the foreground. If the user stays in tuner 0 for more than N seconds, the toggling sequence dynamically changes into tuner 0, foreground, primary; tuner 1, background; tuner 2, background; and tuner 3, background. This is the initial toggling sequence of this example. Thus, if the user continues to watch each of tuners 0 and 1 for more than N seconds, tuner toggling effectively becomes tuner swapping between tuners 0 and 1.

In a third example, at the first tuner toggling, as the tuner (tuner 1) immediately after the primary tuner (tuner 0) is move to the foreground, the toggling sequence becomes tuner 1, foreground; tuner 0, background, primary; tuner 2, background; and tuner 3, background. The user stays in tuner 1 for more than N seconds; thus, the toggling sequence dynamically changes into tuner 1, foreground, primary; tuner 0, background; tuner 2, background; and tuner 3, background. At the second tuner toggling, as the tuner (tuner 0) immediately after the primary tuner (tuner 1) is move to the foreground, the toggling sequence becomes tuner 0, foreground; tuner 1, background, primary; tuner 2, background; and tuner 3, background. That is, tuner 0 is swapped back into the foreground. The user does not stay in tuner 0 for more than N seconds. At the third tuner toggling, as the tuner (tuner 2) immediately after the primary tuner (tuner 1) is move to the foreground, the toggling sequence becomes tuner 2, foreground; tuner 0, background; tuner 1, background, primary; and tuner 3, background. The user stays in tuner 2 for more than N seconds; the toggling sequence is dynamically changed into tuner 2, foreground, primary; tuner 0, background; tuner 1, background; and tuner 3, background. At the fourth tuner toggling, as the tuner (tuner 0) immediately after the primary tuner (tuner 2) is move to the foreground, the toggling sequence becomes tuner 0, foreground; tuner 2, background, primary; tuner 1, background; and tuner 3, background. Thus, these successive tuner toggling operations effectively becomes tuner toggling among tuners 0, 1 and 2.

17.0 Example User Interface Displays

Figure 6A:
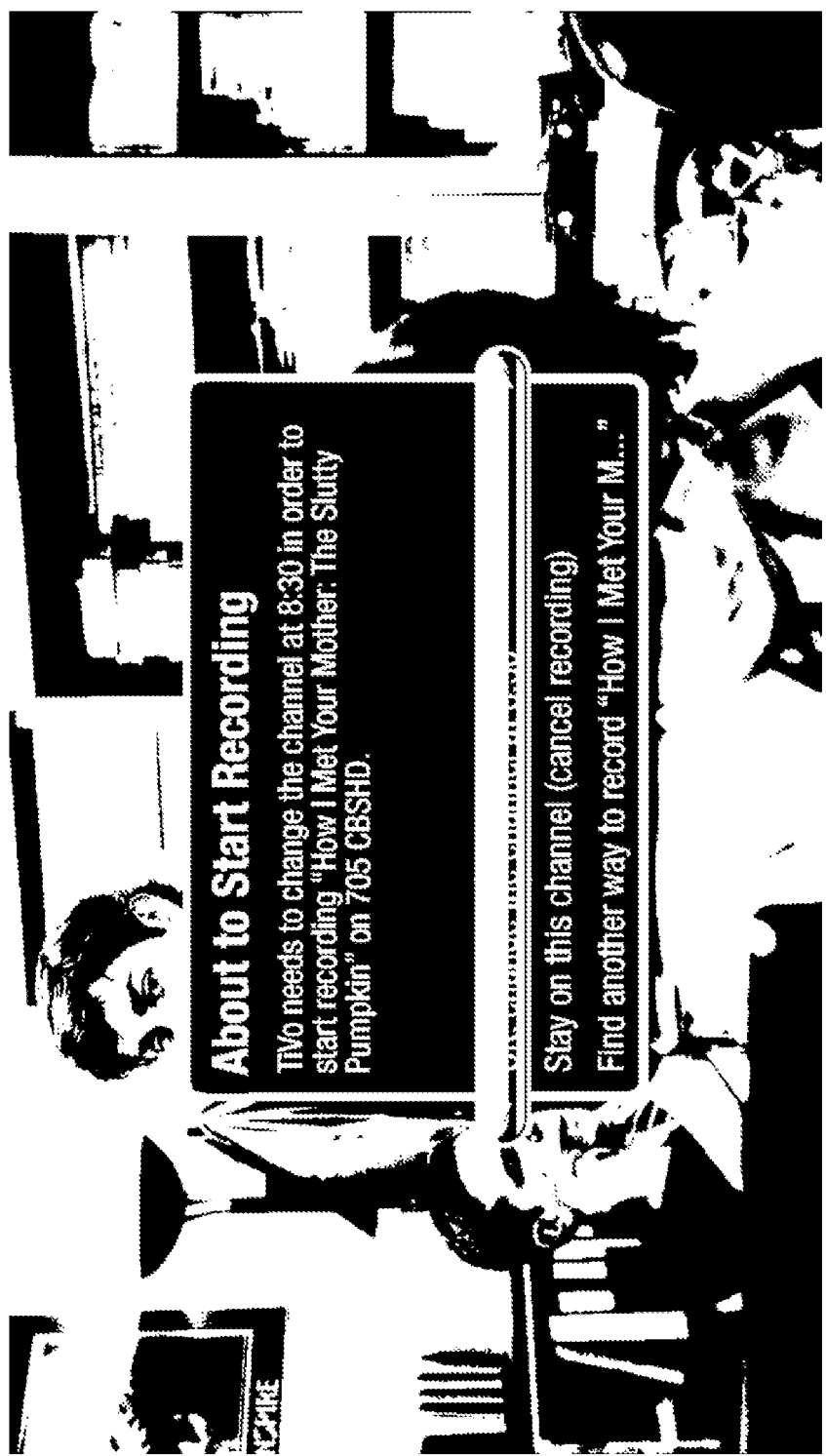
FIG. 6A through FIG. 6M illustrate additional example displays in connection with tuner selection operations.

In some embodiments, in response to determining a tuner conflict, for example, in processing a tuner request, a tuner sharing system as described herein may be configured to present a display such as FIG. 6A, which gives a user options to change channel (e.g., at a specific time, now, etc.), to stay on the current channel, to find another way to satisfy the tuner request (e.g., for recording a program at a different channel, etc.), etc.

Figure 6B:
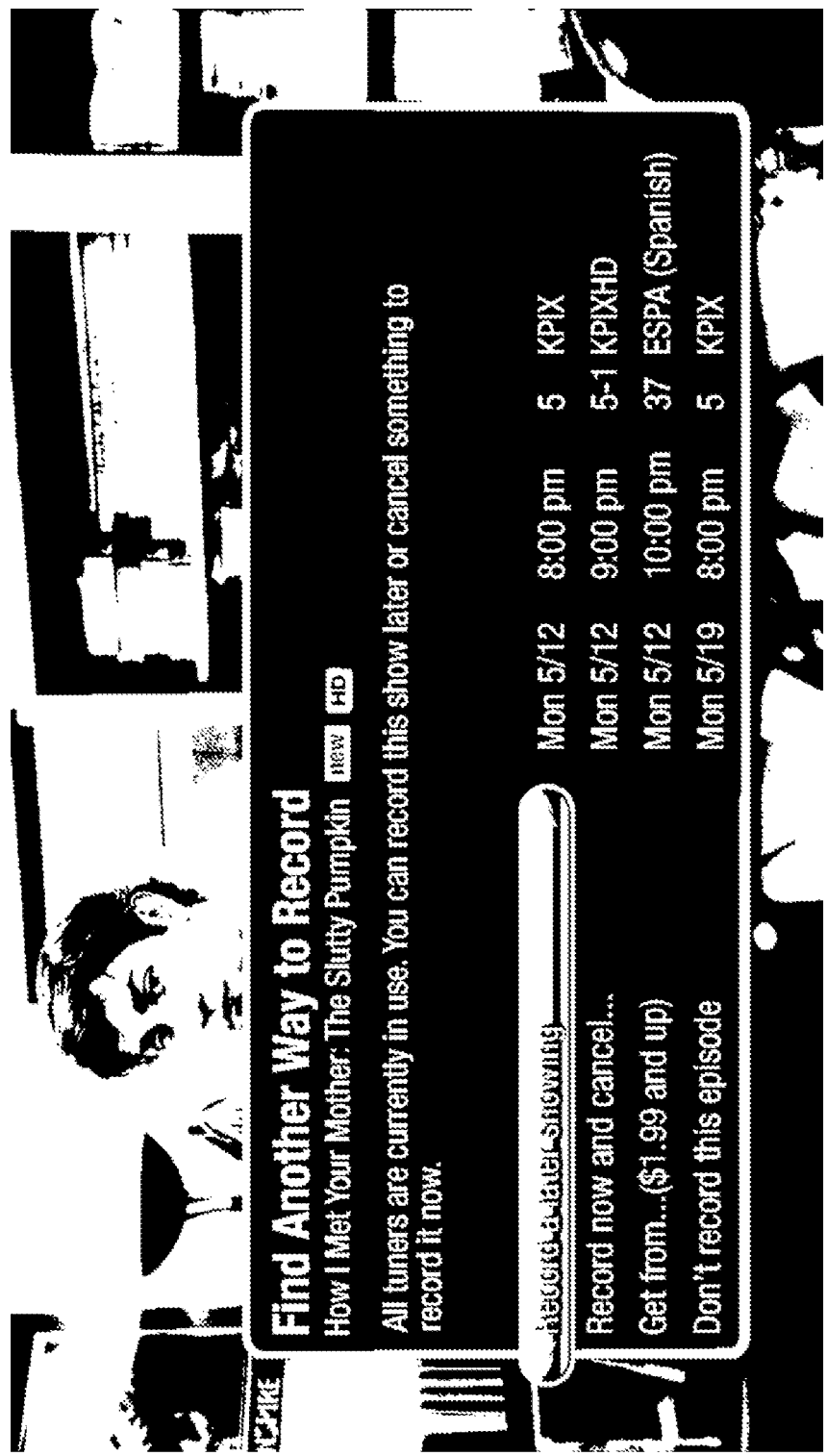

In some embodiments, in response to receiving the user's selection of finding another way to satisfy the tuner request, the system may be configured to provide a number of alternative courses of actions such as FIG. 6B, and execute a specific course of action, among these alternative courses of actions, in response to receiving the user's selection of the specific selection.

Figure 6C:
Figure 6D:
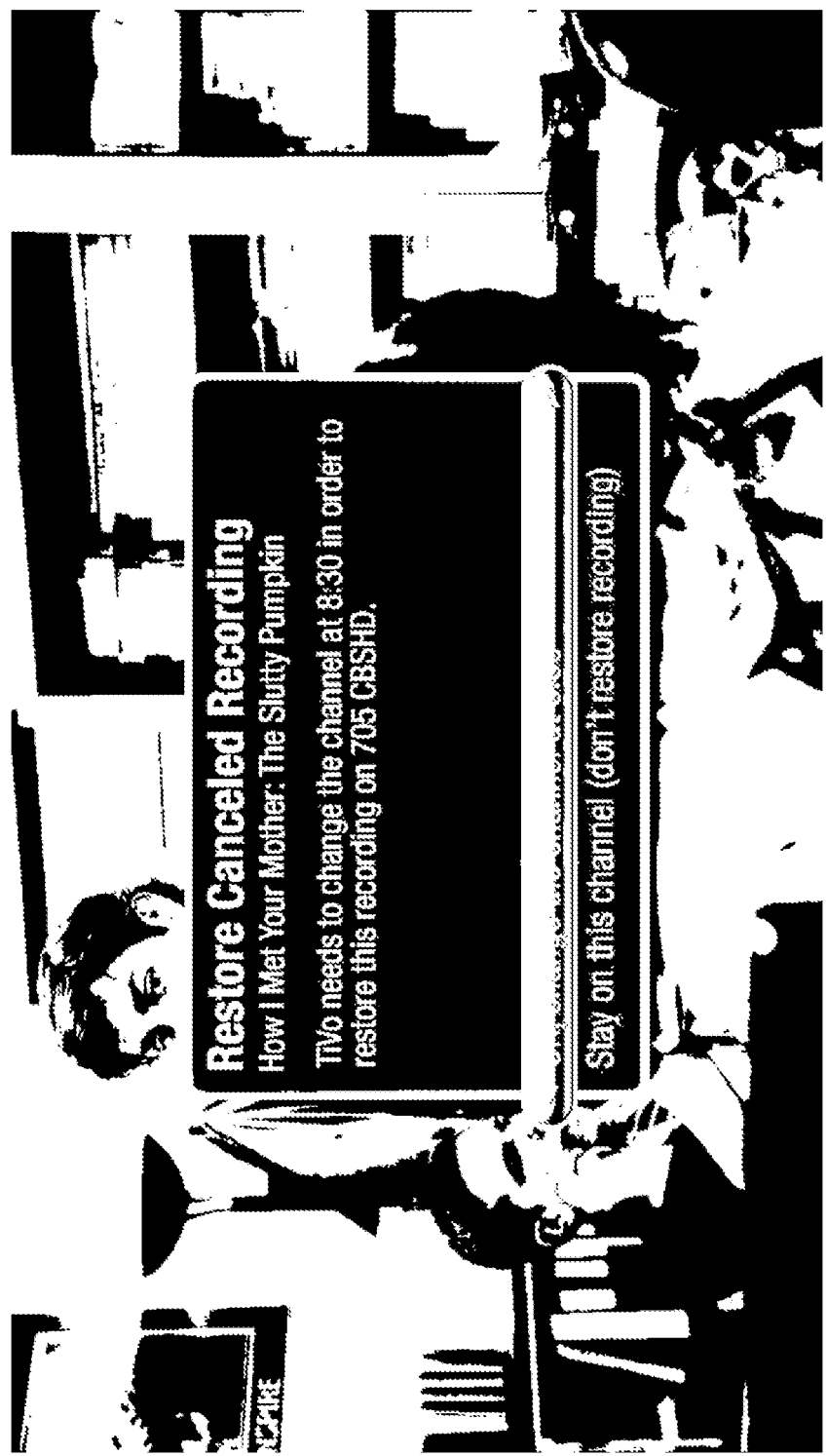
Figure 6E:
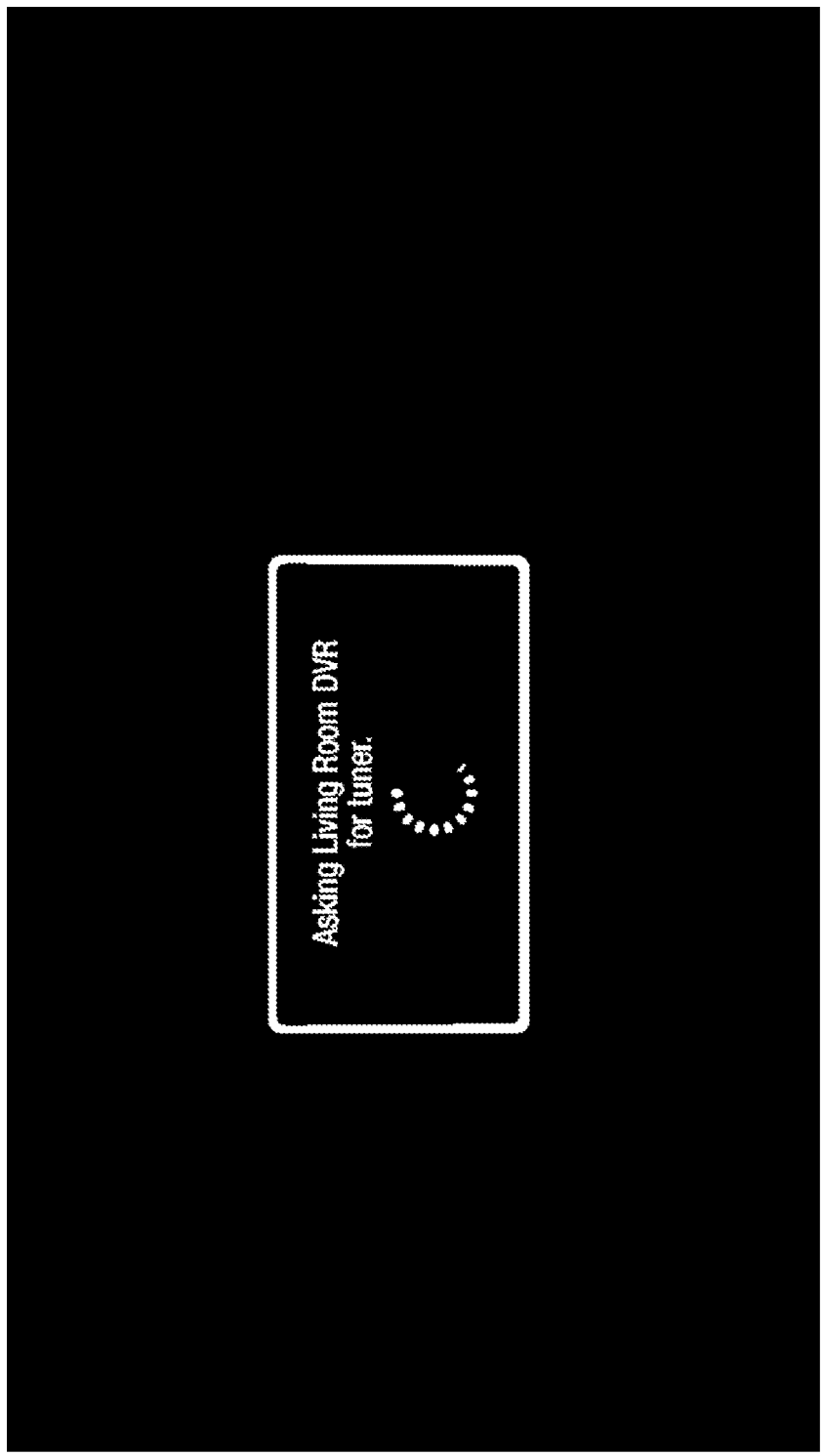

In some embodiments, a tuner sharing system as described herein may be configured to present a display such as FIG. 6C and FIG. 6D (e.g., using one or more of a whisper notification, a small overlay, a transparent overlay, a timed display that vanishes after a timeout that occurs without a user's input, a dialog, etc.), which gives a user options to restore a canceled recording (e.g., at a specific time, now, etc.), to stay on the current channel, etc. The system may be configured to use a whisper notification mechanism to display tuner selection related whisper notifications as well as non-tuner selection related whisper notifications of a social network friend having tagged a photo of the user's, of a real-time incoming phone call of a known or unknown caller, etc.

In some embodiments, when a user who makes a tuner request is waiting (or is likely to wait for a while) for a tuner selection or for a tuner conflict resolution, the system may be configured to display a request status such as shown in FIG. 6D to the user.

Figure 6F:
Figure 6G:
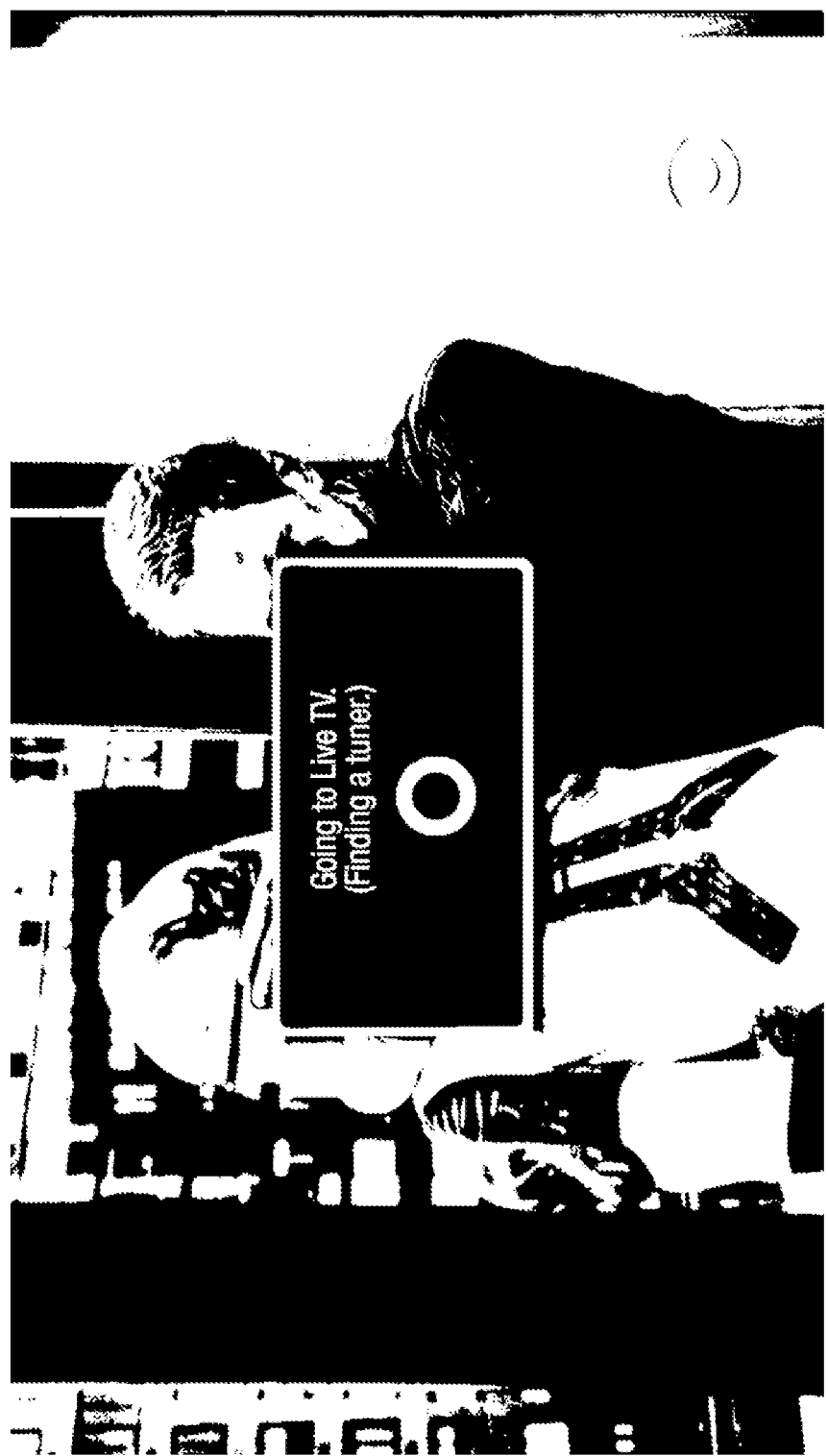
Figure 6H:
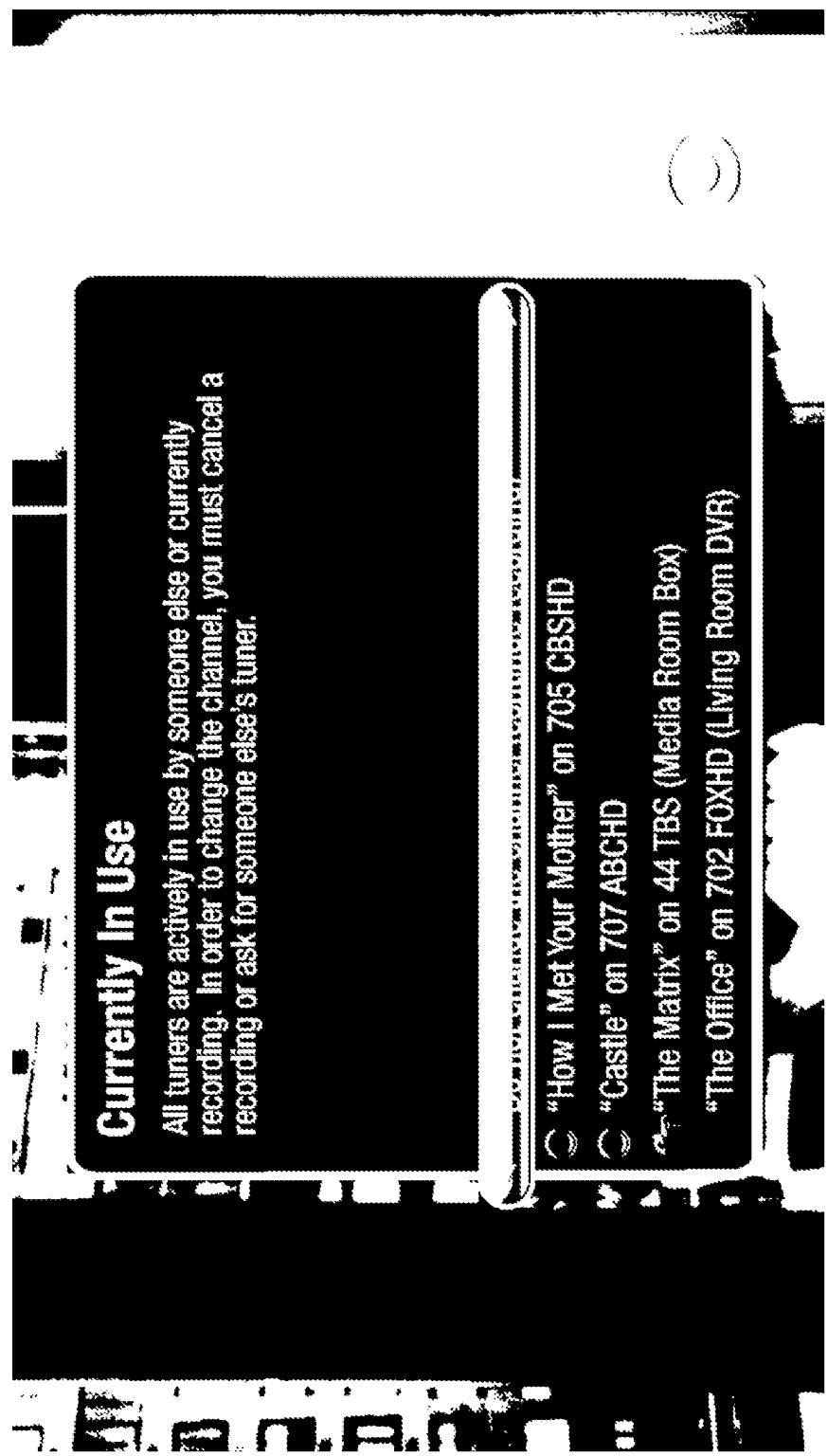
Figure 6I:
Figure 6J:
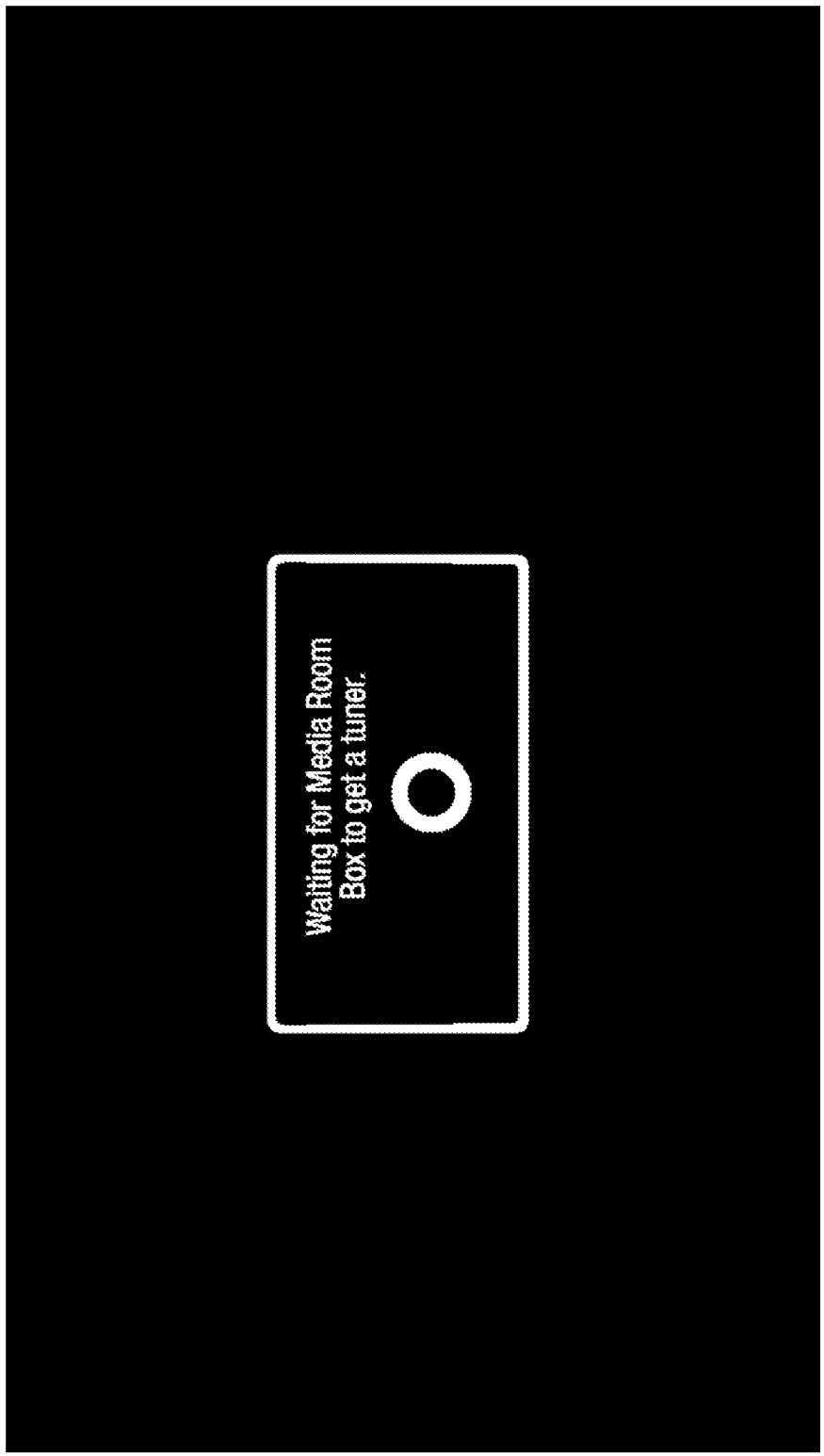

In some embodiments, when a user who is watching a program being recorded makes channel change, in response to determining that there is no available tuner, the system may be configured to present a display such as FIG. 6F, which gives a user options to change channel (e.g., canceling the in-progress recording, etc.), to stay on the current channel, etc.

In some embodiments, if the user tries to change the channel on a recording tuner, the system first tries to select (e.g., based on filtering and sorting rules in an order of preference, etc.) a tuner in response to receiving a corresponding tuner request for changing channel. A prompt such as a display of FIG. 6F may be presented if no tuner is available.

In some embodiments, the system may be configured to select a default option for the user, for example, silently without presenting a display such as FIG. 6F.

In some embodiments, if a tuner currently in one of some specific tuner activities/states is selected by a tuner selection process, operation, etc., as described herein or as option for cancellation in response to receiving a tuner request, a display the same as, or similar to, FIG. 6F may be presented to warn a user that the current tuner activity/state will be affected if the tuner request is to be granted. Instead of presenting prompts to users, information banners, alternatively, whisper notifications, etc. may be presented to the users. Furthermore, in some embodiments, the system may be configured to silently select options for the users when tuners are in specific tuner activities/states.

Examples of tuner activities/states, for which one or more displays may be presented to users, include but are not limited only to: any of foreground active clients, background active tuners performing live caching or recording on a requested channel, background inactive tuners in live caching, foreground inactive tuners in live caching, background active in live caching, user recording in a foreground active tuner for a tuner-equipped device or for a tuner client device, etc. In some embodiments, a tuner may be determined as active or inactive based on user activities. In some embodiments, a tuner may also be determined as active or inactive based on system events. For example, a tuner may be explicitly confirmed or placed into inactive state due to an HDMI event notifying that a TV using the tuner has been turned off. This state is entered after an HDMI Off Event Timeout. In this case, there is no need to prompt a user to confirm or determine that the tuner should be considered as inactive tuner, even if the tuner's attribute presently still indicates that the tuner is in the foreground. An HDMI Off Event Timeout refers to an amount of time after an HDMI off event notification before a corresponding tuner currently in use is placed into confirmed inactive state. In some embodiments, this time out does not apply to tuner client devices.

In some embodiments, in response to determining that an in-progress recording is to be interrupted because a tuner currently used by the recording is to be used for a conflicting tuner activity (e.g., used to tune to a different channel, etc.), the system is configured to present a warning, message, dialog, etc., at a user interface of a tuner-equipped device or a tuner client device. The warning, message, dialog, etc., may give a user options to cancel the conflicting tuner activity to continue the in-progress recording, to watch a recorded program, to go on to the conflicting tuner activity (e.g., terminate the in-progress recording, etc.), etc.

Figure 6K:
Figure 6L:
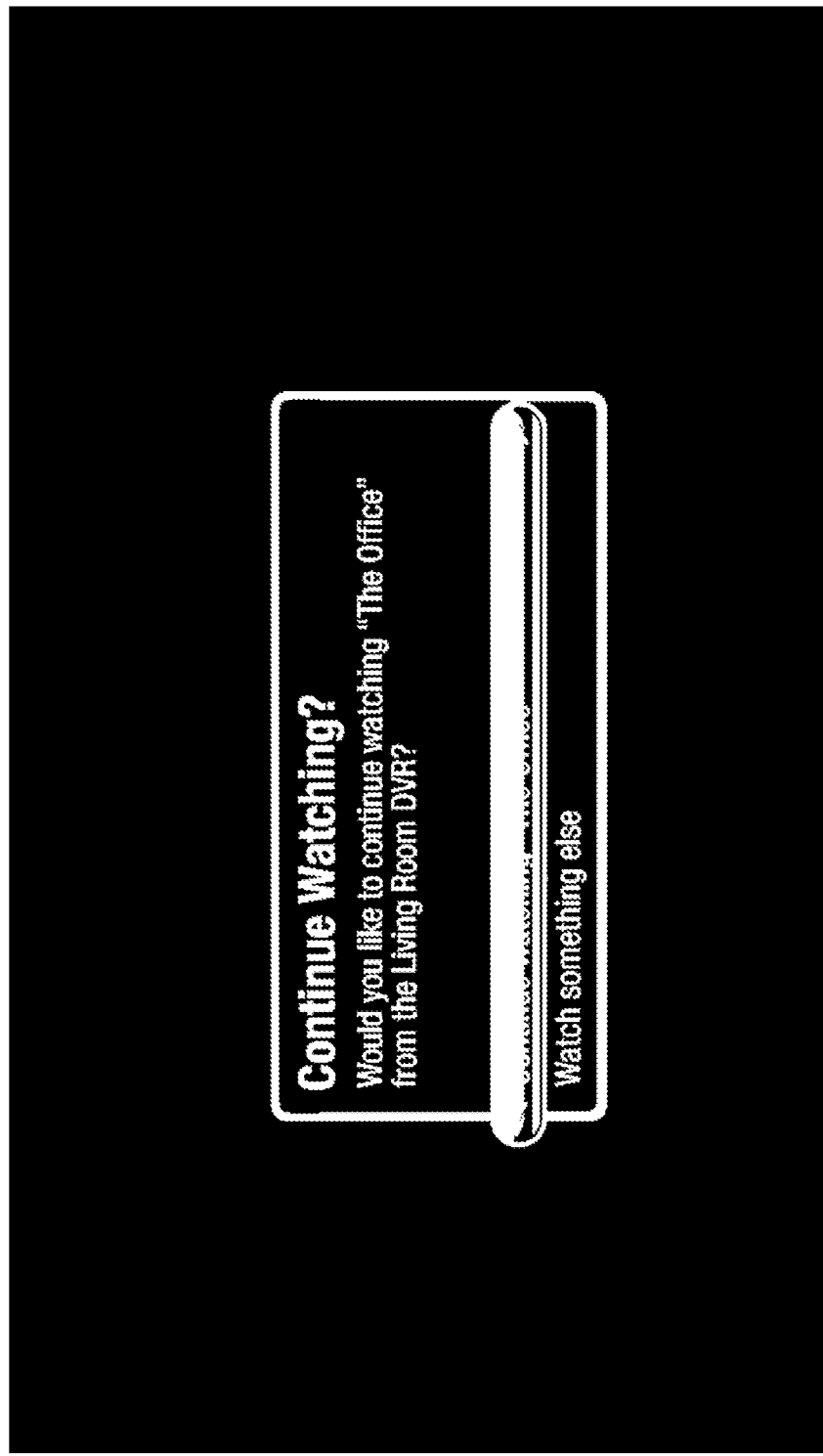
Figure 6M:
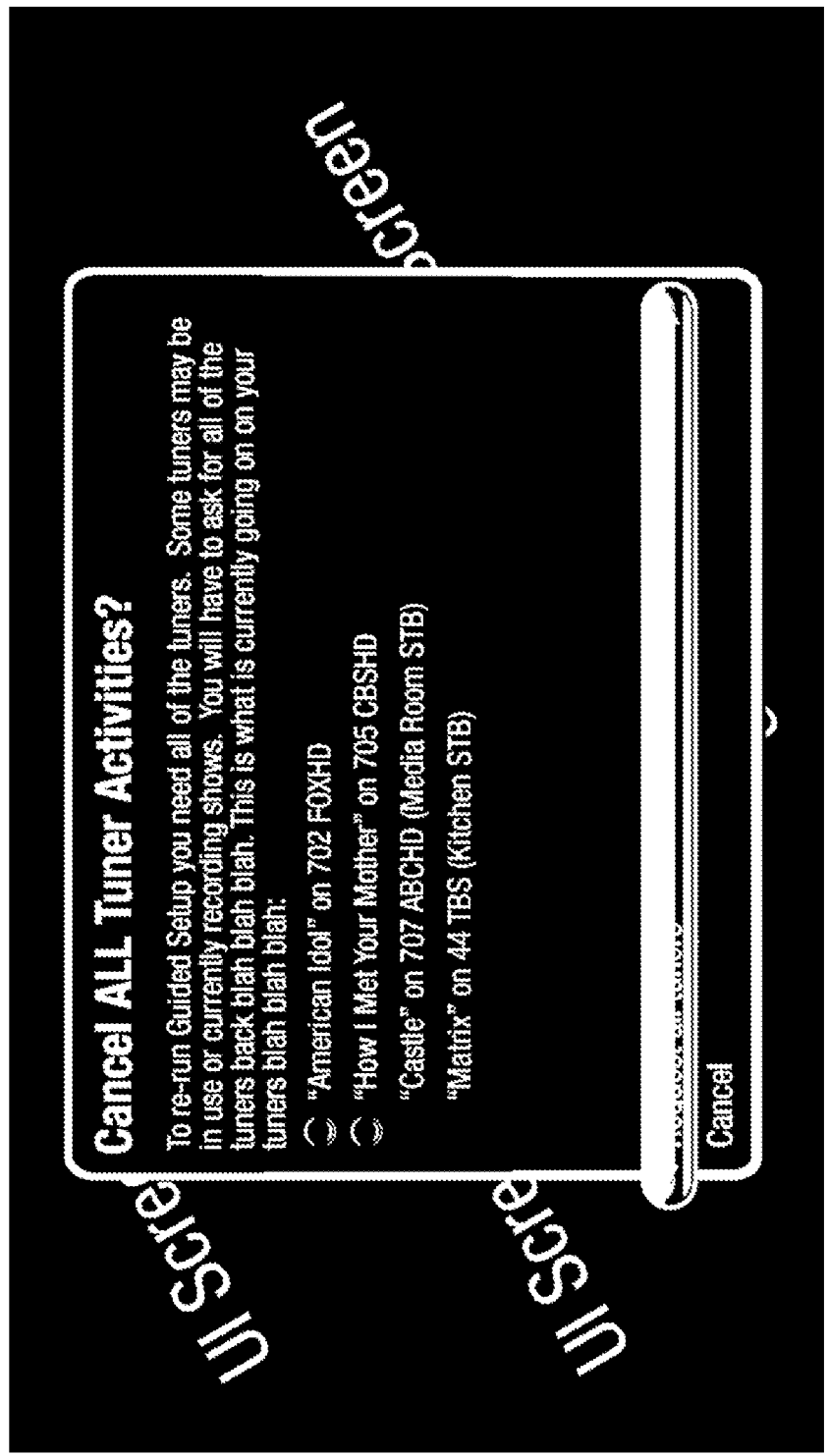

In some embodiments, a user that has been watching a show such as on live TV, etc., with a display of one device in a tuner-sharing system may move to watching the show on a different display of a different device. For example, the user initially may be watching TV on a DVR in a media room, decides to go to bed, but wants to continue watching the show on a bedroom set-top box, which may be off initially, in a bedroom. When the user turns on the bedroom set-top box and its display, the tuner sharing system may detect that a foreground active tuner on the DVR has been confirmed inactive within a very short period of time (e.g., 2 minutes, 5 minutes, below a small time duration threshold, etc.) from the time when a new tuner request is received from a different device (e.g., the bedroom set-top box) and that the confirmed inactive tuner has not be reclaimed by any device. In response, the system may present to the user an option to continue to watch the show, to watch some other shows, etc., as shown in FIG. 6K.

In some embodiments, other modes of user interfaces other than displaying readable messages, visual icons, color codes, etc., may be used to present a status, an impending change, a message, an option, a warning, etc., as described herein. For example, voice synthesis and recognition may also be used to present non-reader messages and solicit non-reader responses or user input.

In some embodiments, a status, an impending change, a message, an option, a warning, etc., as described herein may be provided as a part of a program guide display. Additionally, optionally or alternatively, displaying (e.g., live, etc.) video content in a program-in-guide (PIG) display may be conditional on the availability of a tuner; if a tuner is not available for, the system may be configured to provide program guide information without (e.g., live, etc.) video content; a corresponding icon, message, status, etc., may be displayed to indicate the unavailability of a tuner.

18.0 Example Process Flows

FIG. 7 illustrates an example methods/processes that can be used by a multimedia device (e.g., 102, etc.), or a tuner selection unit (e.g., 120 of FIG. 1, etc.) therein, to perform tuner selection operations. The example processes of FIG. 7 can be implemented by one or more computing devices such as the tuner-equipped device (e.g., 102, etc.) of FIG. 1, etc.

In block 702, in response to receiving a first tuner request, the tuner-equipped device (102) identifies a first tuner task type from among a plurality of tuner task types, the first tuner request being made to perform a tuner task of the first tuner task type.

In block 704, the tuner-equipped device (102) determines a first set of tuner selection rules specifically for the first tuner task type.

In block 704, the tuner-equipped device (102) applies the first set of tuner selection rules to a set of tuners to determine whether the set of tuners comprises a tuner available to perform the tuner task of the first tuner task type.

In an embodiment, the first set of tuner selection rules comprises one or more of tuner filtering rules or tuner sorting rules.

In an embodiment, the tuner-equipped device (102) is further configured to perform determining, based on a set of tuner tasks being performed by the set of tuners, that the set of tuners does not comprise a tuner available to perform the tuner task of the first tuner task type; while the set of tuners continues performing the set of tuner tasks, performing: in response to receiving a second tuner request, identifying a second tuner task type from among the plurality of tuner task types, the second tuner request being made to perform a tuner task of the second tuner task type; determining a second set of tuner selection rules specifically for the second tuner task type, the second set of tuner selection rules being different the first set of tuner selection rules; and determining, based on the second set of tuner selection rules, that the set of tuners comprises a tuner available to perform the tuner task of the second tuner task type.

In an embodiment, the first tuner request is one of a live TV tuner request, a tuner swap request, a video-on-demand (VOD) tuner request, a background node discovery tuner request, an exclusive lock tuner request, or a recording tuner request.

In an embodiment, the first tuner request is triggered by one of a user of a tuner-equipped device with at least one tuner in the set of tuners, a user of a tuner client device without at least one tuner in the set of tuners, or a scheduler in response to a system-generated event.

In an embodiment, the first set of tuner selection rules comprises a tuner selection rule which, when applied, determines whether the set of tuners comprises a specific tuner already tuned to a requested channel specified in the first tuner request.

In an embodiment, the tuner-equipped device (102) is further configured to apply one or more check tuner conflict operations.

In an embodiment, the tuner-equipped device (102) is further configured to present options to a user in response to determining that the set of tuners does not comprise a tuner available to perform the tuner task of the first tuner task type.

In an embodiment, the tuner-equipped device (102) is further configured to perform: determining, based on a set of tuner tasks being performed by the set of tuners, that the set of tuners does not comprise a tuner available to perform the tuner task of the first tuner task type; wherein the tuner task of the first tuner task type relates to one of live streaming or live TV with a media program at a requested channel; determining whether a specific tuner in the set of tuner tasks is currently recording the media program at the requested channel; in response to determining that the specific tuner in the set of tuner tasks is currently recording the media program at the requested channel, providing to a device, from which the first tuner request was originated, a media data stream constructed from recorded portions of the media program at the requested channel, the recorded portions of the media program at the requested channel being generated with the specific tuner in the set of tuner tasks.

In an embodiment, the tuner-equipped device (102) is further configured to determine at least one tuner state for at least one tuner in the set of tuners, based on one or more tuner attributes of the at least one tuner. In an embodiment, at least one of the tuner attributes is determined based on one or more of user remote activities or display-generated events. In an embodiment, at least one of the tuner attributes relates to one of user recording, fuzzy recording, live caching, live streaming, or an idle state. In an embodiment, at least one of the tuner attributes relates to an indication that the at least one tuner is one of a foreground focus or a background focus. In an embodiment, at least one of the tuner attributes relates to an indication that the at least one tuner is one of an active state, an inactive state, or a confirmed inactive state.

Embodiments include an apparatus comprising a processor and configured to perform any one of the foregoing methods. Embodiments include a computer readable storage medium, storing software instructions, which when executed by one or more processors cause performance of any one of the foregoing methods.

Note that, although separate embodiments are discussed herein, any combination of embodiments and/or partial embodiments discussed herein may be combined to form further embodiments.

19.0 Hardware Overview

Figure 5:
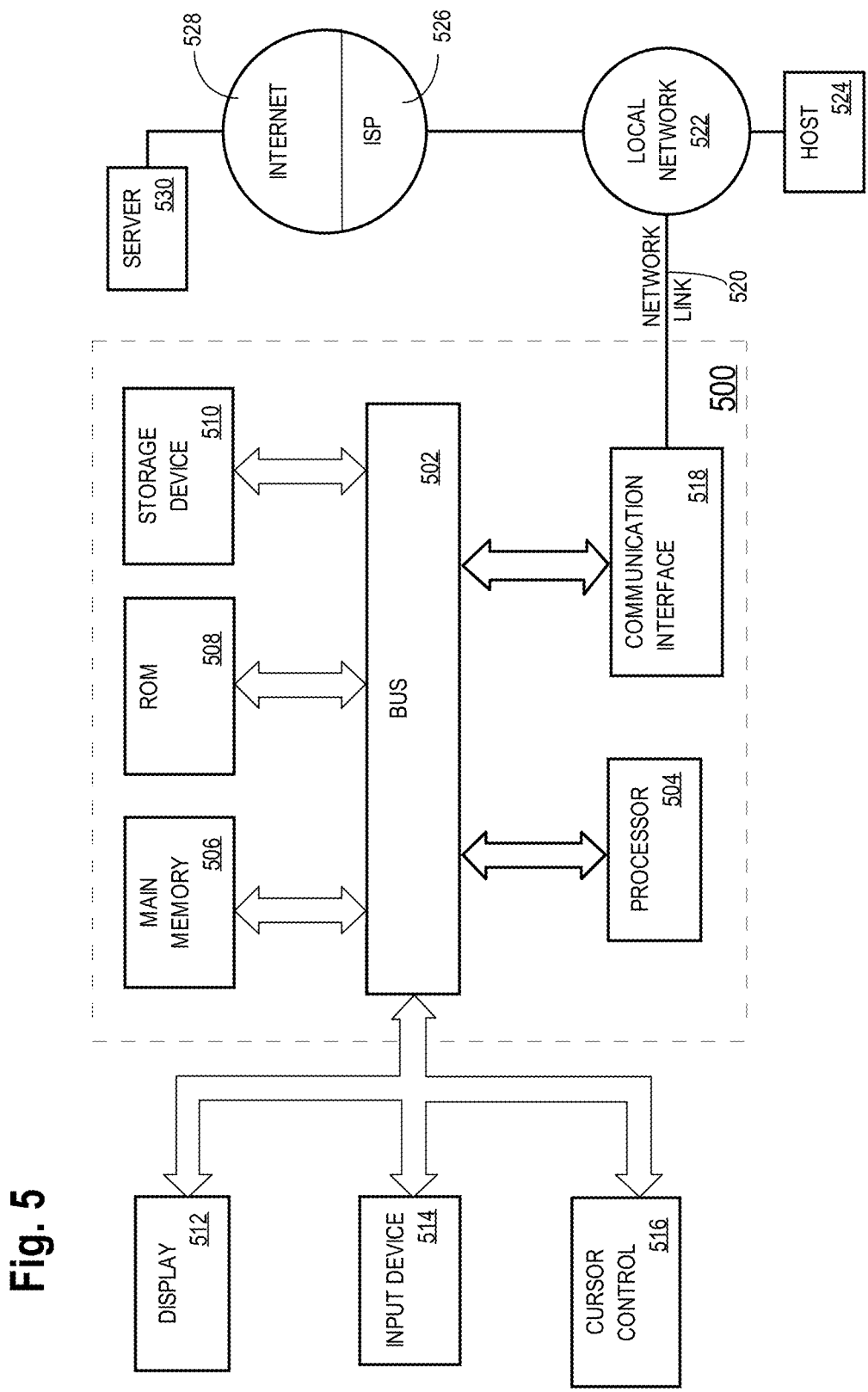
FIG. 5 shows a block diagram that illustrates a system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for a window configuration unit. According to one embodiment of the invention, the window configuration unit is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for a remote display device as described herein.

The received code may be executed by processor 504 as it is received, and/or stored in storage device 510, or other non-volatile storage for later execution. In this manner, computer system 500 may obtain application code in the form of a carrier wave.

20.0 Extensions and Alternatives

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or characteristic that is not expressly recited in a claim should limit the scope of such claim in any way. The specification and drawings are, accordingly, to be regarded in an illustrative rather than a restrictive sense.

The invention claimed is:

1. A method comprising:

in response to receiving a first tuner request, identifying a first tuner task type from among a plurality of tuner task types, the first tuner request requesting performance of a new tuner task of the first tuner task type;

in response to identifying the first tuner task type for the new tuner task, performing:

determining a first set of tuner selection rules specifically for the first tuner task type;

applying one or more filtering rules in the first set of tuner selection rules to a set of tuners capable of performing the first tuner task type to determine whether the set of tuners comprises a plurality of tuners available to perform the new tuner task of the first tuner task type;

in response to determining that the plurality of tuners in the set of tuners are available to perform the new tuner task of the first tuner task type, performing:

applying one or more sorting rules in the first set of tuner selection rules that include assigning a priority to each tuner in the plurality of tuners available to perform the new tuner task of the first tuner task type based on a current tuner state of that tuner; and selecting a specific tuner, based on a specific priority assigned to the specific tuner, from the plurality of tuners for performing the new tuner task; and in response to determining that none of the tuners of the set of tuners capable of performing the first tuner task type are available to perform the new tuner task, performing:

applying one or more sorting rules in the first set of tuner selection rules that include assigning a priority to each tuner in the set of tuners capable of performing the first tuner task type based on a priority of a tuner task with which that tuner is occupied;

selecting a specific tuner, based on a specific priority assigned to the specific tuner, from the set of tuners capable of performing the first tuner task type for performing the new tuner task; and reassigning the selected tuner to perform the new tuner task.

2. The method of claim 1, wherein the first set of tuner selection rules comprises one or more of tuner filtering rules or tuner sorting rules.

3. The method of claim 1, further comprising:

determining, based on a set of existing tuner tasks being performed by the set of tuners, that the set of tuners does not comprise a tuner available to perform the new tuner task of the first tuner task type;

while the set of tuners continues performing the set of existing tuner tasks, performing:

in response to receiving a second tuner request, identifying a second tuner task type from among the plurality of tuner task types, the second tuner request being made to perform a new tuner task of the second tuner task type;

determining a second set of tuner selection rules specifically for the second tuner task type, the second set of tuner selection rules being different the first set of tuner selection rules; and determining, based on the second set of tuner selection rules, that the set of tuners comprises a tuner available to perform the new tuner task of the second tuner task type.

4. The method of claim 1, wherein the first tuner request is one of: a live TV tuner request, a tuner swap request, a video-on-demand (VOD) tuner request, a background node discovery tuner request, an exclusive lock tuner request, or a recording tuner request.

5. The method of claim 1, wherein the first tuner request is triggered by one of: a user of a tuner-equipped device with at least one tuner in the set of tuners, a user of a tuner client device without at least one tuner in the set of tuners, or a scheduler in response to a system-generated event.

6. The method of claim 1, wherein the first set of tuner selection rules comprises a tuner selection rule which, when applied, determines whether the set of tuners comprises a specific tuner already tuned to a requested channel specified in the first tuner request.

7. The method of claim 1, further comprising:

applying one or more check tuner conflict operations.

8. The method of claim 1, further comprising:

presenting options to a user in response to determining that the set of tuners does not comprise a tuner available to perform the new tuner task of the first tuner task type.

9. The method of claim 1, further comprising:

determining, based on a set of existing tuner tasks being performed by the set of tuners, that the set of tuners does not comprise a tuner available to perform the new tuner task of the first tuner task type;

wherein the new tuner task of the first tuner task type relates to one of live streaming or live TV with a media program at a requested channel;

determining whether a specific tuner in the set of existing tuner tasks is currently recording the media program at the requested channel;

in response to determining that the specific tuner in the set of existing tuner tasks is currently recording the media program at the requested channel, providing to a device, from which the first tuner request was originated, a media data stream constructed from recorded portions of the media program at the requested channel, the recorded portions of the media program at the requested channel being generated with the specific tuner in the set of existing tuner tasks.

10. The method of claim 1, further comprising determining at least one tuner state for at least one tuner in the set of tuners, based on one or more tuner attributes of the at least one tuner.

11. The method of claim 10, wherein at least one of the tuner attributes is determined based on one or more of user remote activities or display-generated events.

12. The method of claim 10, wherein at least one of the tuner attributes relates to one of user recording, fuzzy recording, live caching, live streaming, or an idle state.

13. The method of claim 10, wherein at least one of the tuner attributes relates to an indication that the at least one tuner is one of a foreground focus or a background focus.

14. The method of claim 10, wherein at least one of the tuner attributes relates to an indication that the at least one tuner is one of an active state, an inactive state, or a confirmed inactive state.

15. A non-transitory computer readable medium storing instructions, which when executed by one or more processors cause performance of:

in response to receiving a first tuner request, identifying a first tuner task type from among a plurality of tuner task types, the first tuner request requesting performance of a new tuner task of the first tuner task type;
in response to identifying the first tuner task type for the new tuner task, performing:
determining a first set of tuner selection rules specifically for the first tuner task type;
applying one or more filtering rules in the first set of tuner selection rules to a set of tuners capable of performing the first tuner task type to determine whether the set of tuners comprises a plurality of tuners available to perform the new tuner task of the first tuner task type;
in response to determining that the plurality of tuners in the set of tuners are available to perform the new tuner task of the first tuner task type, performing:
applying one or more sorting rules in the first set of tuner selection rules that include assigning a priority to each tuner in the plurality of tuners available to perform the new tuner task of the first tuner task type based on a current tuner state of that tuner; and
selecting a specific tuner, based on a specific priority assigned to the specific tuner, from the plurality of tuners for performing the new tuner task; and
in response to determining that none of the tuners of the set of tuners capable of performing the first tuner task type are available to perform the new tuner task, performing:
applying one or more sorting rules in the first set of tuner selection rules that include assigning a priority to each tuner in the set of tuners capable of performing the first tuner task type based on a priority of a tuner task with which that tuner is occupied;
selecting a specific tuner, based on a specific priority assigned to the specific tuner, from the set of tuners capable of performing the first tuner task type for performing the new tuner task; and
reassigning the selected tuner to perform the new tuner task.

16. The medium of claim 15, wherein the first set of tuner selection rules comprises one or more of tuner filtering rules or tuner sorting rules.

17. The medium of claim 15, wherein the instructions comprise further instructions, which when executed by one or more processors cause performance of:
determining, based on a set of existing tuner tasks being performed by the set of tuners, that the set of tuners does not comprise a tuner available to perform the new tuner task of the first tuner task type;
while the set of tuners continues performing the set of existing tuner tasks, performing:
in response to receiving a second tuner request, identifying a second tuner task type from among the plurality of tuner task types, the second tuner request being made to perform a new tuner task of the second tuner task type;
determining a second set of tuner selection rules specifically for the second tuner task type, the second set of tuner selection rules being different the first set of tuner selection rules; and
determining, based on the second set of tuner selection rules, that the set of tuners comprises a tuner available to perform the new tuner task of the second tuner task type.

18. The medium of claim 15, wherein the first tuner request is one of a live TV tuner request, a tuner swap request, a video-on-demand (VOD) tuner request, a background node discovery tuner request, an exclusive lock tuner request, or a recording tuner request.

19. The medium of claim 15, wherein the first tuner request is triggered by one of a user of a tuner-equipped device with at least one tuner in the set of tuners, a user of a tuner client device without at least one tuner in the set of tuners, or a scheduler in response to a system-generated event.

20. The medium of claim 15, wherein the first set of tuner selection rules comprises a tuner selection rule which, when applied, determines whether the set of tuners comprises a specific tuner already tuned to a requested channel specified in the first tuner request.

21. The medium of claim 15, wherein the instructions comprise further instructions, which when executed by one or more processors cause performance of applying one or more check tuner conflict operations.

22. The medium of claim 15, wherein the instructions comprise further instructions, which when executed by one or more processors cause performance of presenting options to a user in response to determining that the set of tuners does not comprise a tuner available to perform the new tuner task of the first tuner task type.

23. The medium of claim 15, wherein the instructions comprise further instructions, which when executed by one or more processors cause performance of:
determining, based on a set of existing tuner tasks being performed by the set of tuners, that the set of tuners does not comprise a tuner available to perform the new tuner task of the first tuner task type;
wherein the new tuner task of the first tuner task type relates to one of live streaming or live TV with a media program at a requested channel;
determining whether a specific tuner in the set of existing tuner tasks is currently recording the media program at the requested channel;
in response to determining that the specific tuner in the set of existing tuner tasks is currently recording the media program at the requested channel, providing to a device, from which the first tuner request was originated, a media data stream constructed from recorded portions of the media program at the requested channel, the recorded portions of the media program at the requested channel being generated with the specific tuner in the set of existing tuner tasks.

24. The medium of claim 15, wherein the instructions comprise further instructions, which when executed by one or more processors cause performance of determining at least one tuner state for at least one tuner in the set of tuners, based on one or more tuner attributes of the at least one tuner.

25. The medium of claim 24, wherein at least one of the tuner attributes is determined based on one or more of user remote activities or display-generated events.

26. The medium of claim 24, wherein at least one of the tuner attributes relates to one of user recording, fuzzy recording, live caching, live streaming, or an idle state.

27. The medium of claim 24, wherein at least one of the tuner attributes relates to an indication that the at least one tuner is one of a foreground focus or a background focus.

28. The medium of claim 24, wherein at least one of the tuner attributes relates to an indication that the at least one tuner is one of an active state, an inactive state, or a confirmed inactive state.

29. An apparatus comprising:
an identification subsystem, implemented at least partially in hardware, that identifies, in response to receiving a first tuner request, a first tuner task type from among a plurality of tuner task types, the first tuner request requesting performance of a new tuner task of the first tuner task type;
a determination subsystem, implemented at least partially in hardware, that determines a first set of tuner selection rules specifically for the first tuner task type;
a selection rule subsystem, implemented at least partially in hardware, that applies one or more filtering rules in the first set of tuner selection rules to a set of tuners capable of performing the first tuner task type to determine whether the set of tuners comprises a plurality of tuners available to perform the new tuner task of the first tuner task type;
the selection rule subsystem, in response to determining that the plurality of tuners in the set of tuners are available to perform the new tuner task of the first tuner task type, applying one or more sorting rules in the first set of tuner selection rules that include assigning a priority to each tuner in the plurality of tuners available to perform the new tuner task of the first tuner task type based on a current tuner state of that tuner and selecting a specific tuner, based on a specific priority assigned to the specific tuner, from the plurality of tuners for performing the new tuner task; and
the selection rule subsystem, in response to determining that none of the tuners of the set of tuners capable of performing the first tuner task type are available to perform the new tuner task, applying one or more sorting rules in the first set of tuner selection rules that include assigning a priority to each tuner in the set of tuners capable of performing the first tuner task type based on a priority of a tuner task with which that tuner is occupied, selecting a specific tuner, based on a specific priority assigned to the specific tuner, from the set of tuners capable of performing the first tuner task type for performing the new tuner task, and reassigning the selected tuner to perform the new tuner task.

30. The apparatus of claim 29, wherein the first set of tuner selection rules comprises one or more of tuner filtering rules or tuner sorting rules.

31. The apparatus of claim 29, wherein the apparatus further comprises:
a subsystem, implemented at least partially in hardware, that determines, based on a set of existing tuner tasks being performed by the set of tuners, that the set of tuners does not comprise a tuner available to perform the new tuner task of the first tuner task type;
a subsystem, implemented at least partially in hardware, that, identifies, in response to receiving a second tuner request, a second tuner task type from among the plurality of tuner task types, the second tuner request being made to perform a new tuner task of the second tuner task type;
a subsystem, implemented at least partially in hardware, that determines a second set of tuner selection rules specifically for the second tuner task type, the second set of tuner selection rules being different the first set of tuner selection rules; and
a subsystem, implemented at least partially in hardware, that determines, based on the second set of tuner selection rules, that the set of tuners comprises a tuner available to perform the new tuner task of the second tuner task type.

32. The apparatus of claim 29, wherein the first tuner request is one of a live TV tuner request, a tuner swap request, a video-on-demand (VOD) tuner request, a background node discovery tuner request, an exclusive lock tuner request, or a recording tuner request.

33. The apparatus of claim 29, wherein the first tuner request is triggered by one of: a user of a tuner-equipped device with at least one tuner in the set of tuners, a user of a tuner client device without at least one tuner in the set of tuners, or a scheduler in response to a system-generated event.

34. The apparatus of claim 29, wherein the first set of tuner selection rules comprises a tuner selection rule which, when applied, determines whether the set of tuners comprises a specific tuner already tuned to a requested channel specified in the first tuner request.

35. The apparatus of claim 29, wherein the apparatus further comprises a subsystem, implemented at least partially in hardware, that applies one or more check tuner conflict operations.

36. The apparatus of claim 29, wherein the apparatus further comprises:
a subsystem, implemented at least partially in hardware, that presents options to a user in response to determining that the set of tuners does not comprise a tuner available to perform the new tuner task of the first tuner task type.

37. The apparatus of claim 29, wherein the apparatus further comprises:
a subsystem, implemented at least partially in hardware, that determines, based on a set of existing tuner tasks being performed by the set of tuners, that the set of tuners does not comprise a tuner available to perform the new tuner task of the first tuner task type;
wherein the new tuner task of the first tuner task type relates to one of live streaming or live TV with a media program at a requested channel;
a subsystem, implemented at least partially in hardware, that determines whether a specific tuner in the set of existing tuner tasks is currently recording the media program at the requested channel;
a subsystem, implemented at least partially in hardware, that provides to a device, from which the first tuner request was originated, a media data stream constructed from recorded portions of the media program at the requested channel in response to determining that the specific tuner in the set of existing tuner tasks is currently recording the media program at the requested channel, the recorded portions of the media program at the requested channel being generated with the specific tuner in the set of existing tuner tasks.

38. The apparatus of claim 29, wherein the apparatus further comprises: a subsystem, implemented at least partially in hardware, that determines at least one tuner state for at least one tuner in the set of tuners, based on one or more tuner attributes of the at least one tuner.

39. The apparatus of claim 38, wherein at least one of the tuner attributes is determined based on one or more of user remote activities or display-generated events.

40. The apparatus of claim 38, wherein at least one of the tuner attributes relates to one of: user recording, fuzzy recording, live caching, live streaming, or an idle state.

41. The apparatus of claim 38, wherein at least one of the tuner attributes relates to an indication that the at least one tuner is one of a foreground focus or a background focus.

42. The apparatus of claim 38, wherein at least one of the tuner attributes relates to an indication that the at least one tuner is one of an active state, an inactive state, or a confirmed inactive state.

* * * * *